United States Patent [19]

Tofte et al.

[11] Patent Number: 5,574,657
[45] Date of Patent: Nov. 12, 1996

[54] ELECTRONIC RATE METER CONTROLLER AND METHOD

[75] Inventors: S. David Tofte, Mankato; Steven W. Vogel, North Mankato, both of Minn.

[73] Assignee: Micro-Trak Systems, Inc., Eagle Lake, Minn.

[21] Appl. No.: 193,387

[22] Filed: Feb. 8, 1994

[51] Int. Cl.⁶ .................................................... G01F 1/684
[52] U.S. Cl. ...................... 364/510; 364/479.1; 364/550; 364/166
[58] Field of Search .................................. 364/510, 478, 364/479, 550, 510, 136, 138, 166, 172, 421, 424.03, 424.07; 221/9, 10, 15; 222/14–16, 52–59, 23, 63, 1; 340/603, 605, 684; 239/155, 71, 124, 690, 3, 1, 62, 61; 111/119, 123, 127, 121, 118, 903, 904; 137/485, 486, 623.3, 561 A; 96/174

[56] References Cited

U.S. PATENT DOCUMENTS

| | | | |
|---|---|---|---|
| Re. 30,539 | 3/1981 | van der Lely | 111/6 |
| 3,680,967 | 8/1972 | Engelhardt | 356/246 |
| 3,698,682 | 10/1972 | Berning et al. | 251/30.03 |
| 3,801,063 | 4/1974 | Holmes et al. | 251/30.03 |
| 3,877,645 | 4/1975 | Oligschlaeger | 239/155 |
| 3,983,366 | 9/1976 | Gunn | 235/435 |
| 4,013,875 | 3/1977 | McGlynn | 364/424.07 |
| 4,015,366 | 4/1977 | Hall, III | 47/1.01 |
| 4,023,020 | 5/1977 | Lestradet | 364/424.07 |
| 4,052,003 | 10/1977 | Steffen | 239/71 |
| 4,062,306 | 12/1977 | Wosmek | 111/119 |
| 4,093,107 | 6/1978 | Allman et al. | 222/23 |
| 4,098,433 | 7/1978 | Oligschlaeger | 222/63 |
| 4,121,767 | 10/1978 | Jensen | 239/71 |
| 4,202,283 | 5/1980 | Wiesboeck | 111/119 |
| 4,220,998 | 9/1980 | Kays | 364/510 |
| 4,260,107 | 4/1981 | Jackson | 239/155 |
| 4,274,585 | 6/1981 | Lestradet | 239/124 |
| 4,296,409 | 10/1981 | Whitaker et al. | 374/684 |
| 4,301,944 | 11/1981 | Lestradet | 222/55 |
| 4,358,054 | 11/1982 | Ehrat | 239/155 |
| 4,364,409 | 12/1982 | Jones | 137/486 |
| 4,376,298 | 3/1983 | Sokol et al. | 364/424.03 |
| 4,392,611 | 7/1983 | Bachman et al. | 239/74 |
| 4,458,609 | 7/1984 | Tofte | 111/119 |
| 4,523,280 | 6/1985 | Bachman | 364/424.07 |
| 4,530,463 | 7/1985 | Hiniker et al. | 239/71 |

(List continued on next page.)

OTHER PUBLICATIONS

Landers, A. J., "Application Technology, Injection Closed System Sprayers", Royal Agricultural College, Cirencester, Glos. GL7 6JS, UK, pp. 27–30.

"Raven®, Chemical Injection Spray Systems" brochure, Raven® Industries, Inc.

Primary Examiner—Emanuel T. Voeltz
Assistant Examiner—Hal D. Wachsman
Attorney, Agent, or Firm—Merchant, Gould, Smith, Edell, Welter & Schmidt, P.A.

[57] ABSTRACT

An electronic rate meter controller is provided for controlling the dispensing of meterable material by an applicator apparatus, typically in the agricultural area. The rate meter controller retrofits a manually-controllable rate meter within the applicator apparatus that controls the rate of material flow through the applicator by adjustment to a primary control member of the rate meter, such as a rotary calibration dial. The rate meter controller allows for automatic electronic control and adjustment to the rate meter by the primary control member, based on user inputs and certain sensor inputs. Typical sensor inputs include speed of the applicator apparatus as it is being moved while dispensing the metered material, and ambient air temperature which affects the applicator system pressure for certain materials such as anhydrous ammonia. The rate meter controller also allows for manual electronic remote control of the rate meter, such as from a cab of a vehicle moving the applicator apparatus. The rate meter controller can be utilized as an independent system or as a subsystem of an integrated system controlling a plurality of control devices. The rate meter controller can accommodate one or a plurality of rate meters within an applicator apparatus.

29 Claims, 24 Drawing Sheets

U.S. PATENT DOCUMENTS

| | | | |
|---|---|---|---|
| 4,551,801 | 11/1985 | Sokol | 364/424.03 |
| 4,553,702 | 11/1985 | Coffee et al. | 239/690 |
| 4,574,715 | 3/1986 | Dietrich, Sr. et al. | 111/123 |
| 4,580,721 | 4/1986 | Coffee et al. | 239/3 |
| 4,614,300 | 9/1986 | Falcoff | 239/71 |
| 4,624,193 | 11/1986 | Johnston | 111/127 |
| 4,637,547 | 1/1987 | Hiniker et al. | 239/1 |
| 4,656,957 | 4/1987 | Williamson et al. | 111/121 |
| 4,657,568 | 4/1987 | Jones | 96/174 |
| 4,714,196 | 12/1987 | McEachern et al. | 239/62 |
| 4,715,012 | 12/1987 | Mueller, Jr. | 364/424.07 |
| 4,763,692 | 8/1988 | Bachman et al. | 137/625.3 |
| 4,803,626 | 2/1989 | Bachman et al. | 364/424.07 |
| 4,805,088 | 2/1989 | Cross et al. | 364/172 |
| 4,807,544 | 2/1989 | Cross et al. | 111/127 |
| 4,807,663 | 2/1989 | Jones | 137/561 A |
| 4,825,959 | 5/1989 | Wihelm | 172/720 |
| 4,826,083 | 5/1989 | Vanderjagt | 239/155 |
| 4,878,598 | 11/1989 | Ruschaupt, Jr. | 222/1 |
| 4,893,241 | 1/1990 | Girodat et al. | 364/424.07 |
| 4,895,303 | 1/1990 | Freyvogel | 239/61 |
| 4,924,418 | 5/1990 | Bachman et al. | 364/550 |
| 4,931,774 | 6/1990 | Bachman | 340/603 |
| 4,967,957 | 11/1990 | Bachman | 239/62 |
| 5,014,914 | 5/1991 | Wallanas | 239/62 |
| 5,033,397 | 7/1991 | Colburn, Jr. | 111/118 |
| 5,075,857 | 12/1991 | Maresca | 364/421 |
| 5,170,820 | 12/1992 | Jones | 137/899 |
| 5,181,616 | 1/1993 | Le Gigan | 209/31 |
| 5,251,148 | 10/1993 | Haines et al. | 364/510 |
| 5,260,875 | 11/1993 | Tofte et al. | 364/424.07 |

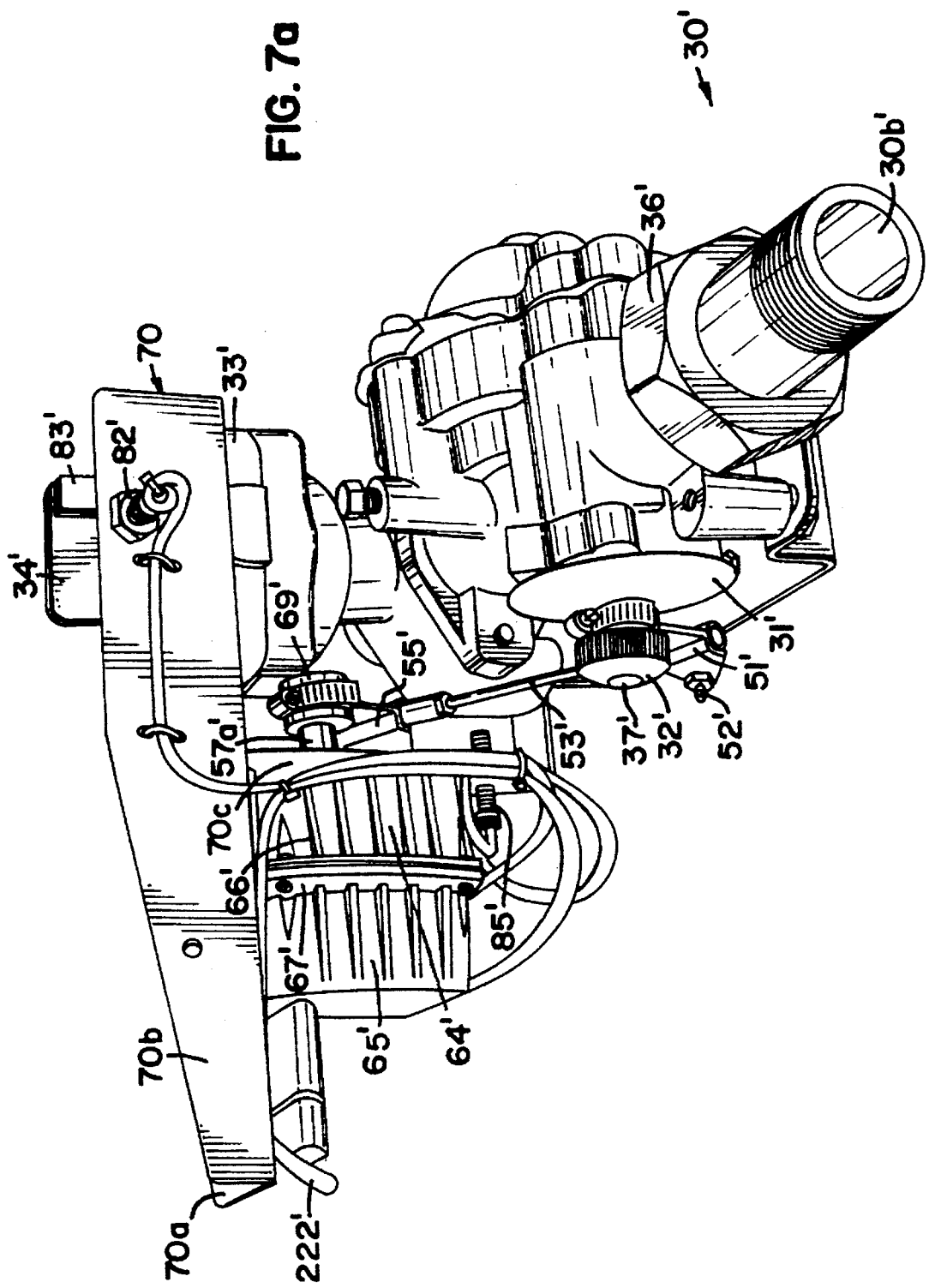

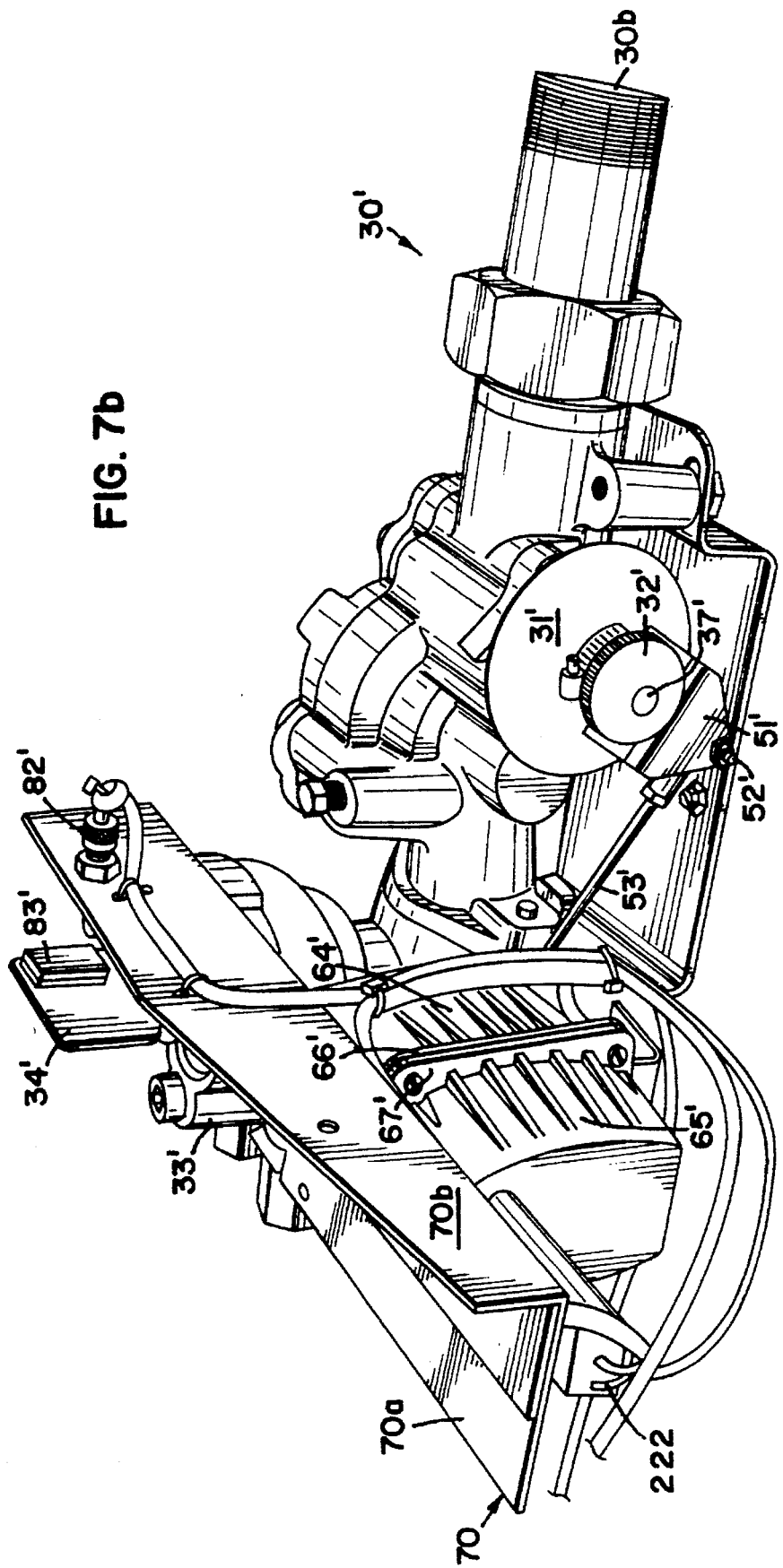

ELECTRONIC RATE METER CONTROLLER AND METHOD

CROSS REFERENCES

U.S. Pat. No. 5,260,875, issued to David S. Tofte on Nov. 9, 1993, is herein incorporated by reference.

FIELD OF THE INVENTION

The present invention relates to a system for the monitoring and control of farm implements, and more particularly to a controller, which can be used to automate control of anhydrous ammonia or other materials, through existing manually operated rate meters, in a stand-alone or network environment.

BACKGROUND OF THE INVENTION

Manually-controlled rate meters are commonly used to control the flow of materials, particularly liquids, through a system. One example of a system in which rate meters are utilized is a sprayer system in agricultural implements which apply fertilizers, pesticides, herbicides, and other agricultural chemicals ("agents") to fields.

One agent that has proven especially difficult to control with a manually-controlled rate meter is anhydrous ammonia (NH3). Nevertheless, commercial farmers have increasingly relied on applications of anhydrous ammonia as a source of nitrogen for their crops. Anhydrous ammonia is stored in a pressure vessel or nurse tank in its liquid form due to its own vapor pressure at its boiling point. Since anhydrous ammonia, as a liquid under pressure, vaporizes at approximately 28° F., it is difficult to measure and control.

A common sprayer system application of anhydrous ammonia is accomplished by a tractor pulling a tool bar with at least one manually-controlled rate meter for metering the flow of anhydrous ammonia into a plurality of knifed injectors. The tool bar is attached to a nurse tank housing the anhydrous ammonia and has connections to the nurse tank that allow the flow of anhydrous ammonia from the nurse tank through the manually-controlled rate meter on the tool bar.

The vapor pressure in the nurse tank provides the energy to move the anhydrous ammonia through the system. As liquid anhydrous ammonia moves through the system it experiences a pressure drop which results in a temperature drop and more vapor. The pressure drop, which causes vaporization, decreases the energy available to move the anhydrous ammonia, resulting in a lower application rate. In addition to vapor pressure changes, the application rate is also affected by changing vehicle speeds. When the vehicle moves faster, the same amount of anhydrous ammonia is applied over a larger area. When the vehicle slows down, the same amount of anhydrous ammonia is applied over a smaller area.

The lack of effective control of the application of anhydrous ammonia or other agents because of changing vehicle speed and changing system pressures results in either an over-application or an under-application of the agent. This can cause substantial reductions in crop-yields.

Several fully integrated metering control systems currently exist that allow for automatic compensation for speed and pressure changes. Examples of such devices include U.S. Pat. No. 5,170,820 issued to James S. Jones and U.S. Pat. No. 4,458,609 issued to David S. Tofte. U.S. Pat. No. 5,170,820 uses a throttling device, a ground speed sensor, an ammonia flow reader, and hardware that interfaces with existing microprocessors on the vehicle to send control signals to adjust the throttling device for controlling the application rate of anhydrous ammonia based on the sensed ground speed and sensed flow rate. U.S. Pat. No. 4,458,609 uses a heat exchanger attached to a flow control valve, a flow sensor and a control console, with automatic controls that can be responsive to the ground speed of the vehicle and the sensed flow rate of the anhydrous ammonia, for sending control signals to adjust the valve to the desired application rate of anhydrous ammonia.

Although these inventions address the problems encountered by an apparatus that uses manually controlled rate meters, they require replacement of the existing applicator equipment or extensive plumbing changes to be made to the applicator apparatus, which can be quite expensive. They do not, therefore, provide a practical solution to those farmers that currently use applicators having manually operated rate meters which need a simple controller that does not require plumbing changes and that provides automatic adjustments to the manually operated rate meters while in operation.

Two commonly used manually controlled rate meters for anhydrous ammonia include meters manufactured by Continental and sold under model number C4100 and B9500. These manually-controlled rate meters attempt to maintain a constant pressure of the anhydrous ammonia as it flows through the system. However, the mechanical rate meters respond slowly to changing air temperatures, which cause changing tank pressures. Low air temperatures cause the pressure in the nurse tank to drop, resulting in less energy to move the anhydrous ammonia through the system and hence, a lower application rate. In addition, the rate meter offer no compensation for any fluctuations in vehicle speed result in an inconsistent application rate per ground area covered.

Application rates for the Continental Meters are manually adjusted by the operator, by moving an external rate meter control device, typically a rotary dial, to set the application rate to a desired level of nitrogen per hour. The operator determines the nitrogen level setting by using a preprinted chart that indicates the appropriate nitrogen setting based on the vapor pressure in the nurse tank and the anticipated speed at which the vehicle will be moving. Another manually operated rate meter as disclosed in U.S. Pat. No. 4,364,409 issued to James S. Jones, has a calibration dial to set the application rate to a predetermined level of anhydrous ammonia per hour based on a choice of two different vapor pressures.

Although operators can calibrate manually controlled rate meters to compensate for vehicle speed and vapor pressure prior to application, manually controlled rate meters respond slowly to varying ambient air temperatures. Furthermore, manually-controlled rate meters do not automatically compensate for varying vehicle speeds nor do they allow for changes to the application rate. While the application rate as set by the operator may be accurate under constant temperature and speed conditions, such ideal conditions are rarely present. Temperature and speed fluctuations are routine in agricultural applications. In order to keep the application rate consistent when using manually controlled rate meters, the operator must stop the vehicle and manually adjust the rate meter control device as the temperature changes or the speed changes.

In addition to the need for a simple controller that allows automatic control of manually operated rate meters, there is a need to integrate the controller with other agricultural control systems. Typically, farm implements are controlled by the operator of the agricultural vehicle to which the implements are attached or coupled. For example, planting and spraying systems have evolved for controlling and monitoring planting and spraying implements, respectively. As is detailed in U.S. Pat. No. 5,260,875 filed Aug. 20, 1991, issued Nov. 9, 1993, and assigned to same assignee, which is hereby fully incorporated by reference, these systems have for the most part evolved separately.

U.S. Pat. No. 5,260,875 details the shortcomings of prior art integrated agricultural control systems, stating that such control systems still require a separate planting controller for planting systems and a spraying controller for spraying systems. Before U.S. Pat. No. 5,260,875, mechanisms for the sharing of information gathered during each operation or the incorporation of shared information to improve implement control were generally not available. The separation of the two functions means that either individual passes must be made through a field for planting, fertilizing and pesticide application or the application vehicle must be cluttered with a multitude of incompatible controller equipment, each with its own unique calibration, maintenance and operational needs.

Furthermore, separate cables must be routed from each system component to its associated controller. The result is a jumble of wiring and reduced system reliability. Sensors that are to be used by more than one system must by necessity be connected to each system. As the types of sensors used in spraying and planting increase in number and the sensors become more complex, the information they generate could be profitably shared by many applications, but cannot be shared without further increasing the complexity, and potential misconnection and other wiring problems, of wiring.

The 5,260,875 patent addresses this perceived need by providing a distributed controller system which uses a half-duplex serial line as a bus that can be used to transfer commands, status and data between all controllers in a planting and spraying system. A bus master connected to the serial line synchronizes each controller to the network while a base console coordinates the operation of each planting and spraying system and presents a simple, uniform user interface. Separate system controllers operate in conjunction with system accessory modules to control the components of each planting and spraying system.

In such systems, communication and control cabling for the components is simplified by terminating such cables at accessory modules located close to the components herein controlled. Data related to each component is then transferred from the accessory modules to the controllers on the single serial line.

This separation of the accessory modules from their associated controllers provided in the 5,260,875 patent leads to efficient and logical system partitioning. Accessory modules can be placed in close proximity to the components they control while base and subsystem controllers are placed close to the user. The result is an integrated network of controllers for the monitoring and control of an agricultural planting and spraying system. A system can be partitioned into one or more planting, spraying and monitoring subsystems with each subsystem controlled by a subsystem controller. A half-duplex serial communications network connects the subsystem controllers to each other and to a base console which coordinates the user interface. A bus master synchronizes message traffic on the network by periodically sending a synchronizing message to the controllers. In operation, each subsystem controller monitors traffic on the network to determine when to read data on the network and when to drive data onto the network. Data present on the network can be read by more than one controller at a time. This simplifies the sharing of information present on the network. What is needed is a way to bring the integration of the above system to anhydrous ammonia spraying systems.

SUMMARY OF THE INVENTION

The present invention addresses and resolves many of the shortcomings of prior art applicator systems by providing an electronic control system that can be used with existing applicator systems having manually controllable rate meters for controlling the rate of material being dispensed or applied by the applicator. The present invention particularly applies to agricultural applicators, both those which apply fluid materials and dry or granular materials, but is particularly useful for the application of anhydrous ammonia. As discussed above, the application of anhydrous ammonia is particularly sensitive to pressure changes within the applicator system, which can rapidly change with variances in environmental conditions such as the ambient air temperature. The invention is also particularly attractive to users and owners of existing applicator systems having manual rate meters, since the mechanical and electrical components of the present invention can be readily retrofitted to existing applicators without requiring replacement of their rate meters, changes to the plumbing of liquid applicators or any fundamental mechanical changes to dry material applicators. The principles of the present invention can be applied to applicators having any type of mechanically controllable rate meters, the most common of which are controlled by linear or rotary movement. Once applied to an existing mechanically controllable applicator, the present invention enables a single operator or user to pull the applicator behind a tractor or the like and to continuously make real-time changes to the rate meter setting without interrupting the application process and without leaving the cab of the tractor.

The present invention also is particularly applicable to automated control of the applicator's rate meter by using appropriate environment or parameter sensors such as a vehicle speed sensor, temperature sensors, pressure sensors, or the like. By setting a desired application rate into the electronic control apparatus of this invention, and by sensing changes in real-time parameters such as speed and temperature, the electronic control functions of the present invention automatically change the rate meter settings to accommodate real-time changes in the sensed parameters. The present invention is also particularly adaptable for use with larger integrated agricultural systems such as described in U.S. Pat. No. 5,260,875, and also readily accommodates applicator systems having multiple rate meters, either all of the same configuration or differing in configuration.

Thus, according to one aspect of the invention there is provided an electronic rate meter controller for operative connection to a manually-controllable rate meter for automatic control of the rate meter. An actuator means is provided for connection to a primary control member of the rate meter and for receiving electrical control signals that indicate the appropriate adjustments to the primary control member. An electronic control means is provided for electrical connection to the actuator and for providing the appropriate control signals to the actuator.

According to another aspect of the present invention constructed in the same way, it is provided that the electronic control means consists of processor means, memory means, user interface means, and actuator interface means. The processor means is connected to the memory means for accessing program code and data used in generating electrical control signals and used in generating status and control information. The processor means is connected to the user interface means for providing status and control information for display purposes related to the application of material whose flow is metered by the rate meter, and for receiving user input information for enabling remote user control of the rate meter. The processor means and the actuator means are connected to the actuator interface means which conditions and transmits the electrical control signal from the processor means to the actuator means, and which conditions and transmits an actuator status signal from the actuator means to the processor means.

According to a yet another aspect of the present invention constructed in the same manner, one or a plurality of sensor means are provided for sensing certain changing outside parameters and for generating electrical sensor signals to the electronic control means indicative of the sensed parameter(s). Such sensors may include ambient air temperature, vehicle speed, or system pressure. The present invention can use such sensors in any combination, and is not limited to these particular sensors. For each sensor means, a corresponding program means is provided for execution by the processor means, responsive to the appropriate electrical sensor signal, for generating an electrical control signal to the actuator means adjusted for the sensed parameter. In one embodiment of the invention, if multiple sensors are used with the rate meter controller, the corresponding program means is executed by the processor means, responsive to all of the associated sensors, for generating an electrical control signal to the actuator means adjusted for all of the associated sensed parameters.

According to a further aspect of the present invention constructed in the same manner, a run/hold sensor means is provided for sensing an on state or an off state of the rate meter and for sending an electrical signal indicative of the state of the rate meter to the electronic control means. A corresponding program means is provided for execution by the processor means for computing the total area over which material metered by the rate meter was applied.

According to yet a further aspect of the present invention constructed in the same manner, an actuator feedback means, electrically connected between the electronic control means and the actuator means, is provided for generating an actuator status (or feedback) signal representing the real-time position of the primary control member and for transmitting the actuator status signal to the electronic control means. A corresponding program means is further provided for execution by the processor means for displaying on the user interface means a representation of the real-time calibration setting of the rate meter.

In accordance with another aspect of the present invention, a system for managing a plurality of agricultural devices is provided. In one configuration, the system includes a user interface means for displaying status and control information associated with the agricultural devices and for receiving user input information controlling operation of the agricultural devices. The system also includes an electronic integrated system control means, electrically connected between the user interface means and the agricultural devices, for identifying each agricultural device to be managed, for storing program code and data, for accessing stored program code and data associated with each identified agricultural device, for receiving user input information from the user interface means, for generating electrical control signals controlling the agricultural devices, and for providing status and control information to the user interface means. One subsystem of the electronic integrated system control means is a rate meter controller, for operative connection to a manually-controllable rate meter for automatic control of the rate meter. An actuator means is provided for connection to a primary control member of the rate meter and for receiving an electrical control signal that indicates the appropriate adjustment to the primary control member. An electronic control means is provided for electrical connection to the actuator for providing the appropriate electrical control signals to the actuator, and for communicating with other control devices within the integrated system.

In accordance with yet another aspect of the present invention a method is provided for controlling an applicator connected rate meter to control the flow rate of material through the rate meter. The rate meter is of a type that has a manually adjustable primary control member that changes the flow rate of material through the rate meter when adjustably moved. The method includes the steps of sensing changes in at least one parameter; providing an electrical input signal in response to the sensed parameter changes; electronically providing a control signal, that varies in real-time with changes in the sensed parameters, in response to said electrical input signal; converting said control signal to a calibrated mechanical force; and automatically moving the primary control member in response to the calibrated mechanical force, thereby changing the flow rate of the rate meter in real-time response to changes in said parameters.

In accordance with a further aspect of the present invention a method of retrofitting an applicator apparatus for control by an electronic control means, without altering the plumbing or material applicator portions of the system, is provided. The applicator apparatus is of a type having a manually controllable rate meter with a primary control member that controls the rate of material flow through the applicator apparatus system by adjustment to the primary control member. The method includes the steps of providing an electronic control means that produces an electrical control signal that characterizes the desired user real-time control of the rate meter; providing an actuator that responds to the received electrical control signal and produces a calibrated mechanical output force; operatively connecting the electronic control means with the actuator for transmitting the electrical control signal to the actuator; securing the actuator in operative proximity to the primary control member of the rate meter; and operatively connecting the primary control member to move in response to the calibrated mechanical output force.

While the present invention is described in association with a particular type of rate meter the invention is not limited to the use of such rate meters described. Further, while the invention is described with respect to its use in applying anhydrous ammonia, it will be understood that the principles of the invention apply equally well to any type of liquid or dry material whose flow is controlled by a manually controllable rate meter. In addition, while the invention is described with respect to a magnetic speed sensor, it will be understood that various other types of speed sensors may be effectively utilized within the principles of the present invention. Also, while the invention assumes the use of ambient air temperature sensors, it is understood, and described, that pressure sensors may be utilized in place of or in addition to the temperature sensors for compensating for system pressure. While the invention assumes the use of two identical rate meters within a particular applicator apparatus, it will be understood that the principles of the present invention permit the use of one or a plurality of rate meters, either being of the same or of different type. Finally, while the invention is described in relation to a rate meter for a typical anhydrous ammonia applicator system, the invention is not limited to such applicator systems and it will be known that the invention applies to other types of dispensing systems, such as a direct injection system or the like. These and other features of the invention will become apparent to those skilled in the art upon a more detailed description of a preferred embodiment of the invention.

BRIEF DESCRIPTION OF THE DRAWING

Referring to the Drawing, wherein like numerals represent like parts throughout the several views:

FIGS. 7(a) and 7(b) are perspective views from different angles of an actuator and a second embodiment of its associated housing and brackets of the electronic rate meter controller of FIG. 2, illustrated as operatively connected to control a model B9500 Continental rate meter;

DETAILED DESCRIPTION OF THE PREFERRED EMBODIMENTS

The present invention is preferably utilized in an agricultural sprayer system for applying anhydrous ammonia that utilizes a rate meter such as the Continental Meter C4100 or the Continental Meter B9500 for attempting to maintain a constant pressure of anhydrous ammonia, and thus a constant application rate, as it flows through the rate meter. However, one skilled in the art will appreciate that the principles of the present invention may be applied to other types of liquid applicators or dry material applicators whose application rates can be manually controlled by an existing rate meter.

Figure 1:
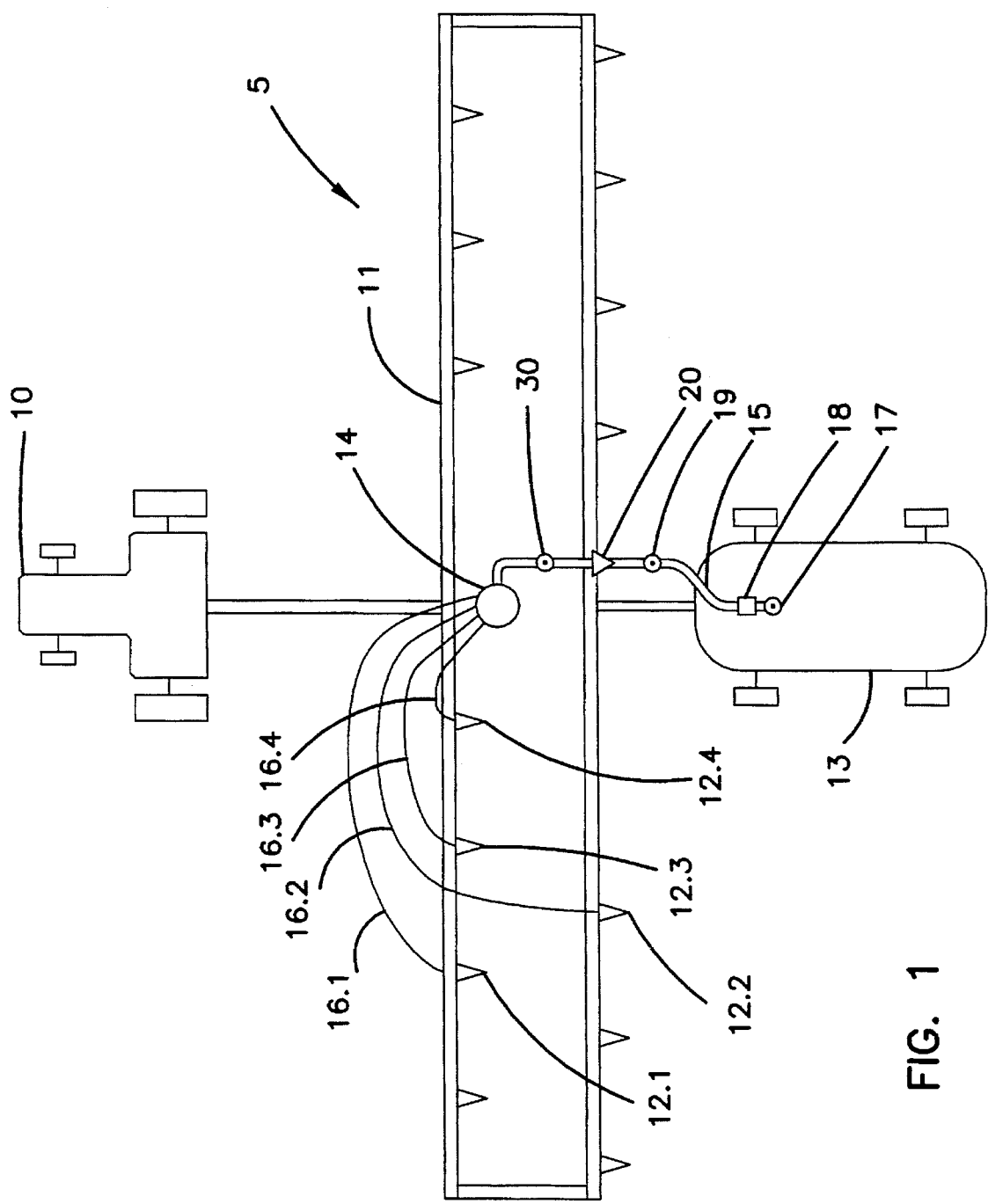
FIG. 1 is a plumbing diagram representative of a typical anhydrous ammonia agricultural applicator apparatus, illustrating a typical rate meter as a part thereof.

A typical agricultural anhydrous ammonia applicator apparatus 5 is shown in FIG. 1. A tractor 10 is connected to pull a tool bar 11 for transporting the tool bar 11 across a field. Multiple applicator knives 12 are attached to the tool bar 11 for applying the anhydrous ammonia to the ground. The tool bar 11 is operatively connected to and tows a nurse tank 13, which houses and supplies the anhydrous ammonia. Appropriate plumbing generally illustrated at 15 connects the nurse tank 13 to a manifold 14. The manifold 14 has the proper number of pipes or tubes 16 to connect the manifold 14 to the multiple applicator knives 12. For clarity, only several of the applicator knives 12.1, 12.2, 12.3, 12.4 and pipes or tubes 16.1, 16.2, 16.3, 16.4 are respectively shown connected in FIG. 1. Disposed in the nurse tank 13 and initiating the flow of ammonia from the nurse tank 13 is a withdrawal valve 17. The withdrawal valve 17 is operatively connected in series to a hose connection 18, a hose valve 19, a safety coupler 20, a rate meter 30 and the appropriate intermediate plumbing 15 to the manifold 14.

It will be appreciated by those skilled in the art that multiple rate meters 30 of the same or varied configurations can be used with such applicators. In most primitive applicator apparatuses the rate meter could simply be a metering valve. In more sophisticated systems, the rate meter may itself be capable of some automated adjustments to compensate for such variables as ambient air temperature or other variable parameters. In a direct injection system, for applying liquid substances not necessarily anhydrous ammonia, the rate meter may be simply an adjustable orifice with a T-bar or other mechanism that allows manual adjustment. Large applicators often simultaneously require several rate meters to accommodate the desired application volume of anhydrous ammonia that is applied to the field.

The rate meter(s) 30 of the prior art generally allow an operator to manually set the application rate of the anhydrous ammonia in pounds of nitrogen per hour, but do not have automated adjustment capabilities that allow for automatically changing the application rate in response to real-time changes in parameters such as ambient temperature and tractor speed. The rate meter 30 helps to maintain the anhydrous ammonia at a constant pressure when it flows through the applicator apparatus 10. Although the rate meter 30 allows the operator to manually set the application rate of anhydrous ammonia, rate meters 30 generally respond slowly to changing tank pressure which can result, for example, from changing ambient air temperature. The colder the day, the lower the pressure and the greater the percentage of vapor in the system. Thus, the colder the day, the less energy that will be available to move the anhydrous ammonia through the system. The slow, and sometimes inaccurate response by known rate meters 30 to the lower tank pressure caused by lower ambient air temperature, can result in an under-application of the anhydrous ammonia. Alternatively, as the ambient air temperature increases, the tank pressure rises, providing more energy for moving the liquid anhydrous ammonia through the system. If the rate meter 30 slowly or inaccurately compensates for such increased tank pressure, over-application of the anhydrous ammonia can result.

Rate meters of the prior art typically do not compensate for ground speed changes by the tractor 10. If the tractor increases its speed, the applicator apparatus 5 will continue to apply the same amount of anhydrous ammonia, but the tractor will be covering a larger amount of ground. Thus, increased tractor speed will result in under-application of the anhydrous ammonia. Alternatively, as tractor speed decreases, the application rate of anhydrous ammonia continues at its preset rate, but the tractor will cover less ground. Therefore, decreased tractor speed typically results in an over-application of anhydrous ammonia. Such manually-adjustable rate meters 30 do not automatically compensate for tractor speed changes.

The tractor operator does have the option of manually adjusting the rate meter 30 to compensate for changing air temperatures and changing vehicle speeds. However, in order to do this, the operator, if alone, must stop the tractor 10 and manually adjust the rate meter 30. It is time consuming and virtually impossible for the operator to maintain a consistent application rate using this procedure. Furthermore, this procedure exposes the operator to the elements every time he or she has to adjust the rate meter 30. This problem is exacerbated if the operator has two or more rate meters 30 on the applicator apparatus 10. Alternatively, two or more operators can be used for the application process, one to drive the tractor 10 and one or more to continuously adjust the rate meter(s) 30. However, this procedure is extremely inefficient and generally not practical.

While the prior art has attempted to address the need to compensate for changing ambient air temperatures and vehicle speeds when applying anhydrous ammonia, such prior art generally requires the farmer to discard parts of his or her anhydrous ammonia applicator apparatus 5, specifically, parts of, or the entire rate meter portion of the system. The farmer must also make plumbing changes to the applicator apparatus 5 in order to accommodate the prior art systems which compensate for temperature changes and vehicle speed changes. In addition, the cost of replacing existing rate meters 30 with prior art systems that automatically compensate for temperature changes and vehicle speed changes is often prohibitive. Thus, the operator is by necessity often left with the undesirable option of continuing to use his existing rate meter(s) 30 and periodically of manually adjusting them in an attempt to compensate for temperature changes and vehicle speed changes in order to attempt to maintain a consistent anhydrous ammonia application rate.

The present invention addressed the above shortcomings of prior art applicators for anhydrous ammonia and other substances which require real-time adjustment of the substance application rate in response to continuously changing parameters that directly affect the application rate. The present invention provides an automated electronic meter control system that an operator can use with his existing applicator system, without requiring him to discard portions of his system (such as existing rate meters) and which requires no plumbing changes to be made to the system. The present invention simply retrofits to the operator's existing system and continuously controls and adjusts the application rate in response to changing conditions (such as ambient temperature and tractor speed), by continuously changing the application rate setting of the existing system's rate meter(s) in response to sensed signals representative of such changing conditions. As will become apparent upon a more detailed description of the invention, the principles of the present invention may be used with application systems having any type of manually-adjustable rate meters, and may be used to simultaneously control a plurality of rate meters of the system. In particular, while not described herein, the present invention may be used with the previously mentioned direct injection system, for applying liquid substances not necessarily anhydrous ammonia. The rate meter of the direct injection system may be simply an adjustable orifice, which the present invention controls by operative connection to a manually-adjustable T-bar or other mechanism.

Although the embodiments described herein assume that multiple rate meters used in the applicator apparatus will be of the same type, the principles of the present invention are broad enough to cover a controller that simultaneously controls the operation of different types of rate meters. Further, the present invention can be readily applied to "integrated" agricultural systems such as disclosed in U.S. Pat. No. 5,260,875, which as previously noted is herein incorporated by reference.

Figure 2:
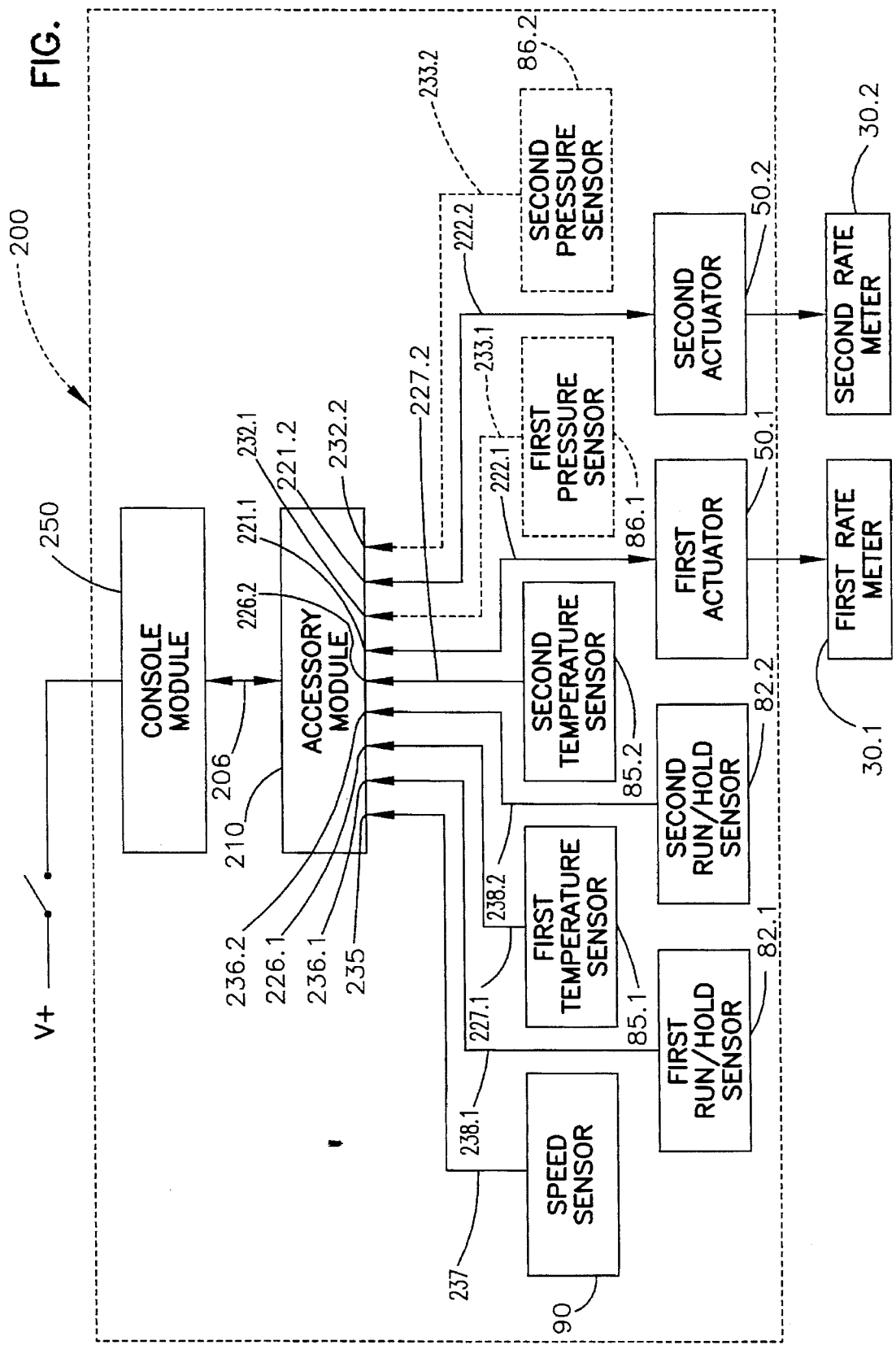
FIG. 2 is a functional block diagram of a first embodiment of an electronic rate meter controller of the present invention illustrating its applicability to controlling two different rate meters.

A preferred embodiment of an electronic rate meter controller configured according to the principles of the present invention is illustrated at 200 in FIG. 2. The rate meter controller 200 is configured for use in simply retrofitting an applicator apparatus 10 of the type shown in FIG. 1, and is applicable to such systems that employ one or a plurality of rate meters 30. The controller 200 generally includes an accessory module 210 connected to a console module 250 by means of a signal flow path or bus 206. As will be readily understood by those skilled in the art, the terminology "signal flow path" is generally used to refer to an operative communication path between components, whether electrical or mechanical, wherein such signal flow path may represent a single wire, a plurality of wires, a signal bus, a conduit or mechanical linkage, or the like.

The accessory module 210 includes a speed input port 235 for receiving an electric input signal by means of a speed signal flow path 237 from a speed sensor 90. The accessory module 210 can accommodate a plurality of rate meters 30, as previously described, each having associated therewith an identifiable actuator 50 for adjustably controlling the volume flow setting of the corresponding rate meter 30. In the preferred embodiment of the invention, and for simplicity of description, the accessory module 210 and the present invention will hereinafter be described as operatively controlling only two actuators 50.1 and 50.2, which are operatively connected to two rate meters 30.1 and 30.2 respectively. Accordingly, the accessory module 210 has two actuator control and feedback output/input ports 221.1 and 221.2 for sending control signals to and for receiving feedback signals from the actuators 50.1 and 50.2 by means of control and feedback signal flow paths 222.1 and 222.2 respectively. The accessory module 210 further has two temperature input ports 226.1 and 226.2 operatively connected to receive sensed temperature signals from a pair of temperature sensors 85.1 and 85.2 by means of temperature signal flow paths 227.1 and 227.2 respectively. The temperature sensors 85.1 and 85.2 each provide a sensed temperature associated with a nurse tank 13 and correspond respectively to one of the actuators 50.1 and 50.2. The accessory module 210 also has two "run/hold" input ports 236.1 and 236.2 respectively connected by means of run/hold signal flow paths 238.1 and 238.2 for receiving signals from a pair of run/hold sensors 82.1 and 82.2 respectively. Additional input signals may be provided to the accessory module 210 to provide other appropriate information applicable to control of the rate meters, such as pressure information. Such alternative input signals are represented in FIG. 2 by the dashed pressure sensors 86.1 and 86.2, which communicate to pressure input ports 232.1 and 232.2 of the accessory module 210 by means of pressure signal flow paths 233.1 and 233.2 respectively. Those skilled in the art will readily recognize other possible input parameters and appropriate sensors suitable for accomplishing the function of providing sensed input signals to the accessory module 210.

The controller 200 and related input and output functions illustrated in FIG. 2 are configured for mounting on a tractor and/or the trailing applicator apparatus, generally of the type illustrated in FIG. 1. Power for the controller 200 and other electrical components in the system is generally designated by (V+). It will be understood that the (V+) designation generally represents whatever appropriate voltage is required for energizing the various circuit components throughout the system. In FIG. 2 the power (V+) is illustrated as connected to the console module 250, and can be provided by means of a battery which can also be the battery servicing the tractor 10. While it is not shown, it will be readily understood by those in the art that, in addition to providing power and ground to the console module 250 and its associated electrical circuitry, appropriate power and ground are also provided to all other electrical circuitry within the controller 200, including the accessory module 210, the actuators 50, and all sensor inputs, by means of a signal flow path or bus, with appropriate cabling. In addition, the accessory module 210, the console module 250 and the actuators 50 have the necessary voltage regulators, filtering, and network protection circuitry required for operating all of the electrical components within the controller 200, details of which will not be provided herein, but which are clearly understood by those skilled in the art.

In the preferred embodiment, the console module 250 is configured for mounting on the tractor 10 so as to be readily accessible to the tractor's operator during the application process. The accessory module 210 is configured in the preferred embodiment for mounting to the applicator apparatus being towed by the tractor, and preferably on the tool bar 11 or to the nurse tank 13 or its supporting structure. The console module 250 and accessory module 210 are operatively connected to one another by means of appropriate cabling and/or connectors which comprise in part the bus 206. The speed sensor 90 is operatively mounted to a non-driven wheel of the system, and in the preferred embodiment, preferably to a front wheel of the tractor 10. The temperature sensors 85 are preferably mounted adjacent the rate meters 30 or nurse tanks 13 which they service, so as to accurately reflect the ambient temperature to which the anhydrous ammonia within the tanks and/or their associated plumbing 15 is subjected. The run/hold sensors 82 are operatively mounted to the rate meters 30 with which they are respectively associated, to provide an indication status of the operative mode of the rate meters 30. The actuators 50 are configured for mounting to the respective rate meters 30 which they are to control, as hereinafter described in more detail. In the preferred embodiment, the signals received by the accessory module 210 from the speed sensor 90 and the run/hold sensors 82 are typically digital in nature; whereas those signals associated with the temperature sensors 85, the pressure sensors 86 and the actuators 50 are generally of an analog nature, as is discussed in more detail hereinafter.

Figure 3B:
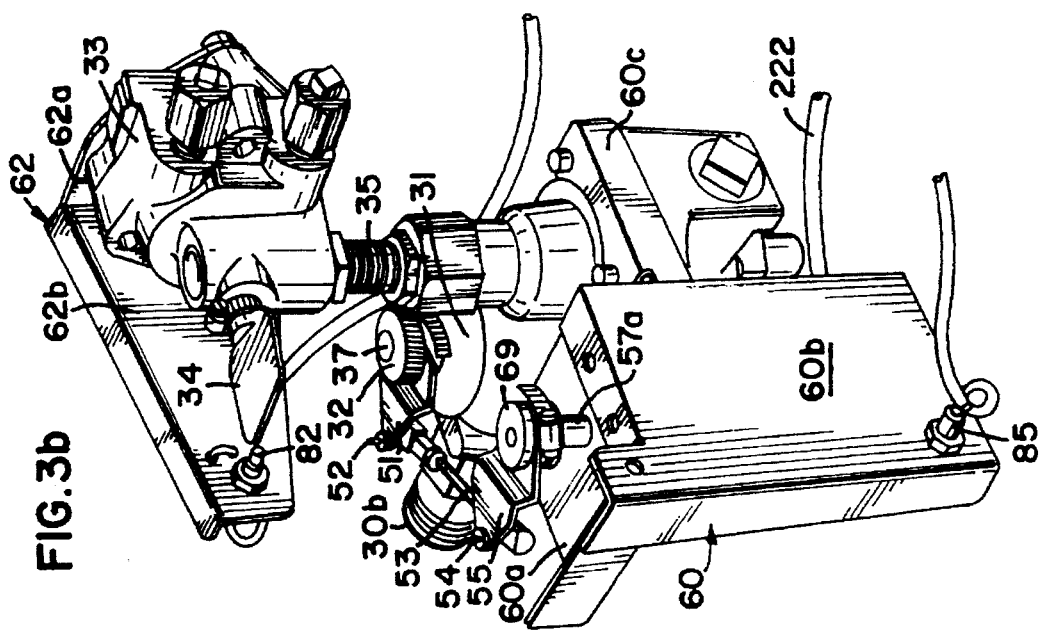
FIGS. 3(a) and 3(b) are perspective views from opposite sides of an actuator and a first embodiment of its associated housing and brackets of the electronic rate meter controller of FIG. 2, illustrated as operatively connected to control a model C4100 Continental rate meter.
Figure 3A:
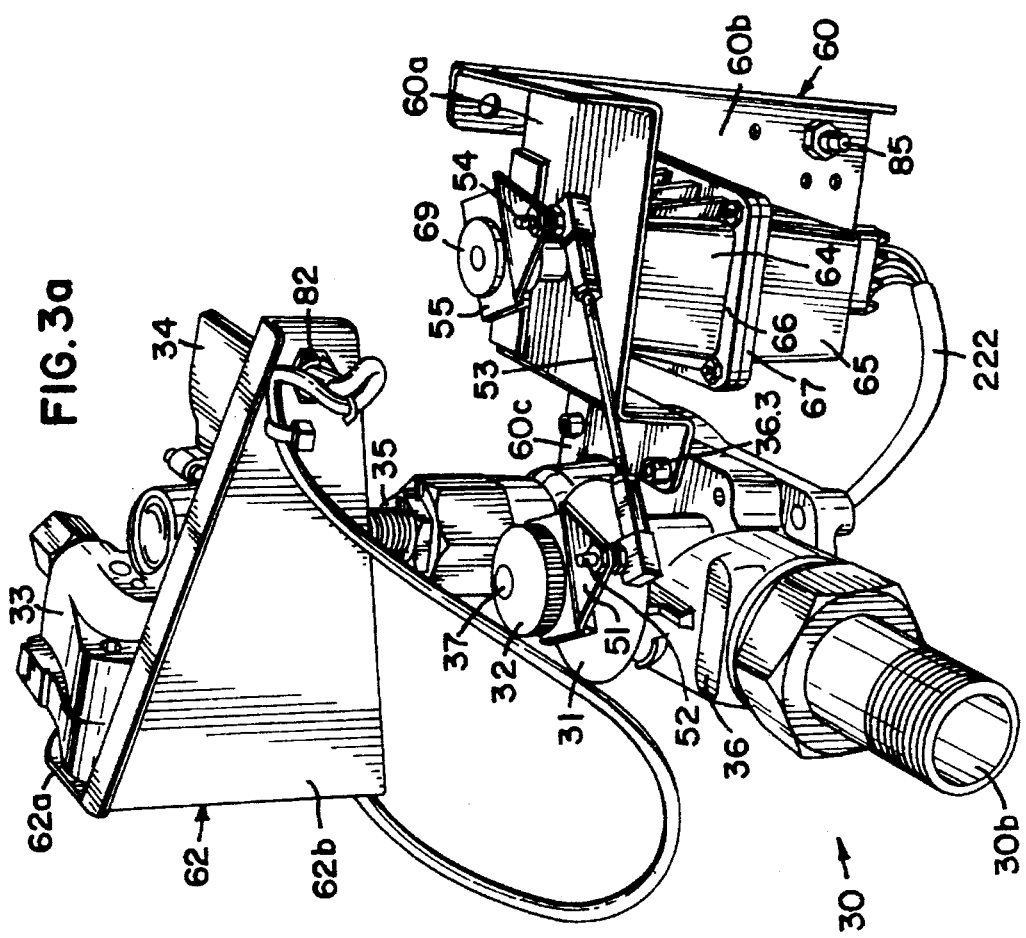

The actuators 50 convert control signals received from the accessory module 210 into mechanical forces that controllably rotate manual rate adjustment valves (not shown) of the rate meters 30 to which the actuators are operatively mechanically connected. FIGS. 3–6 collectively illustrate the mechanical connections of one embodiment of the present invention to a first rate meter 30. The rate meter 30 shown in FIGS. 3(a) and 3(b) is representative of a model C4100 meter manufactured and sold by Continental NH$_3$ Products Co., Inc., of Dallas, Tex., which is a popular rate meter used in agricultural applicators for anhydrous ammonia. The rate meter 30 has a housing 36 for directing fluid flow therethrough generally extending between an inlet port 30a and an outlet port 30b (shown in FIG. 6). That portion of the rate meter housing adjacent the inlet port defines a hydraulic valve 33 that is selectively operable to fully open and close fluid flow through the rate meter 30. The hydraulic valve 33 is operatively connected to an externally extending first hydraulic valve flag 34 which is physically rotatable to indicate an "opened" or "closed" condition of the hydraulic valve 33. The hydraulic valve flag 34 is a flat, generally square-shaped piece of material that rotates 90 degrees with the valve 33 movement.

Fluid flows through the hydraulic valve 33 and conduit 35 to the metering portion, generally designated at 36, of the rate meter 30. The metering function of the rate meter 30 is internally performed by means of a movable element or elements (not shown) that accurately regulate the instantaneous volume of fluid flowing through the rate meter 30 in response to rotatable movement of a meter shaft, generally indicated at 37. The meter shaft 37 is manually rotatable about its axis to enable accurate manual control of the volume of anhydrous ammonia flowing through the rate meter 30, and therefore, enables control of the application rate for anhydrous ammonia by the applicator system. A rotary calibration dial 31 is fixedly secured to the meter shaft 37 external of the housing 36, and rotates with the meter shaft 37 to provide for precise manual angular movement and positioning of the meter shaft 37, thereby enabling precise manual control of the metering flow of ammonia through the rate meter 30. A circular upper knob 32, sized for ease of gripping is also fixedly secured to the meter shaft 37 near its top end and axially spaced from and above the rotary calibration dial 31, and permits an operator to apply the mechanical forces necessary to rotate the meter shaft 37 to its desired rate of application position.

Figure 4:
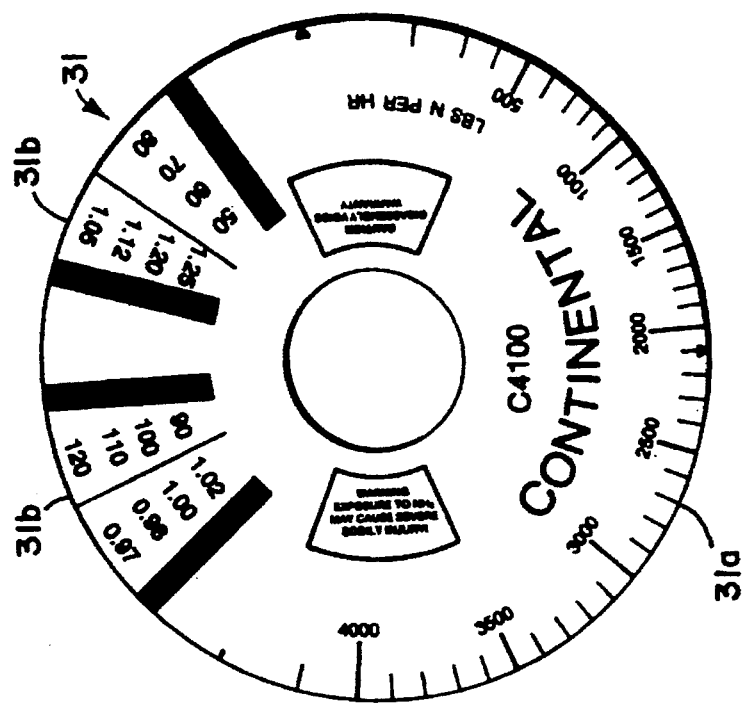
FIG. 4 is an enlarged view of the rotary calibration dial portion of the rate meter of FIG. 3.

An enlarged view of the rotary calibration dial 31 of the model C4100 Continental rate meter is illustrated in FIG. 4, wherein the calibration settings are depicted at 31a. The calibration settings 31a on the rotary calibration dial 31 correspond to different sizes of an orifice (not shown) defined inside the rate meter housing 36 as determined by the rotational position of the meter shaft 37. The calibration settings 31a are shown in increments of 100 pounds of nitrogen per hour, up to 4100 pounds of nitrogen per hour. The rotary calibration dial 31 also contains a pressure multiplier table 31b based on pressure in the system with which the rate meter 30 is used. Additional information on the model C4100 rate meter can be obtained by reference to the published product specification and assembly/disassembly sheets available from the manufacturer, Continental NH₃ Products Co., Inc., for this meter, which are hereby incorporated by reference to the extent that they may be required for a more detailed understanding of the meter.

Referring to FIG. 3(a), the actuator 50 is generally indicated as having upper and lower housing portions 64 and 65 respectively that are bolted together at their respective housing rims 66 and 67 to define an internal cavity (not shown) that houses a servo motor 57 and its associated drive and interface circuitry, hereinafter described in more detail. Electrical power and communication are provided to the servo motor 57 and circuits within the actuator 50 by means of the signal flow path wiring harness 222. The servo motor 57 is secured within the actuator housing cavity and has a movable shaft 57a extending for rotation through the upper housing portion 64, as best illustrated in FIG. 3(b). A circular upper knob 69, fixedly secured to the servo motor shaft 57a near its top end, rotates with the servo motor shaft 57a and is constructed such that it permits the connection of a hose clamp or compression-type clamp.

The present invention contemplates placement and mounting of the actuator 50 of the invention to and/or in close proximity to the rate meter 30 such that its servo motor 57 can be operated to accurately control movement of the rate meter shaft 37. To achieve this end, the preferred embodiment uses a bracket configuration specifically designed to accommodate and mount the actuator 50 for connection to the rate meter 30.

The actuator bracket 60 has an upper, generally horizontal plate portion 60a and a downwardly, generally vertical plate portion 60b. Plate portions 60a and 60b are welded together to form a rigid structural support (see FIG. 5(b)). The upper housing portion 64 of the actuator 50 is firmly bolted to the upper plate portion 60a of the bracket 60 by means of a plurality of threaded bolt members extending through holes 60a.1, 60a.2, 60a.3 and 60a.4 (see FIG. 5(b)) formed in the upper plate 60a. The upper plate 60a has a circular opening 60a.5 (see FIG. 5(a)) therethrough that coaxially aligns with and is sized large enough to allow free movement of the rotatable servo motor shaft 57a when so secured. The upper plate portion 60a includes an L-shaped mounting flange 60c having three mounting holes 60c.1, 60c.2 and 60c.3 formed therethrough. FIG. 5(b) illustrates mounting of the actuator bracket 60 to the rate meter 30. The L-shaped mounting flange 60c of the actuator bracket 60 is fastened to the housing 36 of the rate meter 30 by fastening three screws 61.1, 61.2 and 61.3 through the three mounting holes 60c.1, 60c.2 and 60c.3 respectively and into three cooperatively aligned threaded holes 36.1, 36.2 and 36.3 (hole 36.3 generally designated in FIG. 5(a)) in the housing 36.

Movement of the rate meter shaft 37 in response to movement of the servo motor shaft 57a is accomplished by means of a mechanical linkage assembly, illustrated in FIGS. 3 and 5. Referring thereto, a rate meter coupler member 51 is mechanically secured to the shaft 37 for rotation therewith between the rotary calibration dial 31 and the upper knob 32. In the preferred embodiment, the rate meter coupler member 51 is secured to the rate meter shaft 37 by means of a hose clamp or compression-type clamp connector that prevents slippage between the clamp and rate meter shaft 37 when securely fastened. The unsecured, distal end of the rate meter coupler member 51 has a receptor hole formed therethrough to accept a pivotal pin connector assembly 52. A similar coupler member, referred to as the motor coupler member 55, is secured to the circular upper knob 69 of the actuator rotating servo motor shaft 57a (in manner similar to that described for the rate meter coupler member 51) for rotation therewith, and at a position above the general plane of the upper plate portion 60a. The unsecured, distal end of the motor coupler member 55 has a receptor hole formed therethrough to accept a pivotal pin connector assembly 54. The rate meter coupler member 51 secured to the rate meter shaft 37, and the motor coupler member 55, secured to the circular upper knob 69 of the servo motor shaft 57a, are unimpeded by other obstructions and are generally positioned in the same plane to allow cooperative rotation of the respective shafts 37 and 57a to which they are attached. An actuator arm linkage rod 53 is connected at its opposite ends to the coupler members 51 and 55 through the holes in their distal ends by means of the pin connector assemblies 52 and 54 respectively, that allow the ends of the rod 53 to freely pivot about the vertical axes of the pin assemblies 52 and 54 relative to the distal ends of the coupler members. Therefore, as the servo motor shaft 57a turns, the motor coupler 55 rotates therewith, causing the actuator arm linkage rod 53 to move and to transmit a force to the rate meter coupler 51, causing its attached rate meter shaft 37 to rotate by a corresponding amount, thereby changing the application rate calibration setting and application rate of the rate meter 30. Precise control of the rate meter 30 can thus be achieved by precisely controlling energization of the servo motor 57 and resultant movement of its shaft 57a.

It will be appreciated by those skilled in the art that the mechanical coupling and control by the servo motor 57 of the rate meter could also be accomplished wherein the rate meter embodiment comprised an independently operable rate meter control device having an embodiment other than a rotary calibration dial, secured to and rotated by a rotatable meter shaft. For example, the rate meter controller could be operatively connected to a meter having a linear calibration lever assembly or a T-bar assembly.

Figure 6:
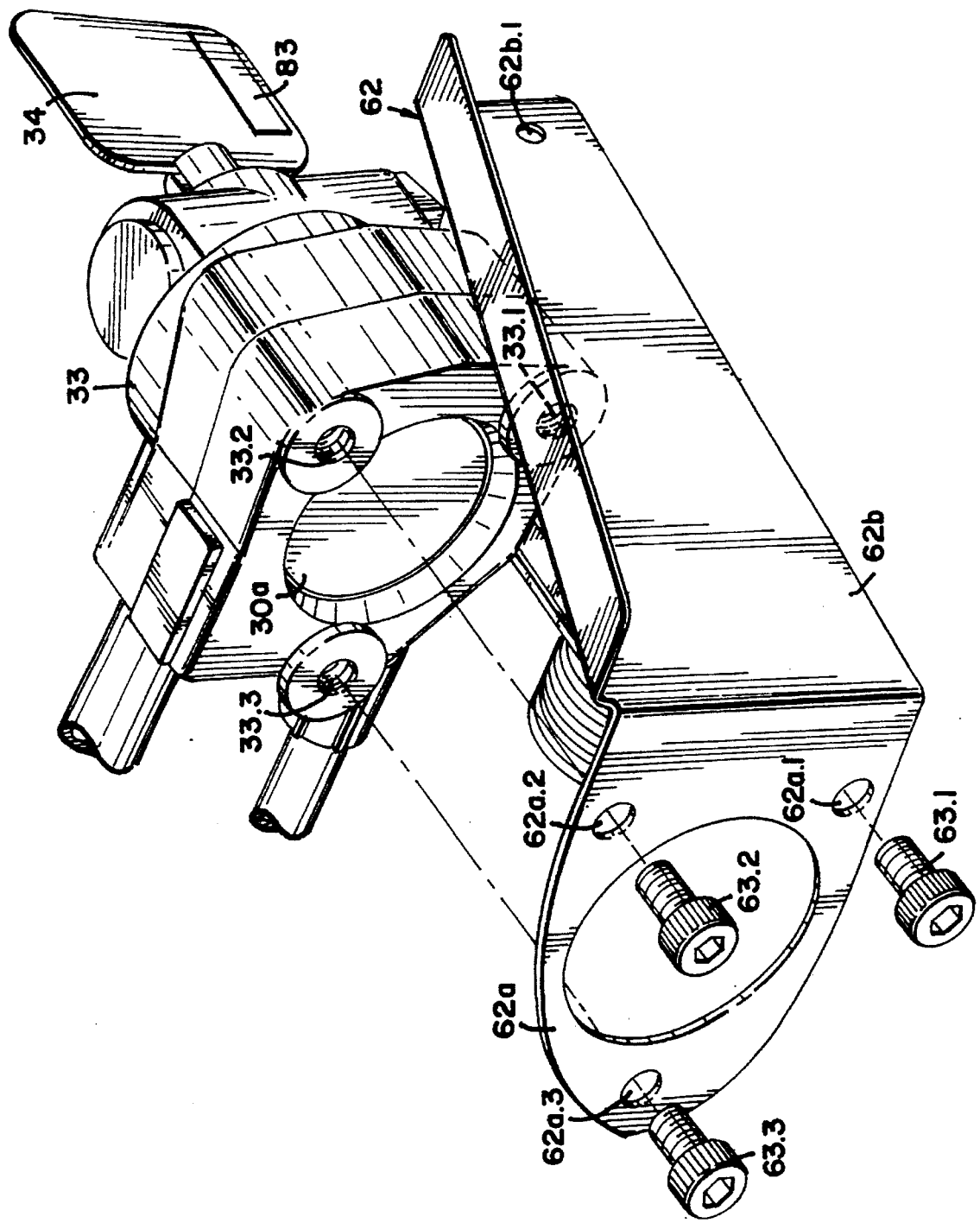
FIG. 6 is an exploded view of a run/hold sensor bracket portion of the first actuator of FIG. 3, illustrated in operational relation to the run/hold sensor portion of the meter and vertically rotated with respect to FIG. 3.

As shown in FIG. 6, the invention also includes a run/hold sensor bracket 62 configured for mounting to the hydraulic valve portion 33 of the rate meter 30. The base portion 62a of the run/hold sensor bracket 62 is bolted to the hydraulic valve 33 by fastening three screws 63.1, 63.2 and 63.3 through three spaced holes 62a.1, 62a.2, and 62a.3 respectively, located in the base portion 62a of the run/hold sensor bracket 62, and into three aligned threaded holes 33.1, 33.2 and 33.3 respectively in the hydraulic valve housing. The upwardly extending portion 62b of the run/hold sensor bracket 62, oriented for addressing the hydraulic valve flag member 34, allows the flag member 34 to move freely without contact with the run/hold sensor bracket 62. A magnet 83 is attached to a corner of the hydraulic valve flag 34 as shown in FIG. 6. FIGS. 3(a) and 3(b) show the run/hold magnetic sensor 82 mounted through a hole 62b.1 (see FIG. 6) located in the upwardly extending portion 62b of the run/hold sensor bracket 62, near and in alignment with the hydraulic valve flag 34 to sense rotational movement of the valve flag 34.

The temperature sensor 85 is illustrated in FIGS. 3(a) and 3(b). In the preferred embodiment, the temperature sensor 85 is mounted through a hole 60b.1 located in the actuator bracket 60 near one edge thereof, as shown in FIGS. 5(a) and 5(b).

Figure 5A:
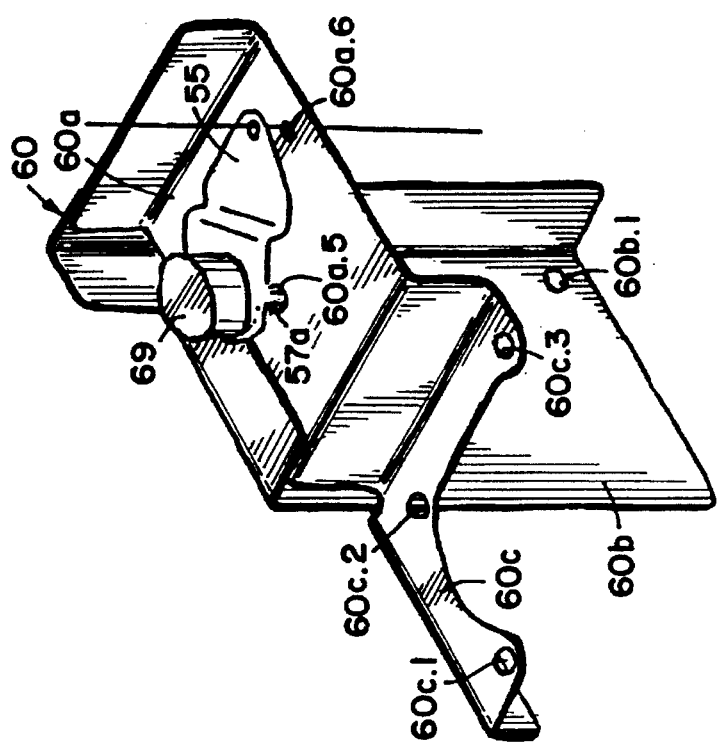
FIG. 5(a) is an exploded view of the actuator bracket portion of the actuator of FIG. 3.
Figure 5B:
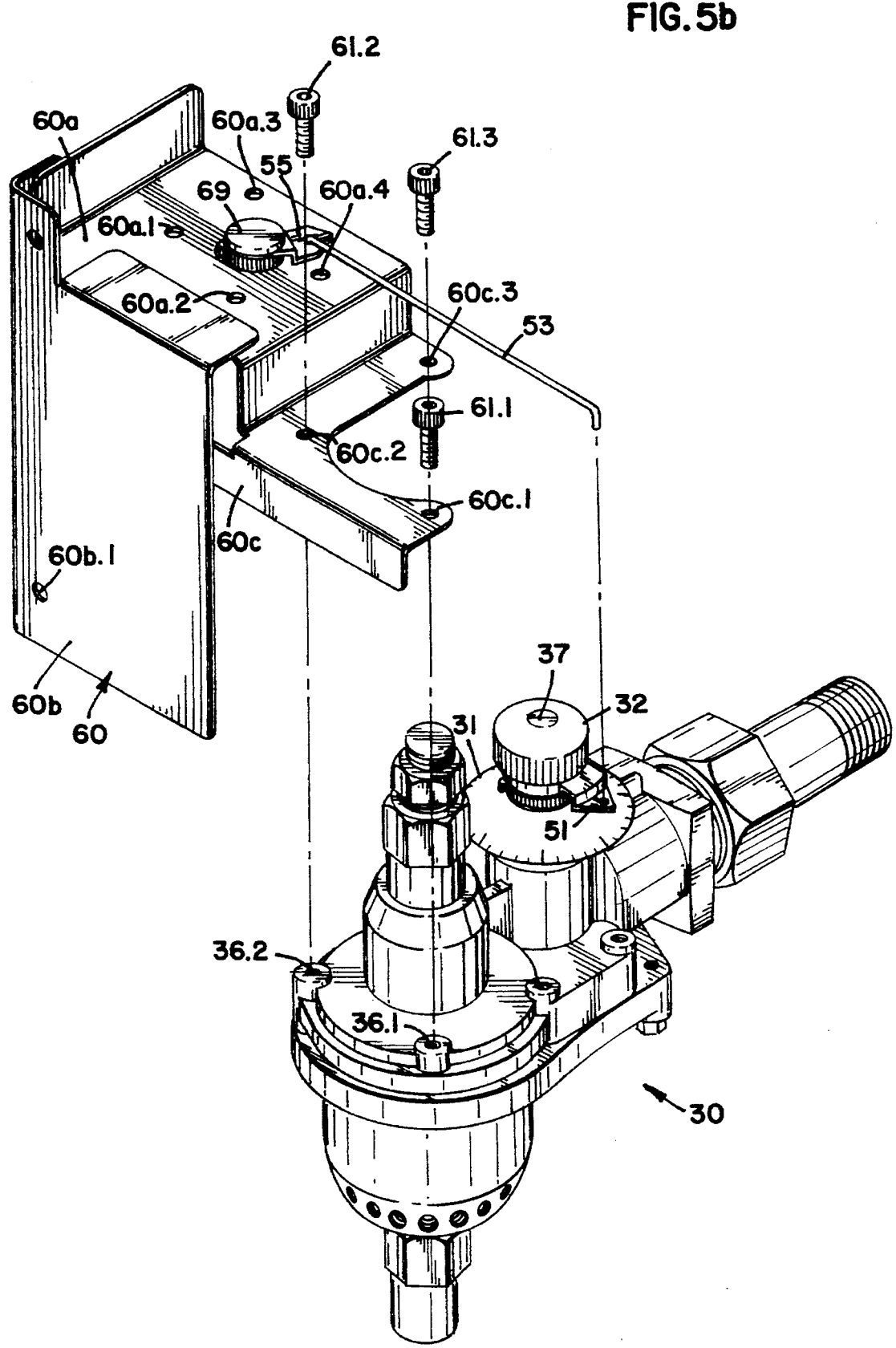
FIG. 5(b) is an exploded view of the actuator bracket portion of the actuator of FIG. 3, illustrated in operational relation to the rate meter and horizontally rotated relative to FIG. 3.

FIG. 5(a) also shows an actuator bracket calibration hole 60a.6 located in the upper plate portion 60a of the actuator bracket 60. In the preferred embodiment, during calibration of the electronic rate meter controller 200, the pivotal pin connector assembly 54 must be aligned with the actuator bracket calibration hole 60a.6, in order to properly position the angular rotation of the servo motor shaft 57a.

Figure 8:
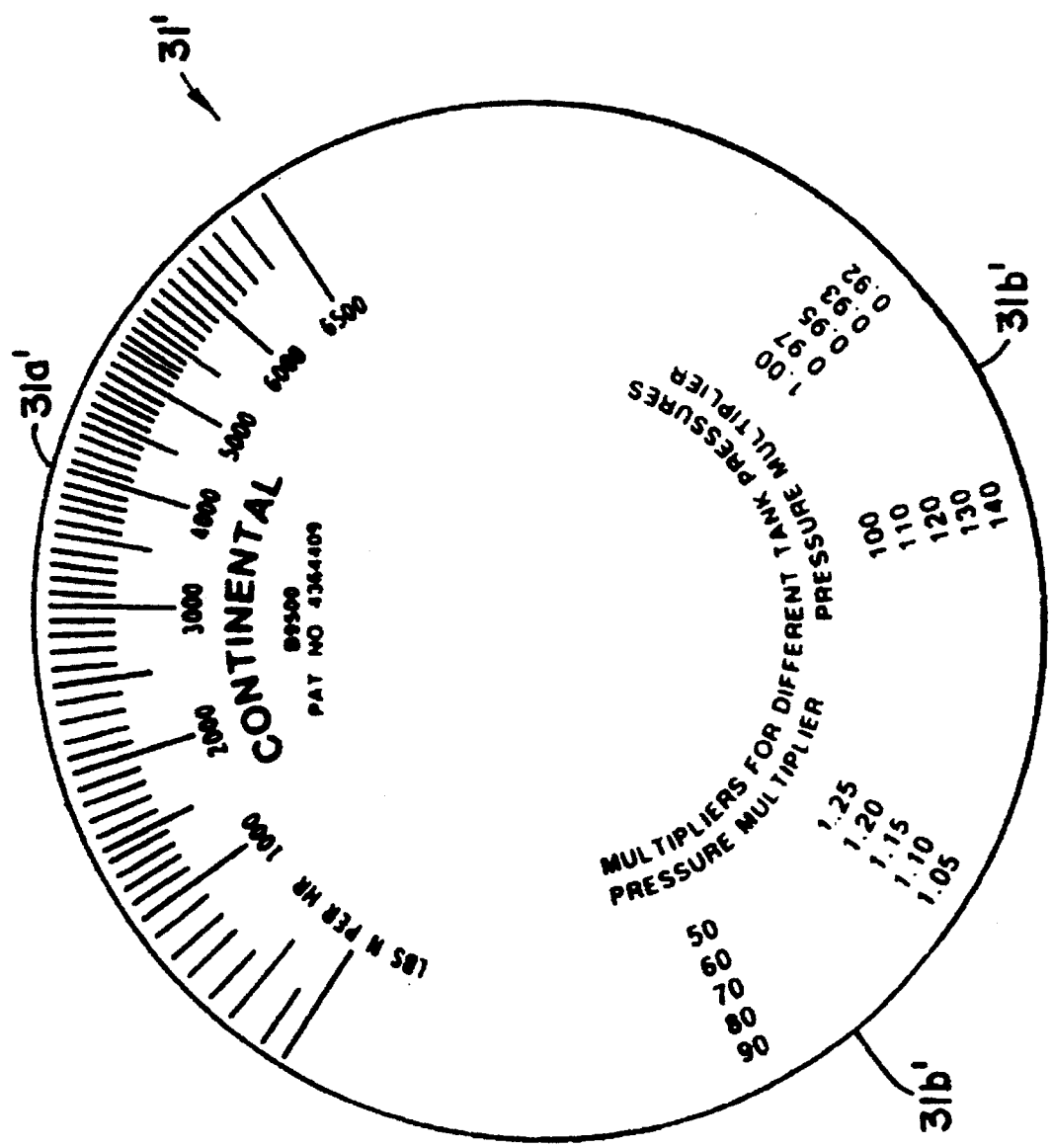
FIG. 8 is an enlarged view of the rotary calibration dial portion of the rate meter of FIG. 7.

As previously discussed, the electronic controller of the present invention can be used to control a number of different types and styles of rate meters. By way of further example, the rate meter 30' shown in FIGS. 7(a) and 7(b) is representative of a second type of rate meter with which the present invention may be used. Rate meter 30' is a model B9500 meter, also manufactured and sold by Continental NH₃ Products Co., Inc., and is also used in agricultural applicators for anhydrous ammonia. The model B9500 rate meter 30' has generally, the same functional components as the model C4100 rate meter 30, but differs in its metering capabilities and general physical configuration. For ease of description, functional components of the rate meter 30' which are generally the functional equivalents of those of rate meter 30, will be described by the same numerical designations used for rate meter 30, followed by a "prime" (i.e., ') designation. Rate meter 30' generally has an inlet port 30a', an outlet port 30b', a housing 36', a rotatable rate meter shaft 37', a rotary calibration dial 31', a circular upper knob 32', a hydraulic valve 33', and a hydraulic valve flag 34'. However, the physical configuration of the B9500 rate meter 30' components differ somewhat from those of the model C4100 rate meter 30. Whereas the rate meter shaft 37 of the rate meter 30 extends generally vertically from the rate meter 30 (FIGS. 3), with its rotary calibration dial 31 and upper knob 32 axially aligned on the shaft 37. With comparable operative positioning of the rate meter 30', its shaft 37' extends generally horizontally from the rate meter 30' with its rotary calibration dial 31' and upper knob 32' axially aligned with the horizontally positioned shaft 37' (FIGS. 7). The hydraulic valve portion 33' of the rate meter 30' also differs in orientation and direction of flow from its counterpart valve 33 of the rate meter 30. Whereas the hydraulic valve flag 34 of the rate meter 30 extends generally horizontally from the hydraulic valve 33 (FIGS. 3), the hydraulic valve flag 34' of the rate meter 30' extends generally vertically from the hydraulic valve 33' (FIGS. 7). Further, whereas the range of calibration settings 31a of the rate meter 30 are shown in increments of 100 pounds of nitrogen per hour up to 4100 pounds of nitrogen per hour, referring to FIG. 8, the calibration settings 31a' of the rate meter 30' are shown in increments of 100 pounds of nitrogen per hour up to 6500 pounds of nitrogen per hour.

The differing physical embodiment of the B9500 rate meter 30' requires a modified physical embodiment of actuator housing and brackets in order to properly align the actuator 50' for controlling movement of its rate meter shaft 37'. Referring to FIGS. 7(a) and 7(b), an actuator 50' is generally indicated as having inner and outer housing portions 64' and 65', respectively, that are bolted together at their respective housing rims 66' and 67' to define an internal cavity (not shown) that houses a servo motor 57' and its associated drive and interface circuitry. Actuator 50' is basically the same in construction and function as its counterpart actuator 50 previously described, and uses the same drive and interface circuitry as the actuator 50 hereinafter described in more detail. Electrical power and communication are provided to the servo motor 57' and circuits within the actuator 50' by means of the signal flow path wiring harness 222'. The servo motor 57' is secured within the actuator housing cavity and its movable shaft 57a' extends for rotation through the inwardly directed portion 64' of the housing, as best illustrated in FIG. 7(a). A circular knob 69', fixedly secured to the distal end of shaft 57a' rotates with the shaft 57a' and is constructed such that it permits the connection of a hose clamp or other compression-type clamps thereto.

In order to mount the actuator 50' of the invention to the rate meter 30' such that its servo motor 57' can be operated to accurately control movement of the rate meter shaft 37', the preferred embodiment uses a specifically designed bracket configurations (70' and 72) to accommodate and operatively mount the actuator 50' for connection to the rate meter 30'. The brackets 70 and 72 are designed specifically for the physical configuration of the B9500 rate meter 30'. It will be apparent to those skilled in the art that the varying physical embodiments of rate meters will require different physical bracket configurations in order to accommodate and mount the accompanying actuator for operative connection to the rate meter.

Figure 9:
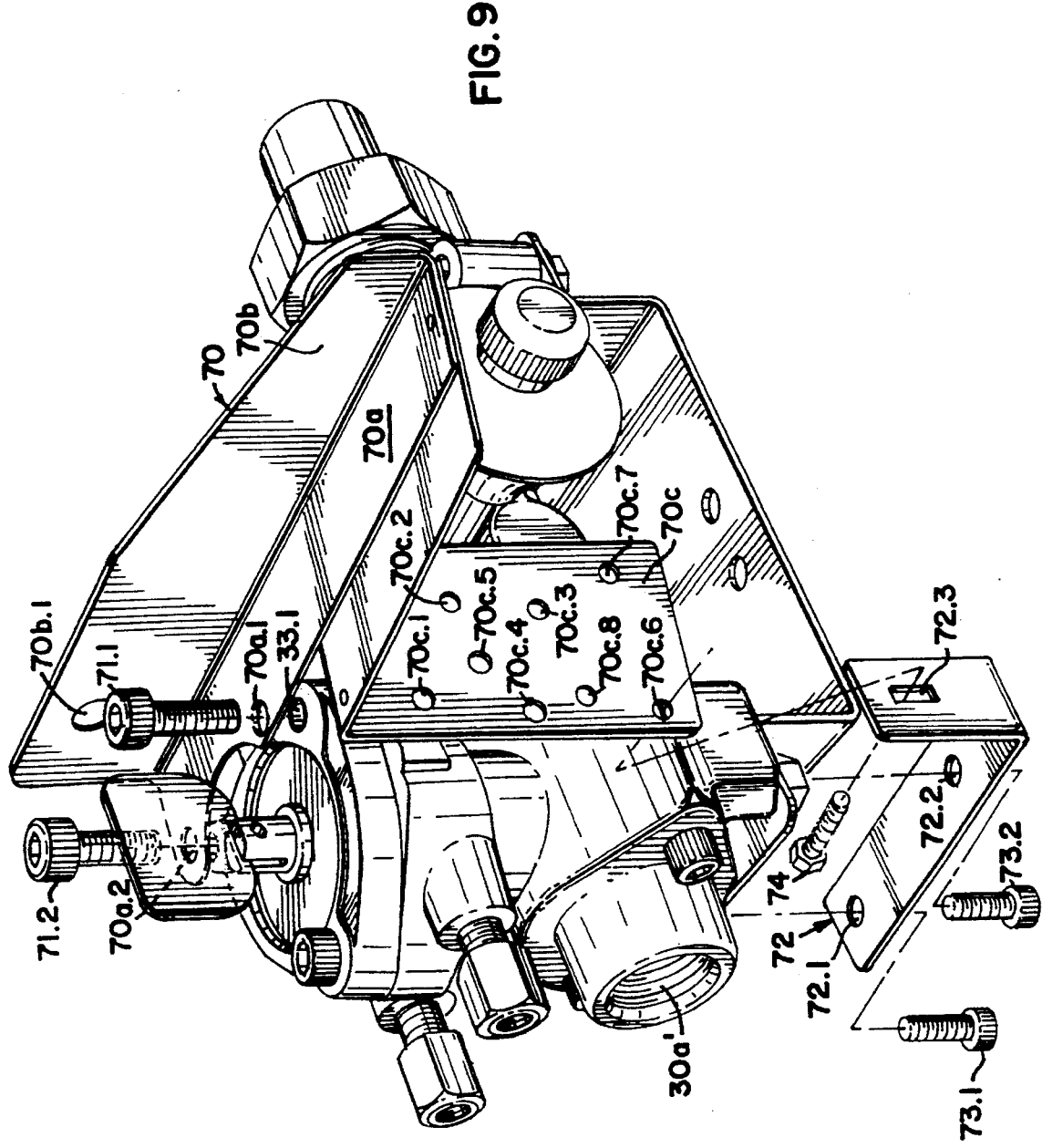
FIG. 9 is an exploded view of the actuator bracket portion of the actuator of FIG. 7, illustrated in operational relation to the rate meter and vertically rotated relative to FIG. 7.

In the preferred embodiment, the actuator bracket 70 has an upper, generally horizontal plate portion 70a, an upper, generally vertical plate portion 70b generally perpendicular to and extending along the entire length of the upper horizontal plate portion 70a, and a lower, generally vertical plate portion 70c extending generally perpendicular to the upper horizontal plate portion 70a and rotated 90° from the upper vertical plate portion 70b. Plate portions 70a, 70b and 70c are welded together to form a rigid structural support (see FIG. 9). The inner housing portion 64' of the actuator 50' is firmly bolted to the lower vertical plate portion 70c of the actuator bracket 70 by means of a plurality of threaded bolt members extending through holes 70c.1, 70c.2, 70c.3 and 70c.4 (see FIG. 9) formed in the lower plate portion 70c of the actuator bracket 70. The lower plate portion 70c has a circular opening 70c.5 therethrough that coaxially aligns with and is sized large enough to allow free movement of the rotatable servo motor shaft 57a' of the servo motor 57' when so secured. The upper horizontal plate portion 70a defines a generally C-shaped mounting flange at one end having two mounting holes 70a.1 and 70a.2 formed therethrough. FIG. 9 illustrates mounting of the actuator bracket 70 to the rate meter 30'. The upper horizontal plate portion 70a of the actuator bracket 70 is fastened to the housing 36' of the rate meter 30' by fastening two screws 71.1 and 71.2 through the two mounting holes 70a.1 and 70a.2, respectively and into two cooperatively aligned threaded holes 33.1' and 33.2' (hole 33.2' not illustrated) in the hydraulic valve 33'. In addition, an L-shaped support bracket 72 is fastened to the housing 36' of the bottom side of the rate meter 30' by fastening two screws 73.1 and 73.2 through two mounting holes 72.1 and 72.2, respectively and into two cooperatively aligned threaded holes 36.1' and 36.2' (not illustrated) in the bottom side of the rate meter housing 36'. The unsecured leg of the L-shaped bracket 72 extends generally vertically upward between the rate meter 30' and the lower plate portion 70c of the actuator bracket 70 and has an elongated mounting slot 72.3 formed therethrough. The L-shaped bracket 72 and the actuator bracket 70 are secured together by fastening a bolt 74 through the elongated mounting slot 72.3 of the bracket 72 and into a cooperatively aligned threaded fastening hole 70c.6 in the lower plate portion 70c of the actuator bracket 70. When the brackets 70 and 72 are securely mounted to the rate meter 30' as above described, the actuator 50' carried by the bracket 70 is oriented relative to the rate meter 30' such that the axes of the servo motor shaft 57a' and the meter shaft 37' are aligned spaced and parallel to one another and project in opposite directions as illustrated in FIG. 7(a).

Movement of the rate meter shaft 37' in response to movement in the servo motor shaft 57a' is accomplished by means of a mechanical linkage assembly that is constructed and arranged in the same manner as the mechanical linkage assembly used for connecting the actuator 50 to the rate meter 30. The mechanical linkage assembly connected to the rate meter 30' is illustrated generally in FIGS. 7(a) and 7(b). Referring thereto, a rate meter coupler member 51' is mechanically secured to the rate meter shaft 37' for rotation therewith, between the rotary calibration dial 31' and the circular end knob 32'. The coupler member 51' is secured to the rate meter shaft 37' by use of a hose clamp or compression-type clamp connector to prevent slippage between the clamp and shaft. The unsecured, distal end of the rate meter coupler member 51' has a receptor hole formed therethrough to accept a typical pivotal pin connector assembly 52'. A similar coupler member referred to as the motor coupler member 55', is secured to the circular end knob 69' of the rotating actuator servo motor shaft 57a' (in a manner similar to that described for the rate meter coupler member 51') for rotation therewith, and at a position axially spaced from the lower vertical plate portion 70c of the actuator bracket 70. The unsecured, distal end of the motor coupler member 55' has a receptor hole formed therethrough to accept a pivotal pin connector assembly 54' (not illustrated). The motor coupler member 55', secured to the circular end knob 69' of the servo motor shaft 57a', and the rate meter coupler member 51', secured to the rate meter shaft 37', are unimpeded by other obstructions and are generally positioned in the same plane to allow precise cooperative rotation of their respective shafts 57a' and 37' to which they are attached. An actuator arm linkage rod 53' is connected at its opposite ends to the coupler members 51' and 55' through the holes in their distal ends by means of pin connector assemblies 52' and 54', respectively, that allow the ends of the rod 53' to freely pivot about the respective horizontal axes (as illustrated in FIG. 7(a)) of the pin connector assemblies 52' and 54', relative to the distal ends of the coupler members 51' and 55'. Therefore, as the servo motor shaft 57a' turns, the motor coupler 55' rotates therewith, causing the actuator arm linkage rod 53' to pivot about the horizontal axis of the pin connector assembly 54' and to transmit a force to the rate meter coupler 51' causing its attached rate meter shaft 37' to rotate by a corresponding amount, thereby changing the application rate calibration setting and application rate of the meter. Precise control of the rate meter 30' can be achieved by precisely controlling energization of the servo motor 57' and resultant movement of its shaft 57a' and its attached circular end knob 69'.

As shown in FIG. 7(b), the upper generally vertical plate portion 70b of the actuator bracket 70, when mounted to the rate meter 30', is oriented to address the hydraulic valve flag member 34', and allows the flag member 34' to move freely without contact with the bracket 70. A magnet 83' is attached to a corner of the hydraulic valve flag 34' as shown in FIG. 7(b). The upper plate portion 70b has a hole 70b.1 formed therethrough near and in alignment with the hydraulic valve flag 34', through which a run/hold magnetic sensor 82' is mounted to sense rotational movement of the hydraulic valve flag 34'. The run/hold magnetic sensor 82' is positioned such that the hydraulic valve flag 34' and its attached magnet 83' freely rotate without contact with the run/hold magnetic sensor 82'.

A temperature sensor 85' is illustrated in FIG. 7(a). In the preferred embodiment the temperature sensor 85' is mounted through a hole 70c.7 in the lower generally vertical portion 70c of the actuator bracket 70.

FIG. 9 shows an actuator bracket calibration hole 70c.8 located in the lower generally vertical portion 70c of the actuator bracket 70. During calibration of the electronic meter controller in the preferred embodiment, pivotal pin connector assembly 54' must be aligned with the actuator bracket calibration hole 70c.8 in order to properly position the angular rotation of the servo motor shaft 57a'.

Figure 10:
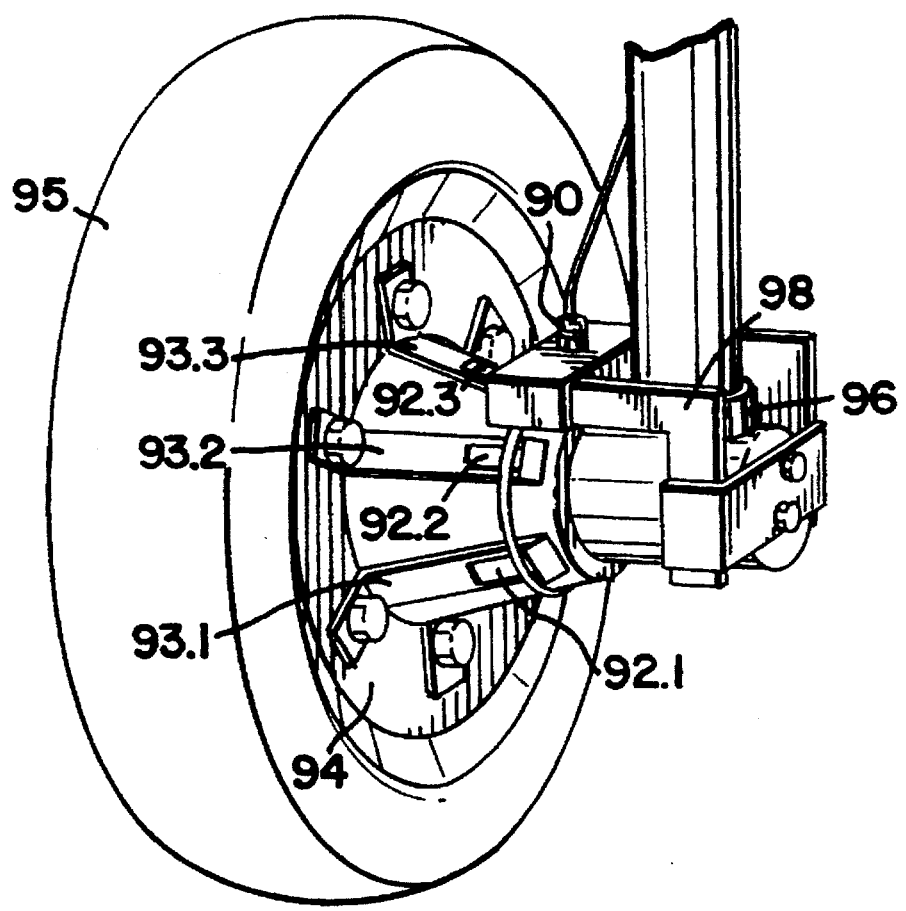
FIG. 10 is a diagrammatic view of one embodiment of a magnetic sensor apparatus that could be used for providing the speed sensor input function illustrated in FIG. 2.

FIG. 10 represents one embodiment, of the magnetic speed sensor 90, for sensing the speed of the tractor 10 relative to the surface to which the metered ammonia is being applied. The magnetic speed sensor 90 is mounted to the non-rotatable portion of a non-driving wheel 95 either of the tractor 10 or of the applicator apparatus 10. Preferably, one of the front wheels of the tractor would be used. A plurality of magnets 92, are secured to magnet clips 93 which are secured to the hub 94 at equally angularly spaced positions about the central hub axis. Only three magnets 92.1, 92.2, 92.3 of the total number thereof and their three corresponding magnet clips 93.1, 93.2, 93.3, are shown in FIG. 10 and referenced in this discussion. It will be understood that any number of such magnets may be placed around the wheel hub 94 so long as they are spaced far enough apart so as to be distinctly identifiable by the speed sensor 90. A speed sensor bracket 98, as shown in FIG. 10, is mounted to the wheel assembly 96 and defines an extension that projects outwardly from the wheel assembly 96 and toward the magnets 92. The speed sensor 90 is mounted to the speed sensor bracket 98 extension such that the sensor 90 addresses the magnets perpendicularly or within a viewing range of 45° from the perpendicular axis. The sensor 90 provides a sensed pulse output signal to the controller each time one of the magnets 92 passes its viewing position. Those skilled in the art will appreciate that the speed sensor bracket 98 and the magnet clips 93 can be designed to accommodate different styles of wheel hubs and wheel assemblies and sensors having different magnetic viewing angles. Furthermore, the means for sensing the speed of the tractor 10 or applicator is not limited to a magnetic speed sensor. Alternatively, a user of the present invention can use alternate ultrasonic speed sensor or a radar detector for sensing the speed of the tractor 10. A magnetic speed sensor, however, is a relatively inexpensive method for sensing tractor speed and transmitting the sensed speed to the rate meter controller.

Figure 11:
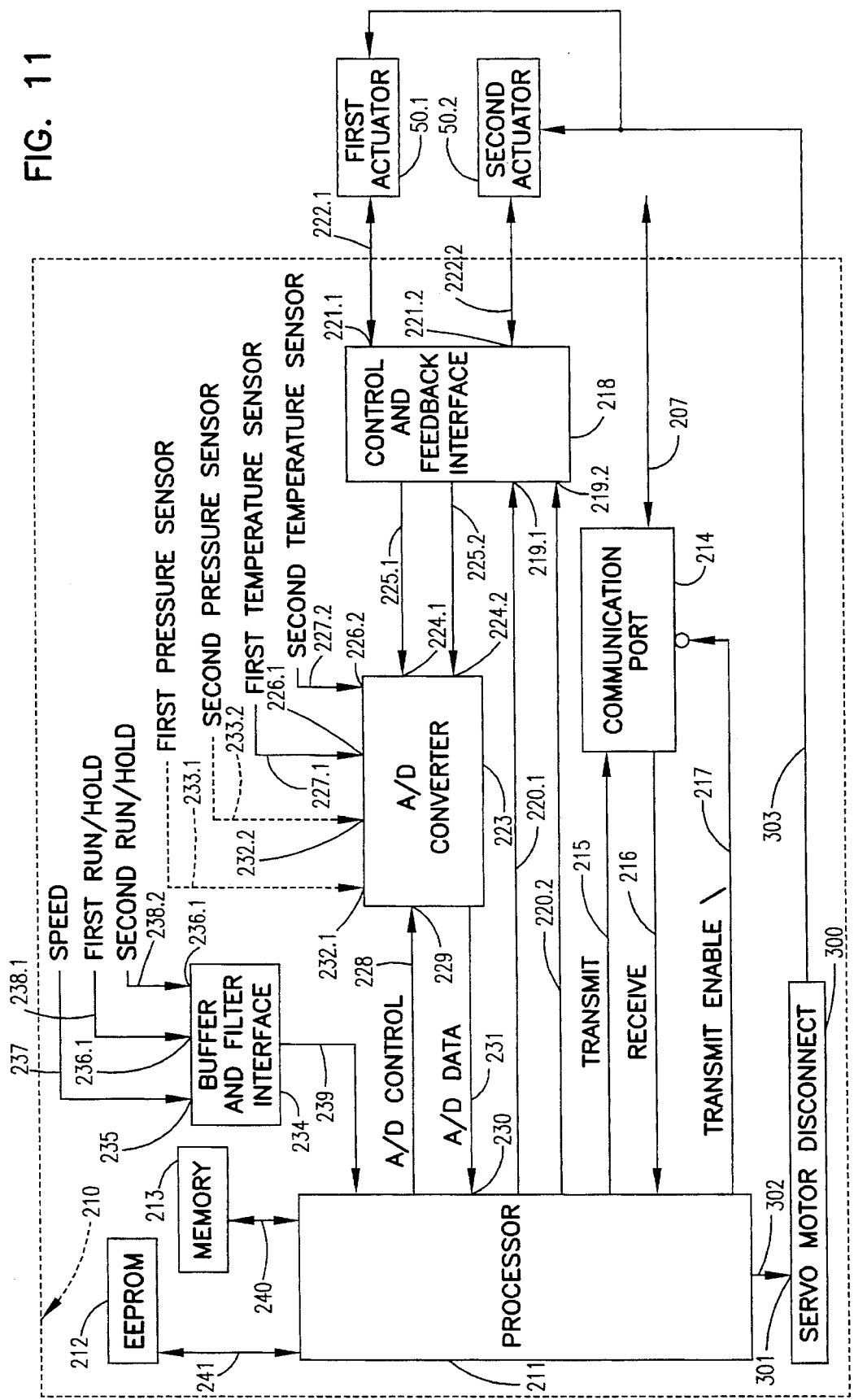
FIG. 11 is an electrical block diagram of a preferred embodiment of the Accessory Module portion of the electronic rate meter controller of FIG. 2.
Figure 12:
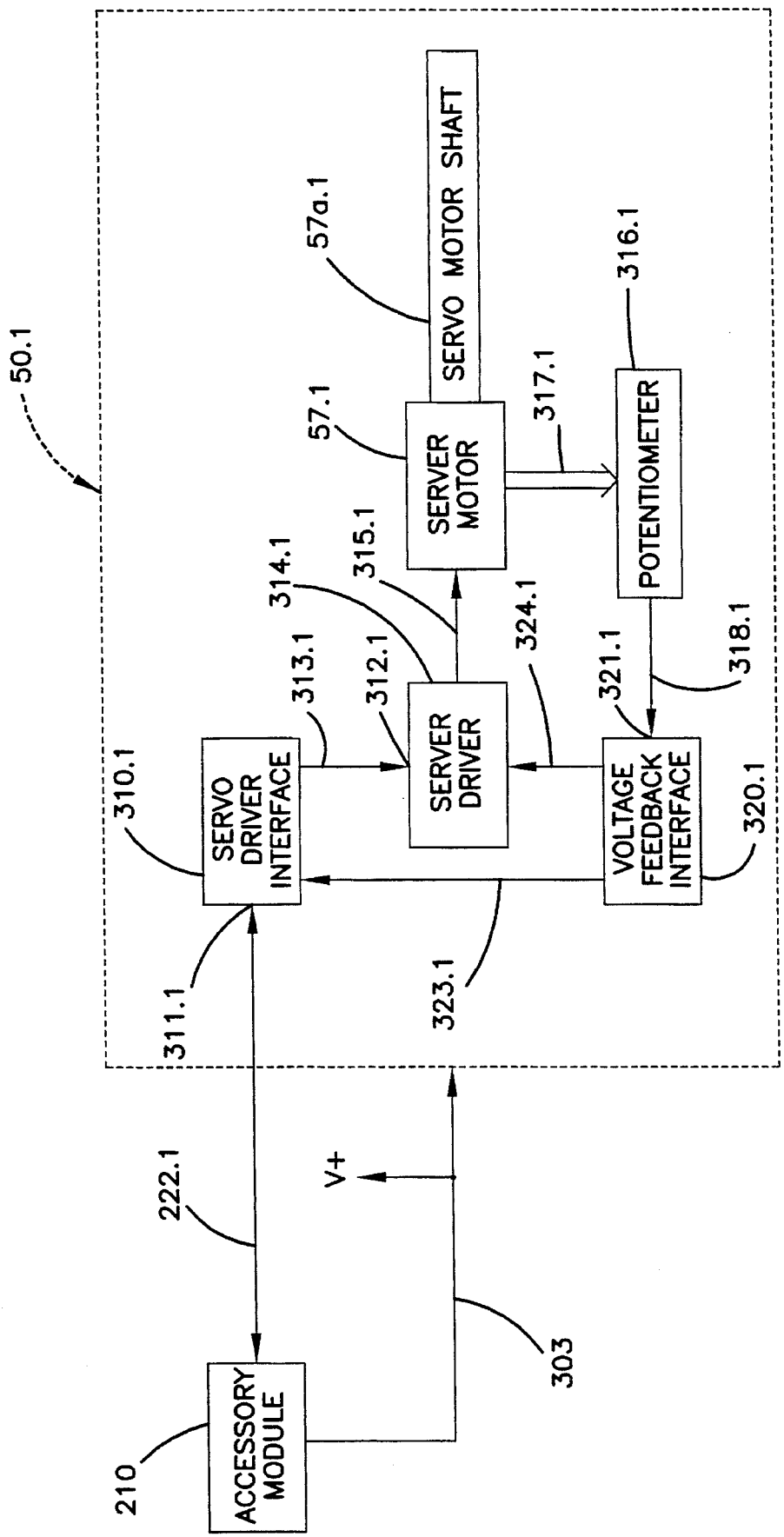
FIG. 12 is an electrical block diagram of a preferred embodiment of one Actuator portion of the electronic rate meter controller of FIG. 2.
Figure 13:
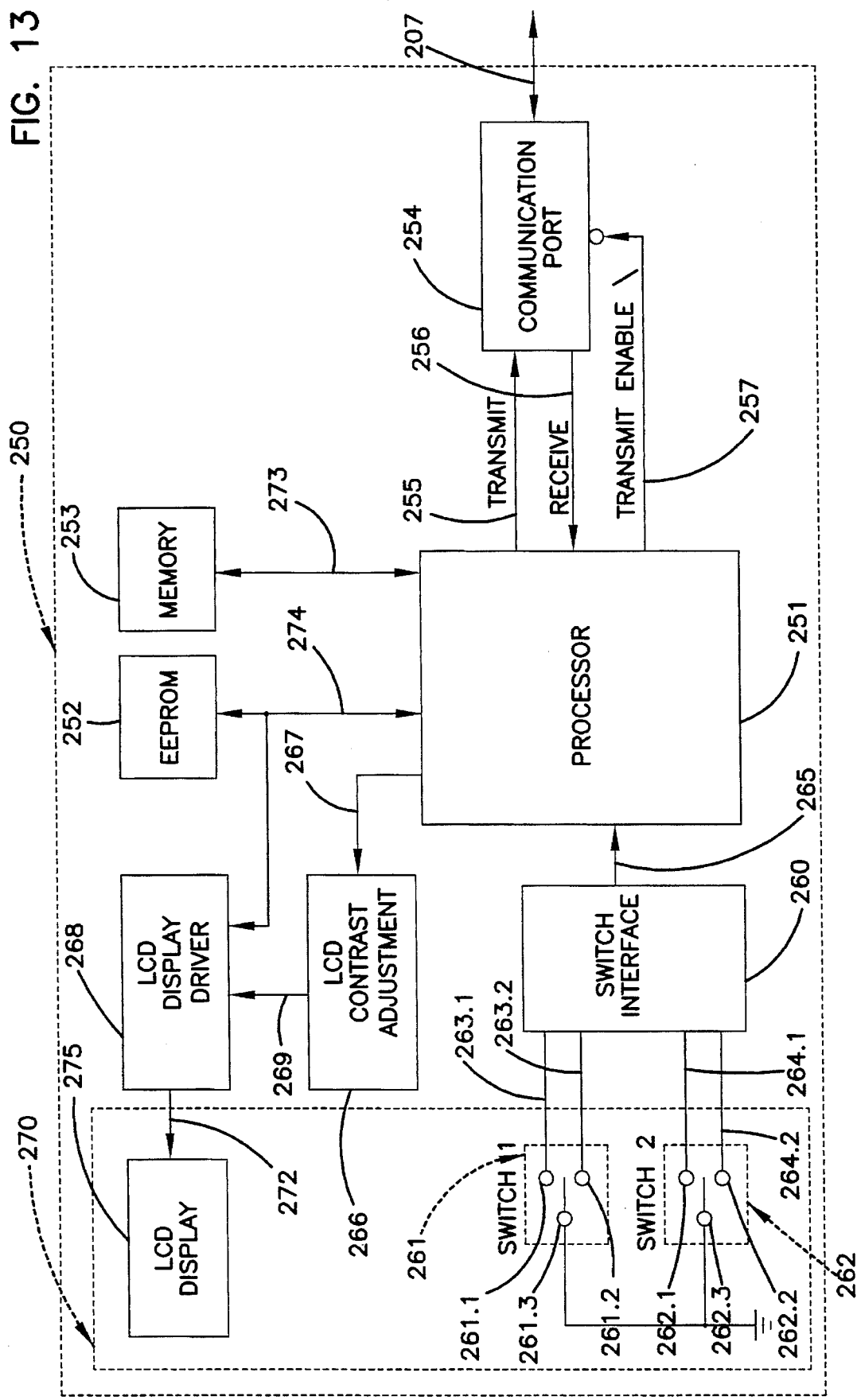
FIG. 13 is an electrical block diagram of a preferred embodiment of the Console Module portion of the electronic rate meter controller of FIG. 2.

A more detailed description of the primary functional blocks, namely the accessory module 210, the actuator 50, and the console module 250 of the rate meter controller 200 of this invention is had with reference to FIGS. 11 through 13. FIG. 11 illustrates an electrical block diagram of the accessory module 210. Referring to FIG. 11, the accessory module 210 is generally shown as having a processor 211 operatively connected to a memory 213, an EEPROM 212, a communication port circuit 214, an A/D converter 223, a control and feedback interface 218, and a buffer and filter interface 234.

The processor 211 and its associated EPROM memory 213 and EEPROM 212 can be of any type well known in the art. Detailed descriptions thereof will not be included herein, it being understood from the broad descriptions provided herein that those skilled in the art would be able to configure appropriate processor networks to accomplish the principles of this invention as further described herein. In the preferred embodiment, the processor 211 is an 8-bit microprocessor from the Intel 8051 family of microcontrollers, and is connected through its "0" and ports by means of an address bus, generally designed at 240, to the EPROM memory 213 and through two serial lines emulating an $I^2C$ bus, generally designated by the signal flow path 241, to the EEPROM 212. The two serial lines are assigned to two pins of port "1" of the processor 211. Program code and data used in operation of the accessory module 210 are stored in memory 213 and in the EEPROM 212 and are accessed by the processor 211 by means of the signal flow paths 240 and 241 respectively, in a manner well known in the art. The processor 211 is operatively connected to run at 12 MHZ. For a more detailed description of the processor 211, its typical use and applications, the reader is referred to the 1991 edition of *8-Bit Embedded Controllers* available from Intel Corporation, herein incorporated by reference to the extent needed for a better understanding of processors such as the microprocessor 211 in general. Further general information regarding an $I^2C$ bus such as bus 241 can be found in Section 3 of the *Linear Data Manual, Vol. 2, Industrial,* published in 1988 by Signetics.

The control and feedback interface 218 has a first control signal input 219.1 and a second control signal input 219.2 for receiving a first pulse width voltage input and a second pulse width voltage input from the processor 211 by means of a first and second control signal flow path 220.1 and 220.2 respectively. The signal flow paths 220.1 and 220.2 are respectively connected to pins 4 and 5 of port "1" of the processor 211. The control and feedback interface 218 converts each voltage input from the processor 211 to a current, representing position commands for rotating the first and second servo motors 57.1 and 57.2 respectively. In the preferred embodiment, the control and feedback interface 218 converts each voltage input from the processor 211 to a current within the range of three to thirteen milliamps. The control and feedback interface 218 has the first control and feedback output/input port 221.1 and the second control and feedback output/input port 221.2 for transmitting a current control signal to the first actuator 50.1 by means of the first control and feedback signal flow path 222.1 and for transmitting a current control signal to the second actuator 50.2 by means of a second control and feedback signal flow path 222.2. The same control and feedback output/input ports 221.1 and 221.2 are also respectively utilized for receiving a voltage feedback signal from the first actuator 50.1 by means of the first control and feedback signal flow path 222.1 and for receiving a voltage feedback signal from the second actuator 50.2 by means of the second control and feedback signal flow path 222.2. The control and feedback interface 218 adjusts the voltage feedback signals to a voltage level that the A/D converter 223 can process.

The A/D converter 223 has a first adjusted feedback input port 224.1 and a second adjusted feedback input port 224.2 for receiving adjusted feedback signals respectively by means of a first adjusted feedback signal flow path 225.1 and a second adjusted feedback signal flow path 225.2, from the control and feedback interface 218. The A/D converter 223 also has the first temperature input port 226.1 and the second temperature input port 226.2 for receiving temperature signals, representing the voltage drops across the first and second temperature sensors 85.1 and 85.2, respectively, by means of the first temperature signal flow path 227.1 and a second temperature signal flow path 227.2. The A/D converter 223 converts the analog adjusted feedback signals and the temperature signals to digital data for use by the processor 211. The processor 211 sends control signals on an A/D control signal flow path 228 to a polling input port 229, for polling the A/D converter 223. The processor 211 polls the A/D converter 223 every 128 milliseconds. The processor 211 also has an A/D data input 230 for receiving a serial pulse train representative of the converted temperature signals from the temperature sensors 85.1 and 85.2, and the converted feedback signals from the actuators 50.1 and 50.2, by means of an A/D data signal flow path 231. In the preferred embodiment, the signal flow paths 228 and 231 are connected to pins 1 and 3 respectively of port "1" of the processor 211. Pin 2 of port "1" of the processor 211 is also connected by means of the signal flow path 228 to the A/D converter 223 for sending "test" calibration signals to the A/D converter circuits.

In the preferred embodiment, the pressure sensors 73.1 and 73.2 are not utilized because of their high cost and the necessity of plumbing the pressure sensors 73.1 and 73.2 into the anhydrous ammonia line. Alternatively, the preferred embodiment utilizes temperature sensors such as 85.1 and 85.2 for measuring the ambient air temperature and converts such ambient air temperature to pressure. However, it will be obvious to those skilled in the art that either the pressure sensors and/or the temperature sensors can be used effectively in the present invention for determining pressure within the applicators system and adjusting the calibration dial position accordingly. If pressure sensors 73.1 and 73.2 are utilized in the present invention, the A/D converter 223 will receive the pressure signals at the pressure input ports 232.1 and 232.2 by means of the pressure signal flow paths 233.1 and 233.2, respectively. The A/D converter 223 will convert the pressure signals to digital data and send the digital data to the processor 211 by means of the A/D data signal flow path 231. The A/D converter 223 used in one embodiment of the accessory control module 210 is the Signetics programmable seven-channel RC Encoder, Model NE5044D. A/D conversion is well known in the art and therefore, it will be obvious to those skilled in the art that other methods of A/D conversion could be advantageously used to achieve conversion of the analog feedback signals and any sensor signals to digital signals for use by the processor 211.

The buffer and filter interface 234 includes the speed input port 235, the first run/hold input port 236.1 and the second run/hold input port 236.2 for receiving signals from the speed sensor 90, the first run/hold sensor 82.1, and the second run/hold sensor 82.2, by means of the speed signal flow path 237, the first run/hold signal flow path 238.1 and the second run/hold signal flow path 238.2, respectively. In the preferred embodiment, the buffer and filter interface 234 consists of three separate circuits connected to each of the speed sensor 90, the first run/hold sensor 82.1, and the second run/hold sensor 82.2, for removing fast transient or static electricity before feeding the input signals to the processor 211. Buffer and filter circuitry is well known in the art and it will be obvious to those skilled in the art that other methods can be effectively utilized for buffering and filtering such digital input signals. The buffered and filtered input signals are sent to the processor 211 by means of a sensor data signal flow path 239 which consists of three separate lines for transmitting each of the sensor inputs to the processor 211 individually. In the preferred embodiment the speed input signal is applied to the T1 input pin of the processor 211, and the first and second run/hold input signals are applied to the WR (write enable) and RD (read enable) input pins of the processor 211.

The servo motor disconnect interface 300, which is shown in more detail in FIG. 14 and hereinafter described, has a servo motor disconnect input port 301 for receiving control signal from the processor 211 by means of a control signal flow path 302. The servo motor disconnect interface 300 sends a signal by means of a disconnect signal flow path 303 to the actuators 50.1 and 50.2 for disconnecting the ground to the actuators 50.1 and 50.2, for preventing rotation of the servo motors 57.1 and 57.2 during system power up, during power drops, or during particular modes of operation, which are discussed hereinafter more fully. The signal flow path 302 is connected to the T0 pin of the processor 211.

The communication port circuit 214 is the accessory module 210 interface to bus 206. In one embodiment the system uses a half duplex serial differential line as the serial bus as described in U.S. Pat. No. 5,260,875 and previously incorporated herein by reference. One embodiment of a communication port circuit that can be used to implement the communication port circuit 214 is described and shown in U.S. Pat. No. 5,260,875. The communication port 214 receives serial data from the processor 211 by means of the transmit signal flow path 215. The communication port 214 then converts the serial data to a differential signal and drives the signals, which correspond to the logic levels existing on their inputs, through a standard communications network such as a media interface, generally designated at 203 and onto the bus 206. The communication port 214 receives differential signals from the bus 206 by means of the media interface 207 and converts the differential signals to digital levels for sending to the processor 211 by means of the receive signal flow path 216. The communication port 214 also communicates with the processor 211 by means of a transmit enable signal flow path 217. In the preferred embodiment, the transmit enable signal flow path 217, is connected to pin 0 of the processor port "1", and the transmit and receive signal flow paths 215 and 216 respectively are connected to the TXD (transmit data) and XD (read data) pins of the processor 211. Although the above described embodiment of the bus 206 and the communication port circuit 214 is described in U.S. Pat. No. 5,260,875, it should be obvious to those skilled in the art that other methods of a communication interface for serial bus communication between processors could be used to effectively achieve serial bus intercommunication. It should be further obvious to those skilled in the art that methods other than serial bus communication could advantageously be used to achieve intercommunication between the accessory module 210 and the console module 250. However, one advantage of the communication system as described in U.S. Pat. No. 5,260,875 is the flexibility it provides the present invention for retrofitting existing rate meters 30 as an independent system or as a subsystem of an integrated agricultural system such as disclosed in U.S. Pat. No. 5,260,875.

Finally, pin RST (reset) and pin INT1 (interrupt) of the processor 211 are connected to a power module (not shown) for monitoring the power and warning the processor 211 when power is low and for providing reset capabilities.

FIG. 12 illustrates an electrical block diagram representative of one actuator 50.1 or 50.2. For ease of referencing the numbers between different figures, the following discussion will assume that the actuator depicted in FIG. 12 represents the first actuator 50.1. The actuator 50.1 has a servo driver interface 310.1 having a control and feedback input/output port 311.1 for receiving control signals from and sending feedback signals to the accessory module 210, by means of the control and feedback signal flow path 222.1 The servo driver interface 310.1 adjusts the incoming control signal which is a current between three and thirteen milliamps, for input to an input port 312.1 of a servo driver 314.1 by means of a signal flow path 313.1. In the preferred embodiment, the servo driver 314.1 is a Motorola DC servo motor controller/driver Model MC3303 0DW. The servo driver 314.1 sends a control signal to the servo motor 57.1 by means of a signal flow path 315.1. The servo motor control signal energizes the servo motor 57.1 causing its shaft 57a.1 to rotate in the direction and amount indicated by the three to thirteen milliamps current signal. The servo motor 57.1 is mechanically coupled to a potentiometer 316.1 by means of potentiometer mechanical coupling generally indicated at 317.1. The potentiometer 316.1 detects rotation of the servo motor shaft 57a.1 and provides a voltage output by means of a potentiometer signal flow path 318.1 to an input port 321.1 of a voltage feedback interface 320.1. The voltage feedback interface 320.1 provides a buffer for the voltage received from the potentiometer 316.1. The voltage feedback interface 320.1 then transmits the buffered voltage to the servo driver interface 310.1 by means of a voltage feedback signal flow path 323.1, and it also transmits the buffered feedback voltage to the servo driver 314.1, after properly adjusting it for input to the servo driver, by means of a signal flow path 324.1. The servo driver interface 310.1 adjusts the voltage feedback signal received from the voltage feedback interface 320.1 to compensate for the current flowing into port 311.1 from the accessory module 210. The servo driver interface 310.1 then transmits the adjusted voltage feedback signal through port 311.1 and signal flow path 222.1 to the accessory module 210.

FIG. 13 illustrates an electrical/functional block diagram of a preferred embodiment configured according to the principles of the present invention, of the console module 250. The console module 250 generally includes a processor 251 operatively connected to a memory 253 and an EEPROM 252, a communication port circuit 254, a switch interface 260, an LCD display contrast adjuster 266, and an LCD display driver 268. In the preferred embodiment, processor 251 is an 8-bit microprocessor connected to run at 12 MHZ, from the Intel 8051 family of microcontrollers. Processor 251 is connected through ports "0" and "2" by means of an address bus, generally designated at 273 to the EPROM memory 253 and through two serial lines emulating an I²C bus, generally designated by the signal flow path 274, to the EEPROM 252 and to LCD driver 268. The two serial lines of the I²C bus are assigned to two pins of port "1" of the processor 251. For a more detailed description of the processor 251, its typical use and applications the reader is referred to the 1991 edition of 8-*Bit Embedded Controllers,* available from the Intel Corporation, and again incorporated herein by reference to the extent needed for a better understanding of processors such as the microprocessor 251 generally. Information on the I²C bus can be found in section 3 of the *Linear Data Manual, Vol.* 2, *Industrial,* published in 1988 by Signetics.

Program code and data used in operation of the console module 250 are stored in memory 253 and the EEPROM 252 and are accessed by the processor 251 by means of the signal flow paths 273 and 274 respectively in manner well known in the art. The processor 251 is connected to the communication port circuit 254 by means of a transmit signal flow path 255, a receive signal flow path 256, and a transmit enable signal flow path 257, in the same manner as previously described with respect to the processor 211 in the accessory module 210. In the preferred embodiment, the transmit signal flow path 215 is connected to the TXD (transmit data) pin of the processor 251, the receive signal flow path 256 is connected to the RXD (read data) pin of the processor 251, and the transmit enable signal flow path 257 is connected to one pin of port "1" of the processor 251. The communication port 254 is generally of the same configuration and operates in the same manner as previously described communication port 214.

The switch interface 260 is connected to a master switch 261 and an adjustment switch 262 by means of master switch control lines 263.1 and 263.2 and adjustment switch control lines 264.1 and 264.2 respectively. The configuration of the master switch 261 allows the user to choose between two different operational settings 261.1 and 261.3 for selecting automatic or manual control of the system. The master switch 261 also allows the user to toggle the switch to a neutral position 261.2 for changing the display and for using during calibration or other modes of operation. The adjustment switch 262 defaults to an inactive position 262.3 for sending no signals to the processor 251. The adjustment switch 262 is configured to allow the user to manually toggle the switch from its default position 262.3 to a positive switch position 262.1 and a negative switch position 262.2. Master switch position 261.1 and position 261.2, provide an electrical ground to inputs of the switch interface 260 by means of the master switch control lines 263.1 and 263.2 respectively. When in position 261.3 the master switch 261 provides no signal return path for the switch interface 260. Similarly, adjustment switch positions 262.1 and 262.2 provide an electrical ground to the inputs of the switch interface 260 by means of the adjustment switch control lines 264.1 and 264.2 respectively. When in position 262.3, the adjustment switch provides no signal return path for the switch interface 260. The switch interface 260 acts as a buffer for the signals flowing through the master switch control lines 263.1 and 263.2 and the adjustment switch control lines 264.1 and 264.2. The switch interface 260 transmits the buffered signals to the processor 251 by means of a switch interface signal flow path 265 that physically comprises four separate lines corresponding to signals carried by the signal flow paths 263.1, 263.2, 264.1 and 264.2, which are respectively connected to four pins of port "1" of the processor 251.

The processor 211 is also connected to a power module (not shown) through pin RST (reset) and pin INT1 (interrupt) for monitoring the power and warning the processor 251 when power is low and for providing reset capabilities.

The processor 251 generates an electric control signal for adjusting the LCD display contrast by means of LCD contrast signal flow path 267 to an LCD display contrast adjuster 266 in response to input signals received from switches 261 and 262 during calibration of the controller 200. The signal flow path 267 is connected to the RD (read enable) pin of the processor 251. The LCD display contrast adjuster 266 transmits a control signal to the LCD display driver 268 by means of a signal flow path 269 for adjusting the viewing angle voltage for the LCD display 270.

The LCD display driver 268 receives other control signals related to data for displaying on the LCD display 275 from the EEPROM 252 and the processor 251 by means of the I²C bus signal flow path 274. The LCD display driver 268 controls the LCD display 275 by means of an LCD display signal flow path 272. The LCD display 275 and the switches 261 and 262 collectively represent console module user interface 270, for providing interaction between a user and the controller 200.

In an alternative embodiment, the LCD display 275 could be implemented with a dot matrix LCD display and driver. Dot matrix displays would offer greater flexibility on the design and modifications of screen displays but would suffer a decrease in viewing angle when compared to the dedicated LCD displays described above. A dot matrix LCD display would, however, have the added benefit of permitting the design of a generic programmable display.

Figure 17:
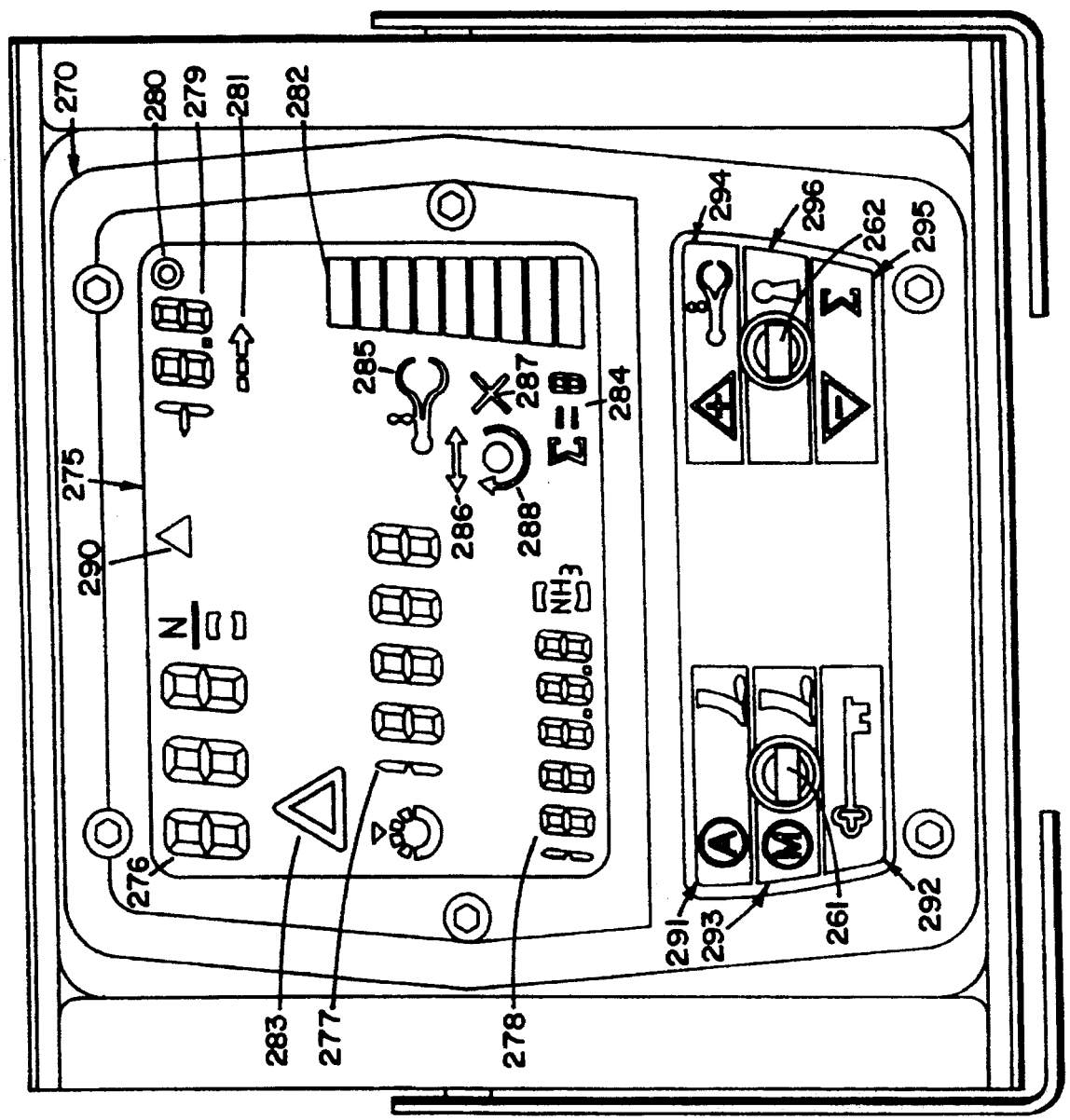
FIG. 17 is a mechanical drawing of a preferred configuration of a controller console of the present invention, illustrating an LCD display and switches useful in displaying information related to operation and control of the controller and allowing user interaction.

FIG. 17 generally illustrates one embodiment of the console module user interface 270, including the LCD display 275 useful in displaying status and information related to the rate meter controller 200, and the switches 261 and 262 useful in providing user interaction with the rate meter controller 200. Referring to FIG. 17, during operation display 276 shows the expected application rate, display 277 shows the calibration dial setting, display 278 shows the area counter or the total $NH_3$ used counter, display 282 graphically shows the nurse tank level, and display 279 shows either the speed or the ambient temperature. Display symbol 280 is a symbol indicating temperature when temperature is displayed and display symbol 281 is a symbol indicating speed when speed is displayed. Display symbol 283 indicates a hazardous condition exists. Display symbol 284 indicates that the rate meter controller 200 is in a particular sigma mode. Display symbols 285 through 290 appear during a calibration mode. Display symbol 285 indicates that the rate meter controller 200 is in the calibration mode. Display symbol 286 indicates the widths of the implements can be entered. Display symbol 287 indicates a delivery factor can be entered. Display symbol 288 indicates a speed sensor value can be entered. Display symbol 290 indicates a delta rate adjustment can be entered.

The mechanical representations of switches 261 and 262 are also shown in FIG. 17. The operator symbols 291 correspond to master switch position 261.1. The operator symbols 295 correspond to master switch position 261.2 The operator symbols 296 correspond to master switch position 262.3. The operator symbols 294 correspond to adjustment switch position 261.1. The operator symbols 292 correspond to adjustment switch position 262.2 The operator symbols 293 correspond to adjustment switch position 262.3. For further information concerning the console displays and the switch 261 and 262 functions, the reader is referred to the published $NH_3$ *Automatic Control System Installation and Operator's Manual*, available from Micro-Trak Systems, Inc. of Mankato, Minn. Those skilled in the art will appreciate that various embodiments of the user interface 270 including the LCD display 275 and the switches 261 and 262 could be used effectively to allow manual and automatic operation of the rate meter controller 200 and to provide sufficient status and information to the operator consistent with the principles of the present invention.

Figure 14:
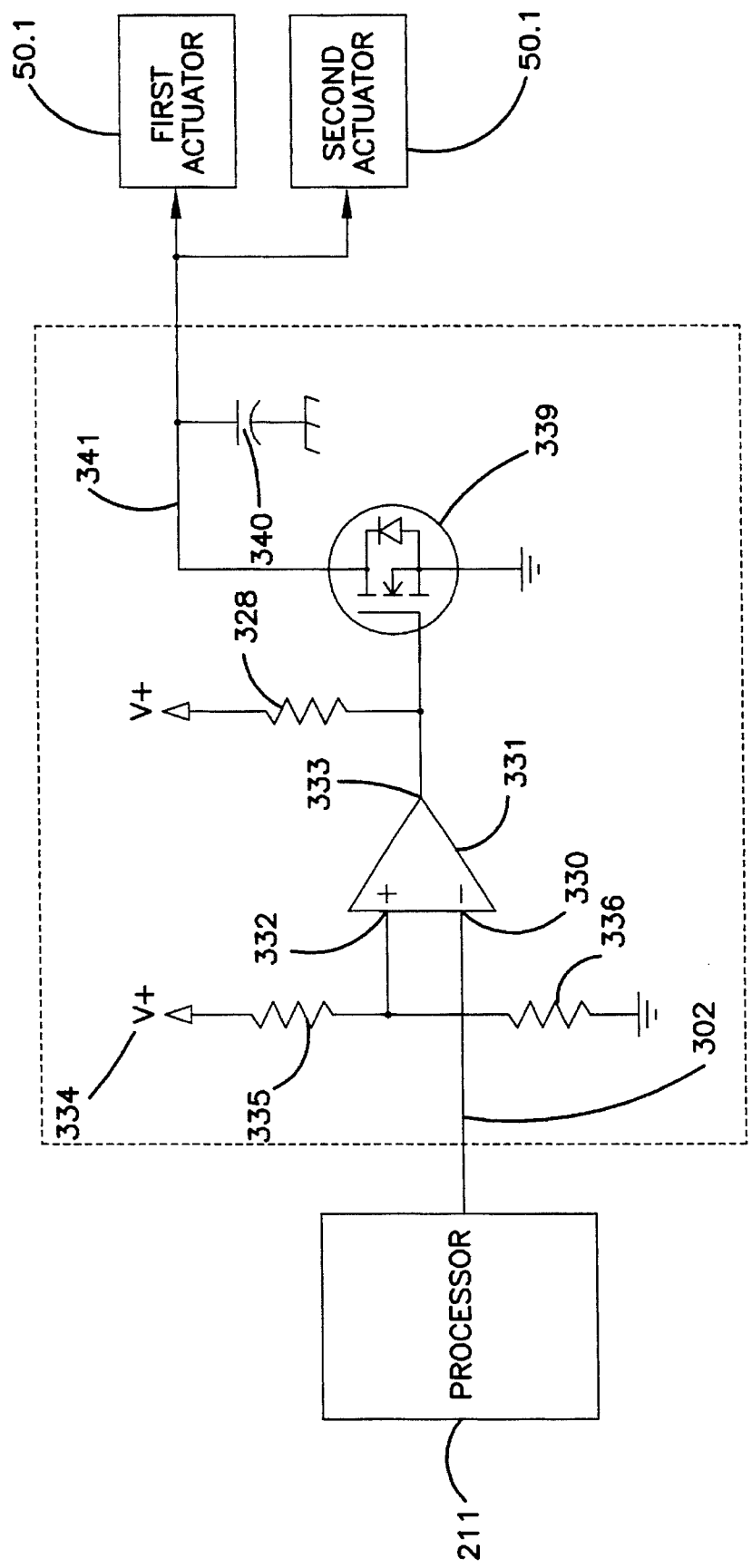
FIG. 14 is an electrical schematic diagram of a preferred configuration for the Servo Driver Disconnect functional block of FIG. 11.
Figure 15:
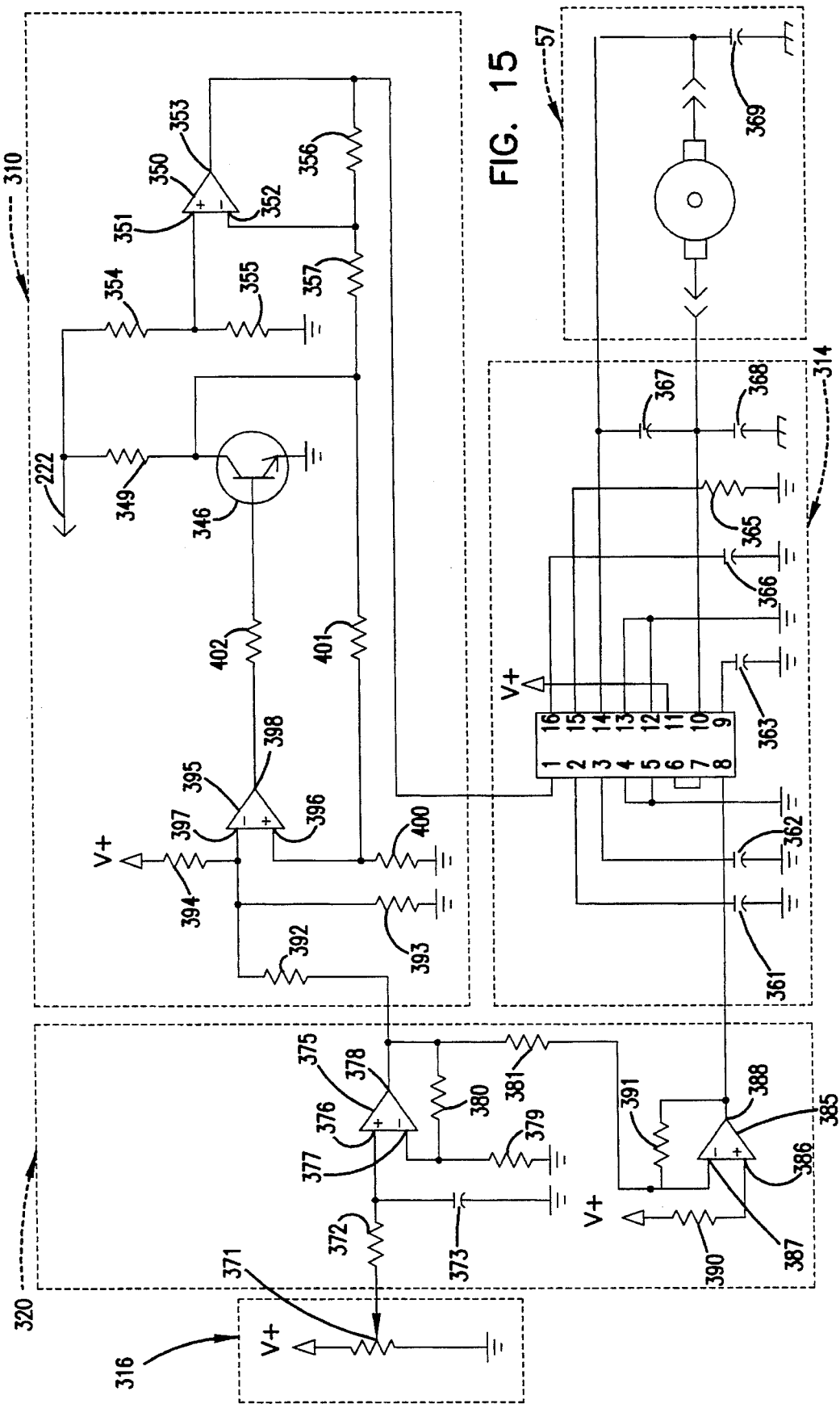
FIG. 15 illustrates an electrical schematic diagram of a preferred configuration for one Actuator portion of FIG. 2 and illustrated in electrical block diagram form in FIG. 12.

FIGS. 14 and 15 illustrate electrical schematic diagrams of preferred embodiments of the servo motor disconnect 310 and the actuator 50 portions respectively as previously functionally described in FIGS. 11 and 12. Referring to FIG. 14, the processor 211 of the accessory module 210 generates an output voltage at its T0 pin that is applied by means of the signal flow path 302 to a negative input 330 of a comparator 331. The comparator 331 also has a reference voltage input 332 and an output 333. The reference voltage 334 is applied to the input terminal 332 by means of a resistor 335 connected to the supply V+. The resistor 335 is also connected in series with a resistor 336 to ground. The output 333 of the voltage comparator 331 is connected by means of a resistor 338 to the supply V+. The output 333 of the comparator 331 is also connected to the gate of an n-channel power MOSFET 339 with built-in zener protection which is grounded and has its drain connected to ground. The MOSFET source is connected by means of the signal flow path 341 which provides power to the actuators 50. A capacitor 340 is connected between the MOSFET source and ground. The MOSFET 339 acts as a switch and connects the signal flow path 341 to ground. When the system is being powered up, when power in the system goes low, or during calibration mode the MOSFET disconnects the signal flow path 341 from ground, thereby disabling the actuators 50 and preventing rotation of their respective servo motor shafts 57a.

FIG. 15 illustrates an electrical schematic diagram of the actuator 50 functional blocks of FIG. 12. FIG. 15 illustrates the servo driver interface 310, the servo driver 314, the servo motor 57, the potentiometer 316, and the voltage feedback interface 320. These elements comprise the electrically controlled portion of the actuator 50 which controls the application rate of a substance flowing through the rate meter 30. The control and feedback signal flow path 222 is connected by means of a resistor 349 to the collector of an npn transistor 346 and is also connected by means of a resistor 354 to a non-inverting input 351 of an operational amplifier 350. (The emitter of transistor 346 is tied to ground.) The non-inverting input 351 of the amplifier 350 is also connected by means of a resistor 355 to ground. The operational amplifier 350 further has an inverting input 352 and an output 353. The output 353 of the amplifier 350 is connected by means of a resistor 356 to its inverting input 352. The inverting input 352 of the amplifier 350 is also connected by means of a resistor 357 to the collector of transistor 346.

The output 353 of the operational amplifier 350 is further connected to pin 1 of a DC servo motor controller/driver 360. The preferred embodiment utilizes an I.C. MC3303 DW DC servo motor controller/driver. However, it will be apparent to those skilled in the art that other methods could be effectively used to control the operation of the servo motor 57. Pins 4, 5, 12, and 13 of the driver 360 are connected directly to ground. Pin 2 is connected to ground through a capacitor 361. Pin 3 is connected to ground through a capacitor 362. Pin 6 is an output and is connected directly to pin 7 which is an inverting input. Pin 9 is connected to ground through a capacitor 363. Pin 11 is connected to the vehicle power supply. Pin 15 is connected to ground through a resistor 365. Pin 16 is connected to ground through a capacitor 366. A capacitor 367 is connected between pins 10 and 14. Pin 10 is also connected to ground by a means of a capacitor 368 and to one terminal of the servo motor 57. The second terminal of servo motor 57 is directly connected to pin 14 and is connected to ground by means of a capacitor 369.

The movable shaft of servo motor 57 is mechanically coupled to the potentiometer 316 (mechanical coupling not shown). The member output 371 of potentiometer 316 is connected by means of a resistor 372 to a non-inverting input 376 of an operational amplifier 375 and by means of a capacitor 373 to ground. The operational amplifier 375 further has an output 378 and an inverting input 377. A resistor 380 is connected between the amplifier's output and inverting input. The inverting input 377 of amplifier 375 is connected by means of a resistor 379 to ground. The output 378 of the amplifier 375 is further connected to an inverting input 387 of an operational amplifier 385 by members of a resistor 381. The amplifier 385 further has a non-inverting input 386 connected to supply V+ through a resistor 390, and an output 388 connected to the inverting input 387 of amplifier 385 through a feedback resistor 391. The output 388 of amplifier 385 is further connected to pin 8 of the servo motor controller/driver 360.

The output 378 of operational amplifier 375 is further connected by means of a resistor 392 to an inverting input 397 of an operational amplifier 395. The inverting input 397 of amplifier 395 is also connected by means of a resistor 394 to supply V+ and by means of a resistor 393 to ground. The amplifier 395 also has a non-inverting input 396 connected to ground through a resistor 400 and to the collector of transistor 346 through resistor 401. The output of operational amplifier 395 is connected to the base 348 of transistor 346 by means of a resistor 402.

Integrated Agricultural Planting and Spraying System

The above description portrays the invention in association with its "independent" use as a rate meter controller for a pre-existing anhydrous ammonia applicator system, wherein the electronic rate meter controller operates independently of other control functions of the applicator system.

The present invention may also be utilized in an "integrated" agricultural planting and spraying system such as generally described in U.S. Pat. No. 5,260,875, issued Nov. 9, 1993 to Tofte, et al, which is assigned to the same assignee as the present invention, and which has been fully incorporated by reference herein. Use of this invention in such an "integrated" system is functionally illustrated in FIG. 16 wherein the rate meter controller 200 described above forms a "subsystem" of the larger "integrated" system 190. A summary of the operational configuration of the integrated system 190 is provided below.

Integrated agricultural planting and spraying system 190 generally includes an integrated network of controllers for the monitoring and control of planting and spraying. System 190 includes a bus master 201, a base console 202, a sprayer subsystem 203, a planter subsystem 204, a monitor subsystem 205 and a communications medium such as previously described bus 206. It will be understood that any number of such "subsystems" can be used. In the integrated system 190, controller 200 forms one subsystem of the integrated system. Elements 201–205 are capable of communicating to each other through standard communications network connections such as the media interface 207 which are operatively connected with the bus 206. Bus master 201 controls the operation of bus 206 and, in the preferred embodiment, serves as the data gathering node for inter-system communications.

Base console 202 operates as the primary user interface. Base console 202 receives user input and displays system status through primary user interface means 208. Sprayer subsystem 203 receives spraying instructions entered through the base console 202 and controls components of the sprayer subsystem 203 in order to execute those instructions. Likewise, planter subsystem 204 receives instructions through base console 202, executes those instructions and returns planter subsystem status. Monitor subsystem 205 is capable of recording data traffic present on bus 206 and storing the data read from bus 206 to non-volatile memory for future playback. In one embodiment, sprayer subsystem 203 and planter subsystem 204 have separate subsystem user interfaces that operate in conjunction with base console 202 to monitor and control subsystem operation.

Overall operation of the system is controlled by base console 202. Base console 202 may operate in a number of modes including normal, calibration, sigma, initialization and debug modes.

Bus master 201 operates in conjunction with base console 202 to control each of the subsystems in system 190. This includes such functions as identifying each sensor device and implement to be managed, accessing program code and data stored in memory associated with base console 202 to operate such sensor device and implement, receiving control information from primary user interface 208, displaying status through display 208, generating control signals for controlling each sensor device and implement and supplying these control signals through bus 206 to the appropriate device.

Sensor devices and implements are preferably grouped into their respective subsystems and are identified by a subsystem code. During initialization, each subsystem controller transfers a subsystem status including a subsystem code indicating the type of subsystem (sprayer, planter, monitor, etc.) to bus master 201 and base console 202. Bus master 201 and base console 202, in turn, record the existence of that subsystem and control primary user interface 208 accordingly. Since more than one subsystem of a specific type can be connected to system 190 at one time, each subsystem is assigned a unique system number. The system number is assigned by bus master 201 or by the operator. The system number then serves as the identifier for all transactions between base console 202, bus master 201 and a specific subsystem, among others.

It is contemplated that other subsystems could be added to system 190 by connecting them through a standard media interface 207, to bus 206. Such types of subsystems could include for example, navigation subsystems or system maintenance subsystems.

Figure 16:
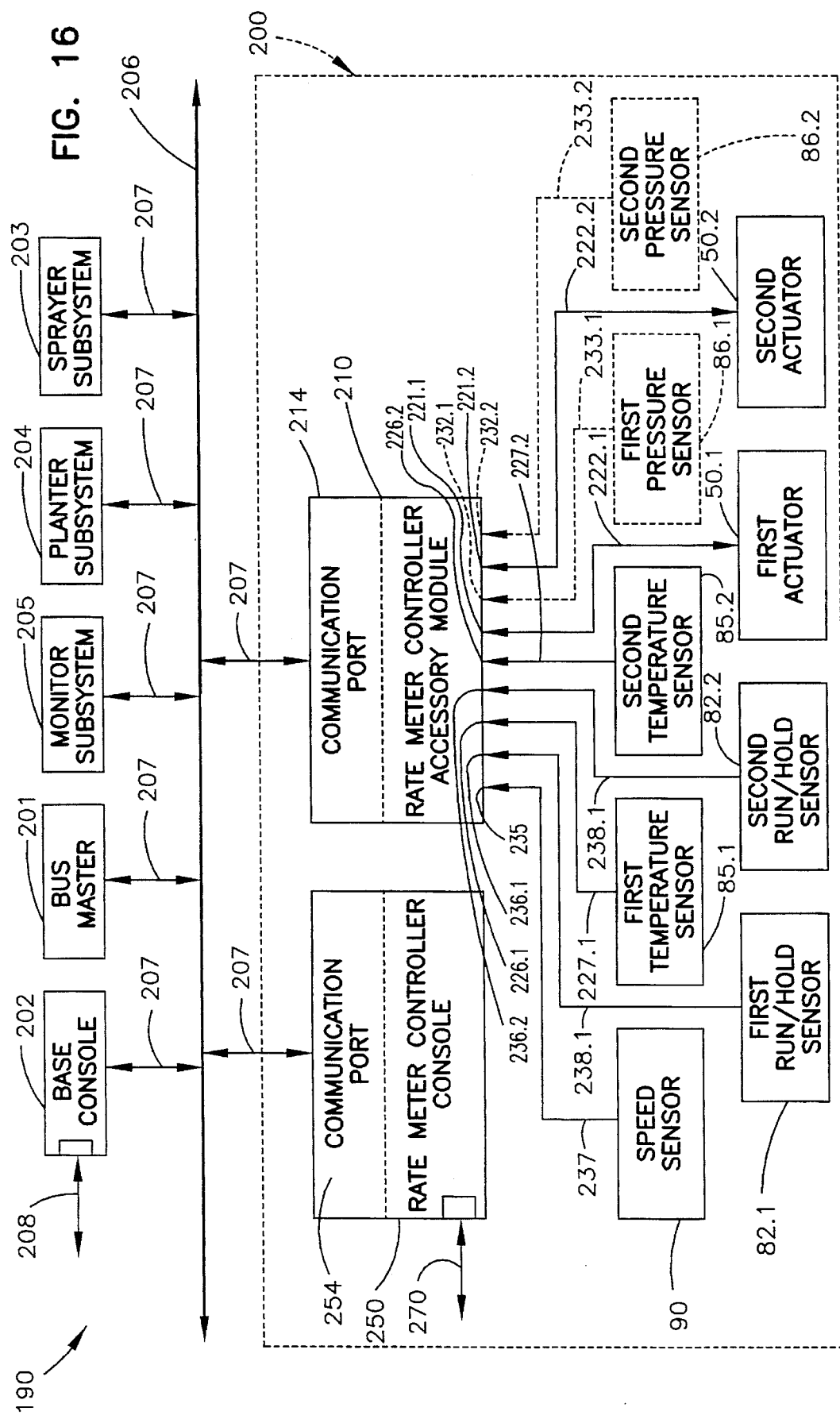
FIG. 16 is a functional block diagram of the electronic rate meter controller system of FIG. 2, illustrating its use with an integrated agricultural planting and spraying system of the type disclosed in U.S. Pat. No. 5,260,875.

As shown in FIG. 16, the present invention contemplates integration with an integrated agricultural planting and spraying system such as system 190. As explained in U.S. Pat. No. 5,260,875, in one embodiment of the integrated system 190, the bus 206 is a half duplex serial line which connects the bus master 201 and the base console 202 in a daisy chain fashion, with the sprayer subsystem 203, the planter subsystem 204 and the monitor subsystem 205. The controller 200 of the present invention is similarly connected to the integrated system 190 by connecting the rate meter controller console module 250 and the rate meter controller accessory module 210 to the bus 206, and to the other elements of system 190, through their respective media interfaces 207, in daisy chain fashion. The user interface 270 of the rate meter controller console 250 is used in conjunction with primary user interface 208 to control the rate meter controller subsystem.

The configuration of the rate meter controller 200 portion of the system 190 is the same as previously herein described. The rate meter controller accessory module 210 includes a speed sensor input 235 for receiving an electric input signal by means of a speed signal flow path 237 from a speed sensor 90. The integration with system 190, however, allows flexibility for connecting the speed sensor 90. Thus, the speed sensor 90 alternatively may communicate with the base console 202 or with the bus master 201.

As previously described, the rate meter controller accessory module 210 can accommodate a plurality of rate meters 30, each having associated therewith an identifiable actuator 50 for adjustably controlling the volume flow setting of the rate meter 30 to which the actuator is attached. In the preferred embodiment the accessory module 210 can accommodate two rate meters 30 and their corresponding actuators 50 and sensors. Accordingly, FIG. 16 shows the accessory module 210 with two actuator control and feedback output/input ports 221.1 and 221.2 for sending control signals to and for receiving feedback signals from the actuators 50.1 and 50.2 by means of control and feedback signal flow paths 222.1 and 222.2 respectively. The accessory module 210 further has two temperature input ports 226.1 and 226.2 operatively connected to receive sensed temperature signals from a pair of temperature sensors 85.1 and 85.2 by means of temperature signal flow paths 227.1 and 227.2 respectively. The temperature sensors 85.1 and 85.2 are associated with the ambient air temperature surrounding the rate meters 30.1 and 30.2 respectively, and their corresponding nurse tank 13 and plumbing 15. The accessory module also has two run/hold input ports 236.1 and 236.2 respectively connected by means of run/hold signal flow paths 238.1 and 238.2 to receive signals from a pair of run/hold sensors 82.1 and 82.2 respectively, for determining the operative state of corresponding rate meter 30.1 or 30.2. Pressure sensors 86.1 and 86.2 may be utilized to provide pressure input signals to the accessory module 210, as an alternative to using the temperature sensors 85.1 and 85.2. Such alternative input signals are represented in FIG. 16 by the dashed pressure sensors 86.1 and 86.2, which communicate to pressure input ports 232.1 and 232.2 of the accessory module 210 by means of pressure signal flow paths 233.1 and 233.2 respectively. Those skilled in the art will readily recognize other possible input parameters and appropriate sensors suitable for accomplishing the function of providing sensed input signals to the accessory module 210.

Like the independent rate meter controller system, the integrated system 190 and related input and output components are configured for mounting on a tractor 10 and/or the trailing applicator apparatus 5, generally of the type illustrated in FIG. 1. Power to the system 190, including the rate meter controller subsystem, is provided by a battery connected through heavy gauge wire (not shown) to bus master 201. In one embodiment, bus master 201 serves as the power supply for system 190. System power and system ground are transmitted by bus master 201 on interconnected cables.

In the preferred embodiment of the integrated system 190, the base console 202, the rate meter controller console 250, and the console modules related to the other subsystems connected to system 190 are configured for mounting on the tractor 10 so as to be readily accessible to the tractor's operator during the application process. The rate meter controller accessory module 210 and the accessory modules related to other subsystems connected to system 190 are preferably configured for mounting on the applicator apparatus being towed by the tractor 10, close to their respectively controlled implements. The base console 202, the rate meter controller console 250, the bus master 201, the rate meter controller accessory module 210, and other consoles and accessory modules related to subsystems connected to the system 190, are operatively connected to one another by means of appropriate signal flow paths which comprise in part cabling and/or connectors and the bus 206. Generally, the configuration and mounting of the sensors related to the rate meter controller subsystem are generally the same as in the independent rate meter controller previously described herein.

Although it will be appreciated that the integrated agricultural planting and spraying system 190 provides a powerful and flexible control system for integrating the control of a wide variety of agricultural implements, one skilled in the art will appreciate that a number of different types of control systems may be utilized in the control of and communication with the rate meter controller subsystem disclosed herein.

Principles of Operation

In order to better describe the present invention, a discussion of the logical steps performed by the rate meter controller accessory module processor 211 and the rate meter controller console module processor 251 will be deferred pending a discussion of the principles of operation of the various modes of operation of the preferred rate meter controller as used independently or in an integrated system. The rate meter controller is capable of operating in a plurality of modes including, but not limited to normal, calibration, sigma, and automatic calibration modes.

First, the rate meter controller console module 250 and accessory module 210 are capable of operation in the "calibration mode". In the independent system embodiment of the rate meter controller according to the present invention, all calibration inputs are entered at the console module 250 using the two switches 261 and 262. The accessory module 210 requires certain inputs from the console module 250 which are preferably set in the calibration mode or in an initialization routine. For instance, during calibration, the operator must input the desired target application rate in volume of nitrogen per unit area. This input is necessary for the accessory module 210 to determine the rate at which the rate meter controller will dispense the anhydrous ammonia or other agent. The target application rate is typically input from the operator in terms of pounds of nitrogen per acre or similar dimensional value.

The operator must enter the "widths" of the implements during calibration for each rate meter 30.1 and 30.2. If only one rate meter is being used, the second implement width is set to zero. The widths of the implements are used in calculating the area covered and a linear value of the target application rate.

If the rate meter controller uses a magnetic speed sensor 90, the operator must also enter a value which represents the wheel circumference of the wheel 95 to which the magnetic speed sensor 90 is attached. This data allows the accessory module 210 to calculate the speed of the vehicle when the accessory module 210 receives magnetic pulses from the magnetic speed sensor 90. If the rate meter controller uses a radar or an ultrasonic speed sensor, then other predetermined values are entered into the console module 250 during calibration.

A "delta rate" adjustment can be entered for enabling the console module 250 to determine the amount to increase or decrease the target application rate during automatic operation when the operator uses switch 262 to request a change to the target application rate. During manual operation, the operator can adjust the target application rate by as little as 1.0 actual nitrogen per unit area, typically 1.0 pound of nitrogen per acre, by toggling the switch 262.

The operator must also enter values to calibrate the rotary calibration dial 31 itself depending on the particular rate meter 30 being used. The operator enters a maximum meter position corresponding to the particular rate meter being used. The rotary calibration dial must be physically set to the maximum meter position. The operator then enters a minimum meter position. The purpose of this calibration is to ensure that the rotary calibration dial 31 physically corresponds to the maximum and minimum meter positions entered by the operator. In addition, if the particular rate meter has calibration settings on its rotary calibration dial (or linear lever) that exceed the rotating capacity of the servo motor, such as, for example, the Continental Meter C4100, the operator must enter the range of calibration settings that he or she typically uses. The calibration of the minimum and maximum meter positions maintains the rotary calibration dials 30.1 and 30.2 within that particular calibrated range as they are adjusted by their corresponding servo motors 57.1 and 57.2 respectively.

Other values which are preferably entered during calibration relate to the mechanical aspects of the rate meter controller. For example, the operator can input the tank size of the applicator apparatus. The controller 200 will then keep track of and graphically display how much anhydrous ammonia (or other agent) remains in the tank. Another value, preferably embodied as a constant, is designated as the delivery factor to compensate for uncontrollable variables encountered during application, such as different plumbing sizes in the applicator apparatus. A delivery factor can be entered for each meter.

When the rate meter controller is integrated as a subsystem with an integrated agricultural planter and sprayer system as shown in FIG. 16, the rate meter controller subsystem requires inputs from the base console 202 in addition to the above mentioned calibration inputs. The inputs from the base console 202 are preferably set during a calibration mode or an initialization routine. The operator must indicate whether the speed sensor 90 is connected to the rate meter controller accessory module 210 or if the speed sensor 90 is connected to a different module. In addition, the operator must enter a system address for enabling the integrated system 190 to locate and communicate with the rate meter controller accessory module 210 and the rate meter controller console module 250.

Other calibration inputs utilized by the present invention include adjusting the console display contrast, setting a security code, and selecting the system units. Those skilled in the art will know that many other calibration inputs may be useful to the rate meter controller 200 as used in an independent or integrated system, and that the scope of the present invention is not limited by particular calibration inputs.

Second, the rate meter controller console module 250 and accessory module 210 are capable of operation in the "sigma mode" in both the independent and integrated system embodiments. The sigma mode allows the operator to either reset or adjust certain numerical counters in the rate meter controller 200. In the Sigma=0 (Reset Mode), the operator can use the switches 261 and 262 to reset any of the following values to zero: the total area covered, the nurse tank level, and the total $NH_3$ used. In the Sigma=A (Adjust Mode), the operator can use the switches 261 and 262 to increase or decrease any of the same values Third, the rate meter controller console module 250 and accessory module 210 are capable of operation in the "automatic calibration mode". Automatic calibration allows the operator to attach an external device, such as a personal computer, to the accessory module 250 or to the console module 211 for calibration. The external device writes the operator input calibration values directly to the accessory module memory 213, when the external device is attached to the accessory module 210, and to the console module memory 253, when the external device is attached to the console module 250.

Fourth, the rate meter controller accessory module 210 and the rate meter controller console module 250 are capable of operation in the "normal mode". Within the normal mode, the operator has the option of automatic operation or manual operation. During automatic operation, the console module 250 converts the area-based target application rate to a linear value by factoring out the width of the implements. The console module 250 then increases or decreases the target application rate by the delta rate adjustment if the operator has toggled switch 262 to indicate such a desired change. During data transmission within either the independent or integrated systems, the console module 250 transmits the linear target application rate (without the implement width factor and with a delta rate adjustment if switch 262 was toggled) and the delivery factor data to the accessory module 210. The accessory module 210 automatically adjusts the linear target application rate, received from the console module 250, to a calibration dial position variable based on the speed of the tractor, the pressure in the system which is determined using the ambient air temperature, and the delivery factor. The calibration dial position variable becomes the basis for the accessory module 210 control signals to the actuators 50.1 and 50.2 indicating the amount and the direction to rotate the servo motors 57.1 and 57.2, thereby appropriately calibrating the rate meters 30.1 and 30.2 respectively. The actuators 50.1 and 50.2 each return a feedback signal to the accessory module 210 indicating the success of rotating the servo motors 57.1 and 57.2. During data transmission, the accessory module 210 transmits sufficient data to the console module 250 for displaying the ground area covered, the amount of $NH_3$ used, the expected application rate, the calibration setting on the rotary calibration dials 31.1 and 31.2, the nurse tank level, the vehicle speed, and other related information on the console module user interface 270, and on the base console user interface 208 in the integrated system 190.

During manual operation of the rate meter controller 200, the accessory module 210 makes no automatic adjustments to the linear target application rate. The accessory module 210 will only adjust the linear target application rate to a calibration on dial position on variable based on the input signals provided by the operator through switch 262. The accessory module 210 will continue to calculate the expected application rate based on the calibration dial positions 31.1 and 31.2, the ambient air temperature, and the delivery factor, for displaying on the console module user interface 270. In addition, the accessory module 210 will continue to pass sufficient data to the console module 250 for displaying the same information during manual operation as is displayed during automatic operation.

The console module 250 and the accessory module 210 preferably utilize interrupts for handling the transmission of data between the modules 250 and 210 as described in U.S. Pat. No. 5,260,875, and fully incorporated herein by reference. When the rate meter controller 200 is utilized as an independent system, it mimics the communication networking, for the transmitting data between modules 210 and 250, that is used in the integrated system 190. Therefore, the explanation of data transmission in the U.S. Pat. No. 5,260,875 and discussion hereinafter, pertains equally to the rate meter controller independent or integrated system. The console module 250 transmits data to the accessory module 210 every 32 milliseconds (or 0.032 seconds) when the system communication enters the rate meter controller designated time slice within a new sector. Similarly, during the same designated time slice, within the same new sector, the accessory module 210 transmits data to the console module 250. The designated time slice for transmitting data related to the rate meter controller generally permits the transmission of data pertaining to the control and operation of only one rate meter 30.1 or 30.2, during a sector. Thus, in the designated time slice of a new sector the accessory module 210 and the console module 250 will transmit data pertaining to the rate meter 30.1 or 30.2, about which data was not transmitted in the previous sector's designated time slice. In any one time slice, the console module 250 transmits the linear target application rate and the delivery factor pertaining to one of the rate meters 30.1 or 30.2. In addition, the console module 250 transmits status flags related to automatic or manual operation within the normal mode, whether switches 261 and 262 have been toggled, and other information concerning the system. In the same time slice, the accessory module 210 transmits the calibration dial position, the expected application rate, and the temperature, pertaining to the same rate meter 30.1 or 30.2. In addition, the accessory module 210 sends status flags related to the operational status of both rate meters 30.1 and 30.2, the operational status of both servo motors 57.1 and 57.2, the travel or rotation status of both servo motors 57.1 and 57.2, and other information concerning the system. The data in the status flags transmitted by the accessory module 210, pertaining to both rate meters 30.1 and 30.2, is the only information sent on a time slice that pertains to both rate meters 30.1 and 30.1. The rest of the data transmitted on a particular time slice pertains only to one rate meter 30.1 or 30.2.

Logic Flow Rate Meter Controller

Figure 18:
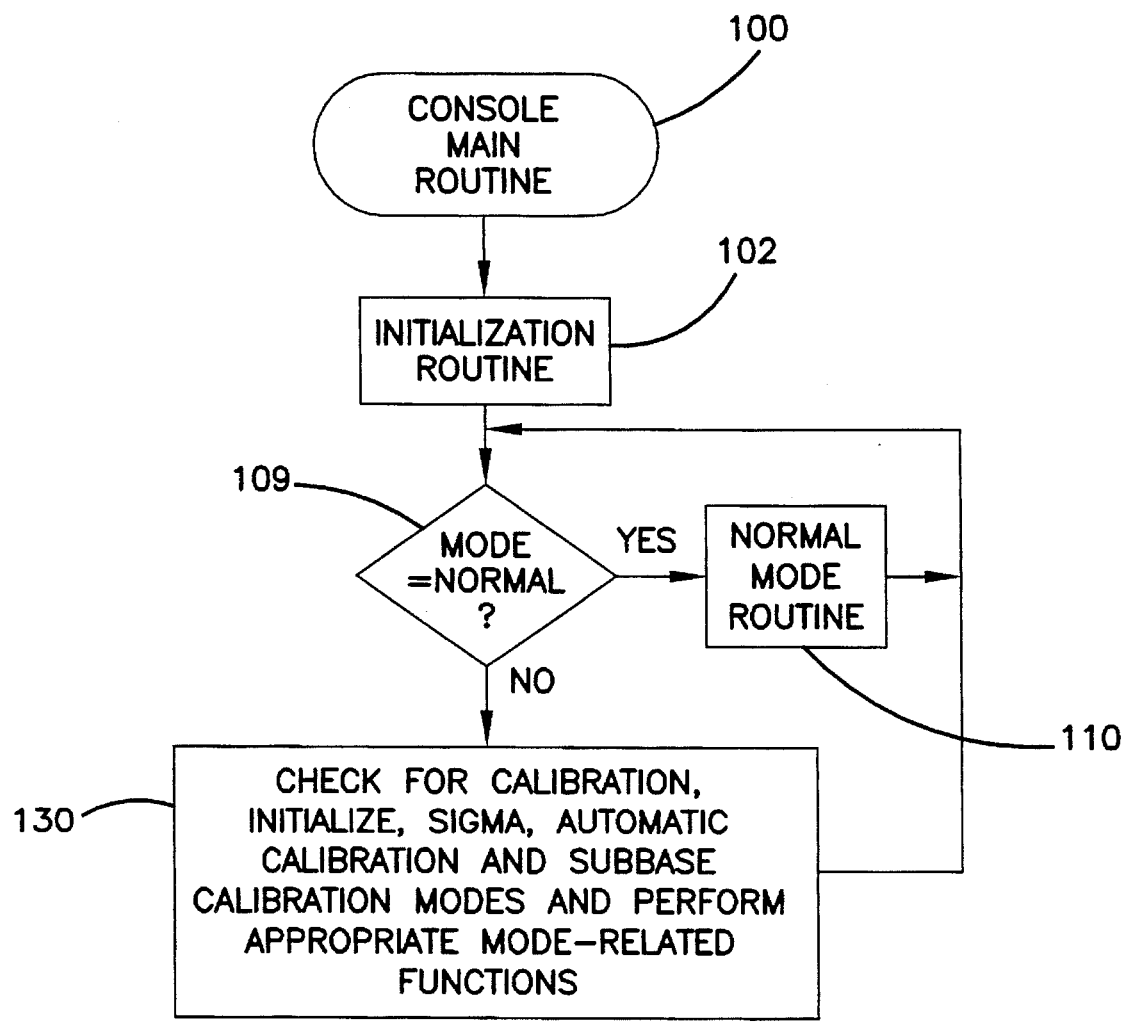
FIG. 18 illustrates a flow chart functionally describing the primary program flow for the Console Module portion of the electronic rate meter controller of the previous figures.
Figure 20:
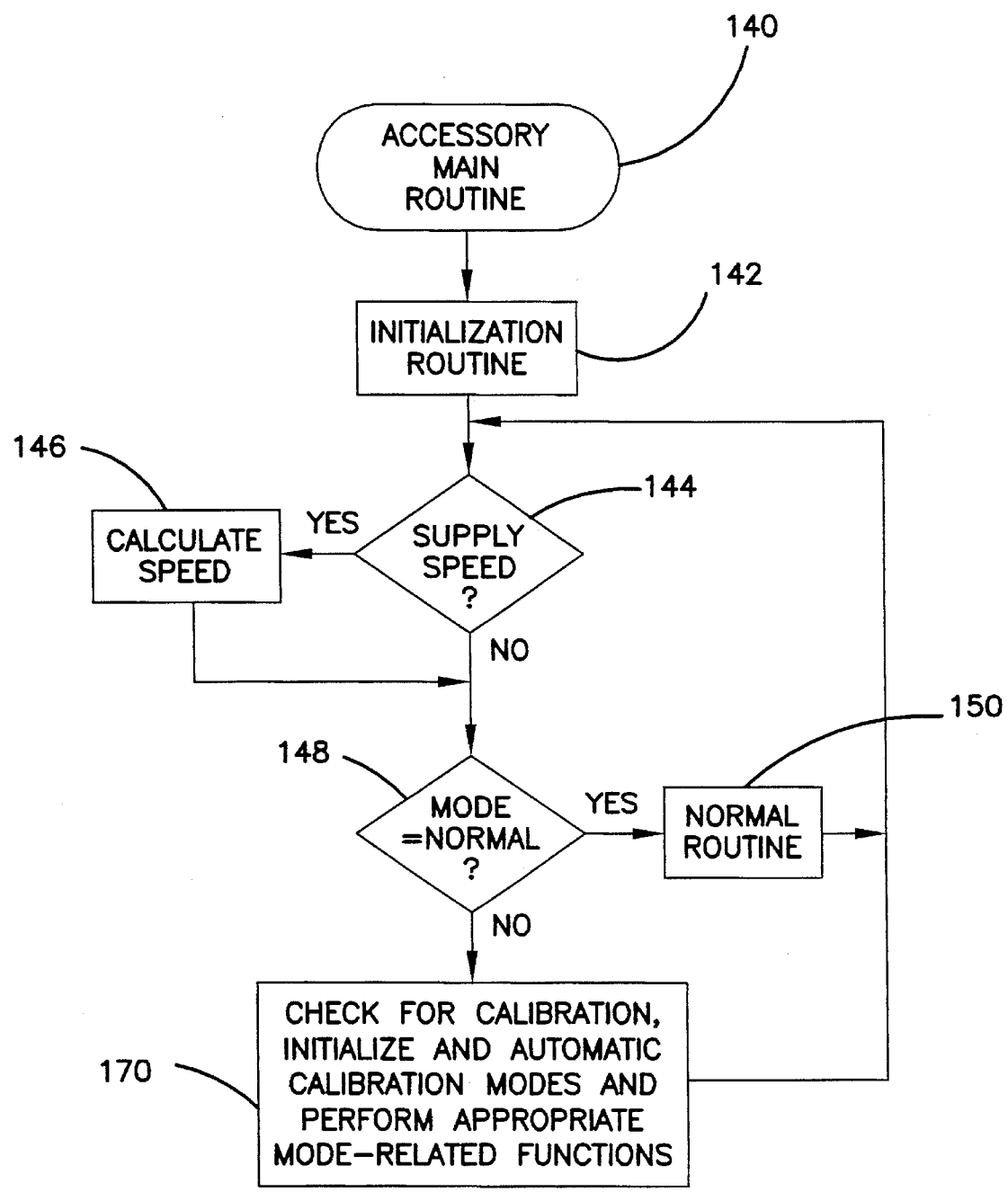
FIG. 20 illustrates a flow chart functionally describing the primary program flow for the Accessory Module portion of the electronic rate meter controller of the previous figures.
Figure 21A:
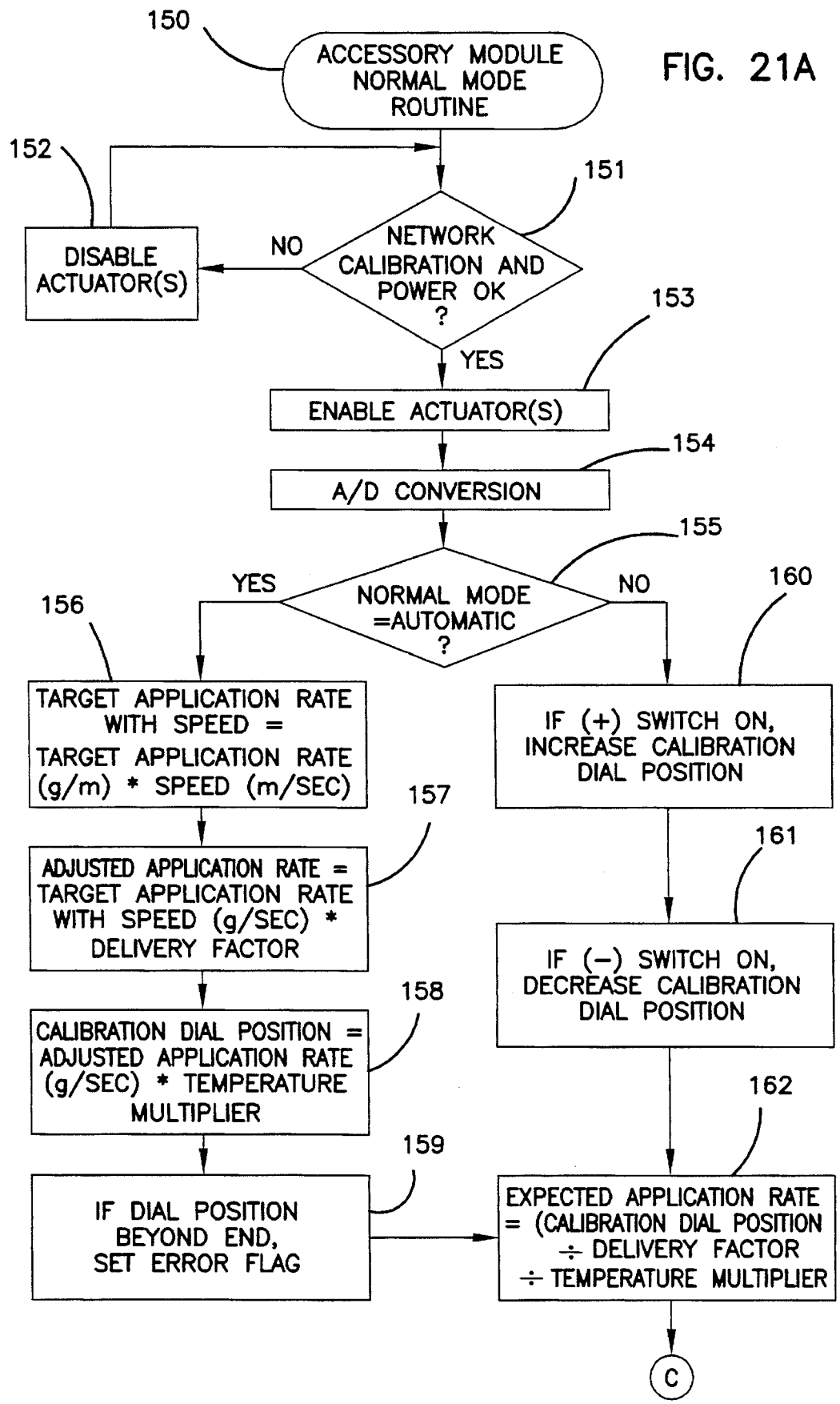
FIGS. 21(a)–21(b) collectively illustrate a flow chart functionally describing the program flow for the normal mode routine of FIG. 20.
Figure 21B:
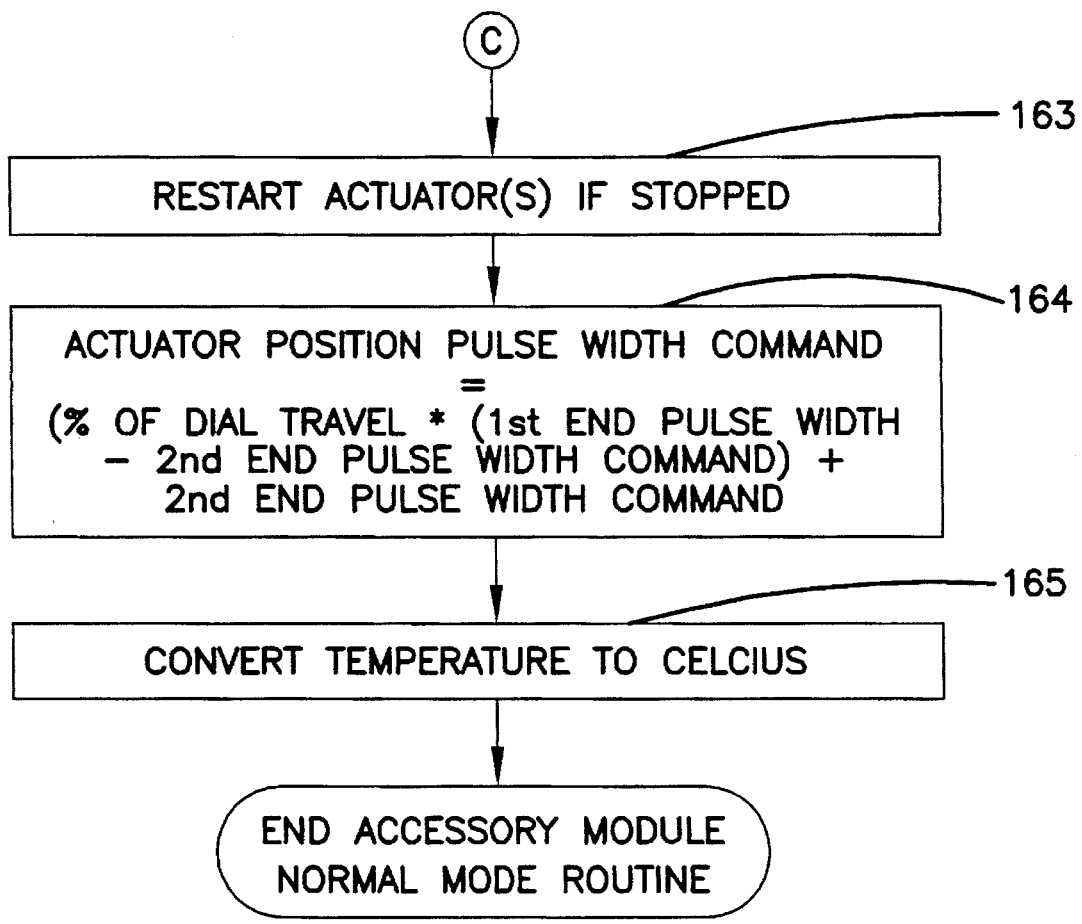

FIGS. 18 and 19 are flow charts showing the primary program flow for the console module 250 and its "normal mode" of operation respectively, consistent with the present invention. FIGS. 20 and 21 are flow charts showing primary program flow for the accessory module 210 and its "normal mode" of operation respectively, consistent with the present invention. The code for the program flow shown in FIGS. 18 and 19 is stored in the console module memory 253 for execution by processor 251, and the code for the program flow shown in FIGS. 20 and 21 is stored in the accessory module memory 213 for execution by processor 211.

The overall operation of the code for executing the console module 250 of the rate meter controller 200 is shown generally in FIG. 18. Upon startup, the main routine 100 executes an initialization routine 102 that performs general housekeeping functions such as setting flags, downloading data from the EEPROM 252, enabling communication over the bus 206, setting flags to indicate whether rate meter controller 200 is operating independently or as or as a subsystem of an integrated system, enabling the interrupts, and other initialization tasks. The operation of the initialization routine 102 will vary depending upon the particular application, hardware and other variables utilized in the rate meter controller independent or integrated system. However, the code necessary to achieve proper initialization will be known by those skilled in the art.

The main routine 100 generally cycles between a "normal mode" routine and "other mode" routines generally designated by the block 130. In the preferred embodiment, the main routine 100 cycles every 16 milliseconds (0.016 seconds). The main routine 100 first determines whether the mode of operation is normal in block 109. If the mode of operation is normal, the main routine 100 calls the normal mode routine 110. If the mode of operation is not normal, the main routine 100 checks for other modes of operation in block 130 and calls the appropriate subroutines or performs the appropriate functions. In the preferred embodiment, the other mode routines 130 consist of checking for calibration mode, automatic calibration mode, sub-base calibration mode and initialize mode and performing the appropriate mode-related routines or functions to handle the various modes of operation, previously discussed herein, but not shown in FIGS. 18 and 19. Ordinary system functions, such as appropriate calibration, while not shown, will be understood to be present by those skilled in the art. Additionally, other routines and functions may be utilized in the main routine 100 to handle certain functions of the subroutines 102, 110 and 130, and to handle timing and error checking functions.

Figure 19A:
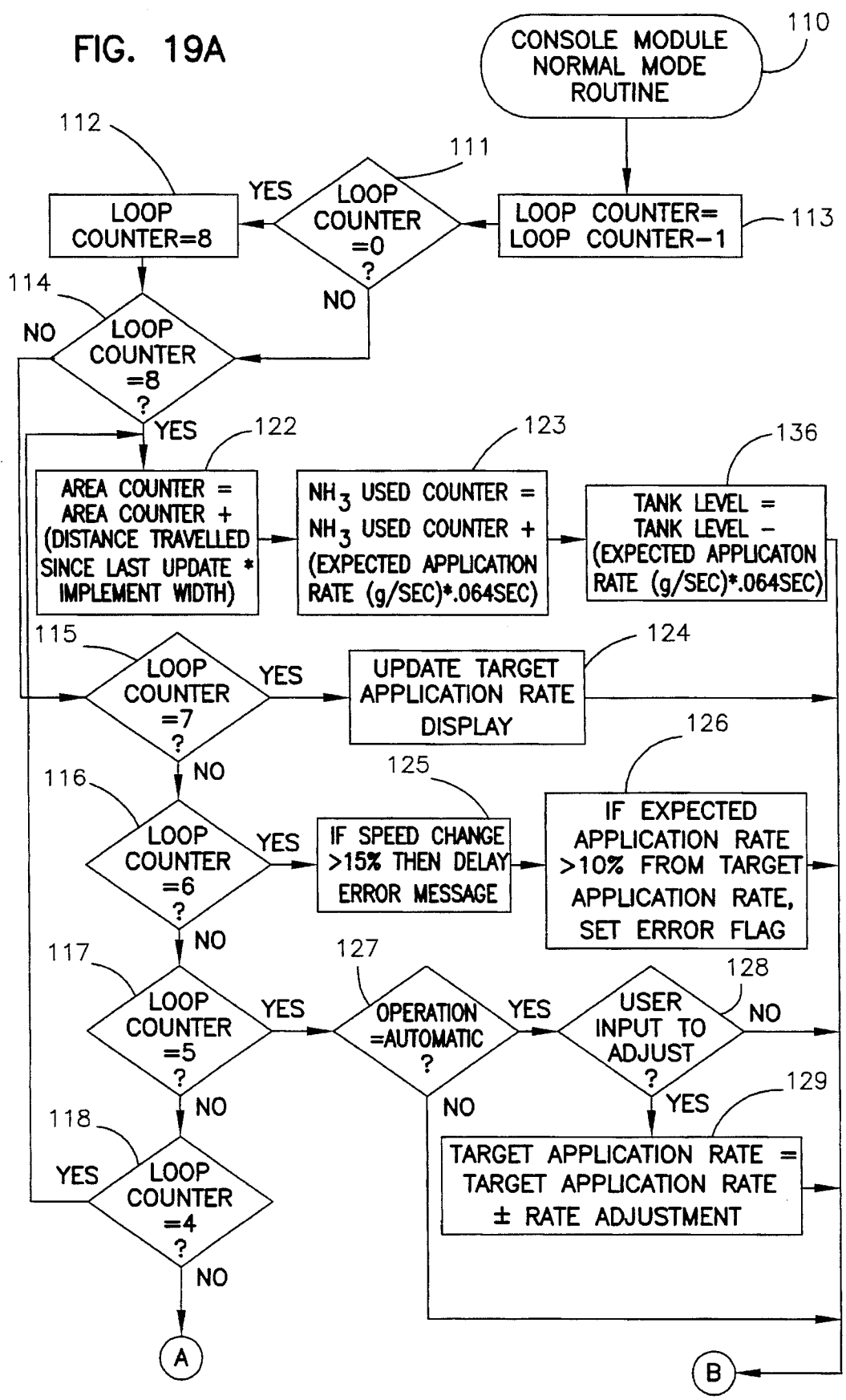
FIGS. 19(a)–19(b) collectively illustrate a flow chart functionally describing the program flow for the normal mode routine of FIG. 18.
Figure 19B:
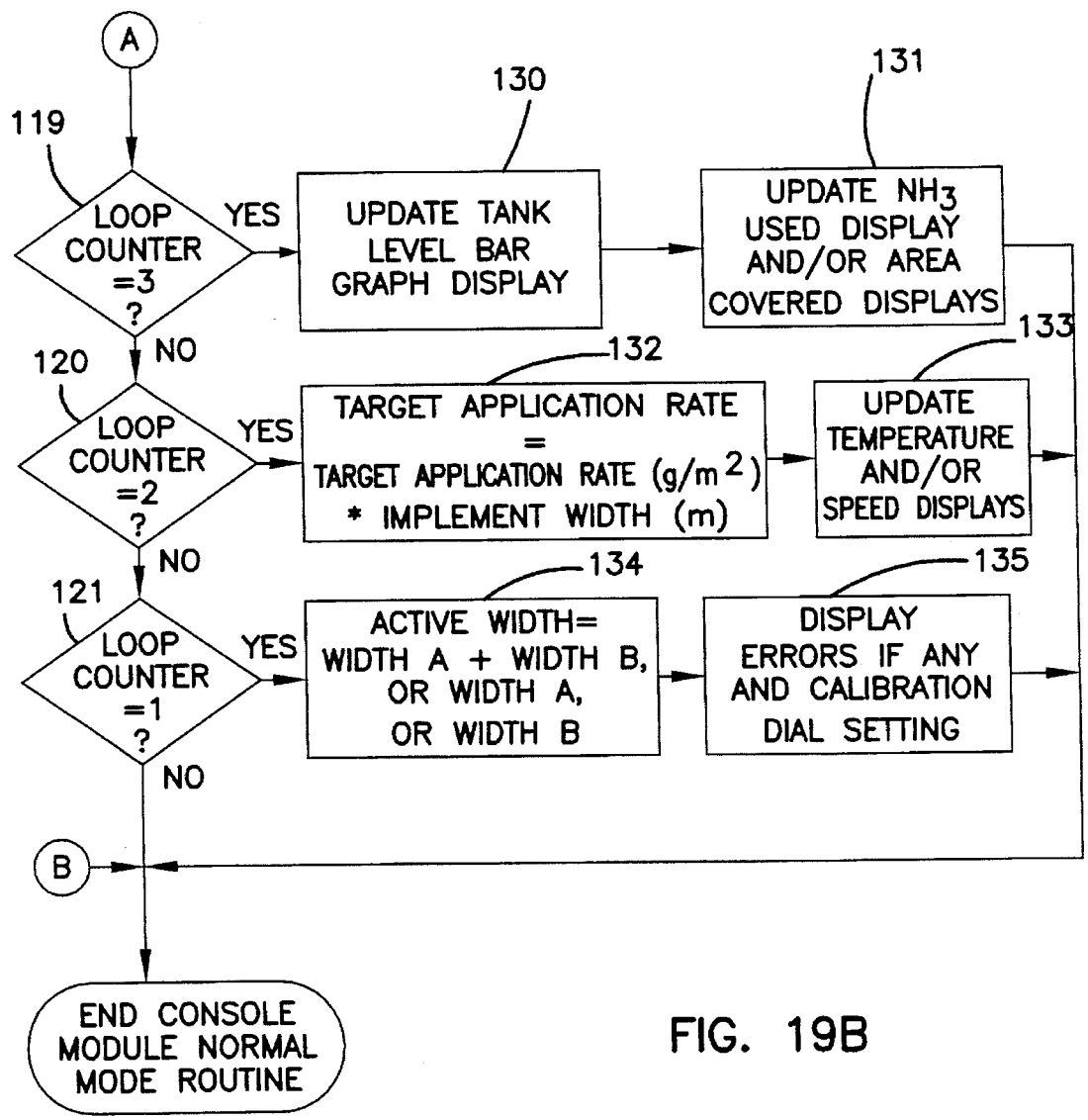

The code for executing the console module normal mode routine 110 is shown generally in FIGS. 19(a)–19(b). Generally, the normal mode routine 110 executes a particular function based on a loop counter interval, one (1) through eight (8). The normal mode routine 110 is called by the main routine 100 every 16 milliseconds (or 0.016 seconds). Because the loop counter has a total of eight (8) intervals, the functions associated with each interval are performed every 128 milliseconds (or 0.128 seconds). Block 113 first decrements the loop counter by one (1). Block 111 then checks the loop counter to determine whether it needs to be reset. If the loop counter equals zero (0), then block 112 resets it to eight (8) and the normal mode routine 110 then executes the particular functions associated with loop counter interval eight (8). If block 111 found the loop counter not equal to zero (0) then the normal mode routine 110 executes the particular functions associated with the corresponding loop counter interval.

Block 114 checks if the loop counter equals eight (8). If the loop counter equals eight (8), then block 122 updates the area counter. The area counter is updated using the following equation:

*Area counter=Area counter+(Distance travelled since last update * Implement width)*

The distance travelled since the last update is determined whenever the speed is calculated. In the independent rate meter controller, when the speed is calculated in accessory module 210, the accessory module 210 also calculates the distance travelled variable and sends that data to the console module 250 on the same time slice as the speed variable. After calculating the area counter in block 122, block 123 then updates an $NH_3$ used counter and a tank level counter. The $NH_3$ used counter is calculated by the following equation:

*$NH_3$ used counter=$NH_3$ used counter+(Expected application rate (g/sec) * 0.064 sec)*

The expected application rate variable in the above equation is transmitted by the accessory module 210 to the console module 250. When accessory module 210 sets the rotary calibration dial 31 at a particular setting based on pounds of nitrogen per hour, it computes the expected application rate in grams per second (shown in FIG. 21(a), block 162); and then transmits that information to the console module 250. Block 136 also uses the expected application rate to update the tank level using the following equation:

*Tank level=Tank level−(Expected application rate (g/sec) * 0.064 sec)*

Although interval eight (8) of the loop counter is performed every 128 milliseconds (or 0.128 seconds), the expected application rate is multiplied by 64 milliseconds (or 0.064 seconds) because blocks 122, 123 and 136 are also performed during loop counter interval four (4). Therefore, the area counter, the $NH_3$ used counter and the tank level are actually being updated every 64 milliseconds (or 0.064 seconds). Performing blocks 122, 123 and 136 at intervals eight (8) and four (4) of the loop counter is necessary because the volatile memory storage space used to retain the values for the associated counters in blocks 122, 123 and 136 needs frequent updating to prevent an overflow in the storage space. As previously explained, the main routine 100 passes through the normal mode routine 110 every 16 milliseconds (or 0.016 seconds). Because the loop counter has a total of eight (8) intervals, each interval is performed every 128 milliseconds (or 0.128 seconds). With blocks 122, 123 and 136 being executed at loop counter intervals eight (8) and four (4), these blocks are performed every 64 milliseconds (or 0.064 seconds), thus decreasing the possibility of overflow in the storage space.

If the loop counter does not equal eight (8), block 115 checks if the loop counter equals seven (7). If the loop counter equals seven (7), block 124 updates the display of the application rate on the LCD display 275 of the console module user interface 270.

If the loop counter does not equal seven (7), block 116 checks if the loop counter equals six (6). If the loop counter equals six (6), block 125 delays error messages if the tractor speed has changed by more than a predetermined amount, in order to allow the actuators 50.1 and 50.2 more time to adjust the rate meters 30.1 and 30.2 to compensate for the speed change. The preferred embodiment enables the error message delay in block 125 if the vehicle speed changes by more than fifteen percent (15%). However, any percentage of speed change could be utilized to give the actuators 50.1 and 50.2 more time to compensate for the speed change. Block 126 then generates an error message if the expected application rate varies more than ten percent (10%) from the target application rate. Typically, this would occur if the servo motor stopped or if the target application rate was beyond the range of the calibration dials 31.1 and 31.2, if, for example, the vehicle speed increased such that the maximum setting on the calibration dials 31.1 and 31.2 could not maintain the target application rate previously entered by the operator.

If the loop counter does not equal six (6), block 117 checks if the loop counter equals five (5). If the loop counter equals five (5), block 127 checks whether the system is in manual or automatic operation of the normal mode. If the system is in manual operation, block 127 bypasses any operative functions and goes to the end of the normal mode routine 110. If the system is in automatic operation, block 128 checks whether the operator indicated a desire to increase or decrease the target application rate through switch 262. If the operator did not toggle switch 262, block 128 bypasses any operative functions and goes to the end of the normal mode routine 110, If the operator did toggle switch 262, however, block 129 will adjust the target application rate accordingly. If the operator toggled switch 262 to the negative switch position 262.2, block 129 will decrease the target application rate by the delta rate adjustment previously entered by the operator, using the following equation:

*Target application rate=Target application rate−Delta rate adjustment*

Alternatively, if the operator toggled switch 262 to the positive switch position 262.1, block 129 will increase the target application rate by the delta rate adjustment previously entered by the operator, using the following equation:

*Target application rate=Target application rate+Delta rate adjustment*

The new target application rate will be transmitted to the accessory module 210 during the next data transmission interrupt.

If the loop counter does not equal five (5), block 118 checks if the loop counter equals four (4). If the loop counter equals four (4), then control passes to block 122 for updating the area counter, to block 123 for updating the $NH_3$ used counter, and finally to block 136 for updating the tank level counter, as explained in the previous discussion related to loop counter interval eight (8).

If the loop counter does not equal four (4), block 119 checks if the loop counter equals three (3). If the loop counter equals three (3), then control passes to block 130 for updating the display of the tank level bar graph on the LCD display 275 of the console module user interface 270. Control then passes to block 131 for updating the display of the $NH_3$ used, or the area covered display on the LCD display 275 of the console module user interface 270, and on the primary user interface 208 of the base console if the rate meter controller is used in an integrated system.

If the loop counter does not equal three (3), block 120 checks if the loop counter equals two (2). If the loop counter equals two (2), then control passes to block 132 for updating the target application rate to a linear value, using the following equation:

*Target application rate=Target application rate ($g/m^2$) \* Implement width (m)*

The new target application rate is transmitted to the accessory module 210 during the next data transmission interrupt, for adjusting the rate meters 30.1 and 30.2 if necessary. Thus, the accessory module 210 does not have to account for the widths of the implements in its calculations because the console module 250 performs this function. Control then passes to block 133 for updating the display of the speed and/or the temperature on the LCD display 275 of the console module user interface 270, and on the primary user interface 208 of the base console 202 if the rate meter controller is used in an integrated system.

If the loop counter does not equal two (2), block 121 checks if the loop counter equals one (1). If the loop counter equals one (1), then control passes to block 134 for calculating the active width of the implement. If the operator is using two rate meters 30.1 and 30.2, then the active width is calculated by simply adding together the implement widths associated with each rate meter 30.1 and 30.2. If the operator is using only one rate meter 30.1 or 30.2, then the active width is calculated using only the width of the implement associated with the rate meter being used. Control then passes to block 135 for updating the display of the calibration dial setting or for displaying an error message if one has been generated, on the LCD display 275 of the console module user interface 270.

As will be appreciated by those skilled in the art, many of the functions performed in the normal mode routine 110 of the console module 250, could alternatively be performed in the accessory module 210. However, the preferred embodiment utilizes splitting of certain functions between the console module 250 and the accessory module 210 in order to equalize the processing burden in the accessory module processor 211 and the console module processor 251.

The overall operation of the code for executing the accessory module 210 of the rate meter controller 200 is shown generally in FIG. 20. Upon startup, the main routine 140 executes an initialization routine 142 that performs general housekeeping functions such as setting flags, downloading data from the EEPROM 252, enabling communication over the bus 206, enabling the actuators 50.1 and 50.2, enabling the interrupts, and other initialization tasks. The operation of the initialization routine 142 will vary depending upon the particular application, hardware and other variables utilized in the rate meter controller independent or integrated system. However, the code necessary to achieve proper initialization will be known by those skilled in the art.

The main routine 140 generally cycles through a "calculate speed" routine 146 and then either a "normal mode" routine 150 or "other mode" routines 170. In the preferred embodiment, the main routine 140 cycles every 32 milliseconds (or 0.032 seconds). After the initialization routine 142, block 144 determines whether the sensed vehicle speed is supplied to the accessory module 210. Block 144 checks whether the speed sensor 90 is connected to the accessory module 210. If the speed sensor 90 is connected to the accessory module 210, then the speed is calculated in block 146. If the system uses a magnetic speed sensor 90, the processor 211 may utilize a polling routine to read in the number of pulses sent by the magnets 92 attached around the wheel 95. However, if the circumference of the wheel 95 is too small, for example, less than or equal to 20 millimeters, then the magnetic pulses will be sent at a rate too fast for the polling routine in the processor 211. Therefore, the processor 211 may have to use an external counter to accumulate the magnetic pulses. The Intel microprocessor 8051, which is the processor used in the preferred embodiment of the present invention, has such an external counter.

Block 148 then checks whether the mode of operation is normal. If the mode of operation is normal, the main routine 140 calls the normal mode routine 150. If the mode of operation is not normal, the main routine 140 checks for other modes of operation in block 170 and calls the appropriate subroutines or performs the appropriate functions. In the preferred embodiment, the other mode routines 170 consist of checking for calibration mode, automatic calibration mode and initialize mode and for performing the appropriate mode-related routines or functions to handle the various modes of operation, previously discussed herein, but not shown in FIGS. 20 and 21. Ordinary system functions, such as calibration, while not shown, will be understood to exist by those skilled in the art. Additionally, other routines and functions may be utilized in the main routine 140 to handle certain functions of the subroutines 142, 146, 150, and 170 and to handle timing and error checking functions.

The code for executing the accessory module normal mode routine 150 is shown generally in FIGS. 21(*a*) and 21(*b*). In block 151, if the time slice is not found, the calibration in the network among modules does not match, or the power is low, then block 152 disables the actuators 50.1 and 50.2 and continues checking until the error(s) are corrected, or until the system power is turned off. Otherwise, block 153 will enable the actuators 50.1 and 50.2. Control then passes to block 154 where the A/D conversion begins for the temperature signals from the temperature sensors 85.1 and 85.2, and the feedback signals from the actuators 50.1 and 50.2. Also, if pressure sensors 86.1 and 86.2 are utilized, then block 154 begins the A/D conversion of their corresponding pressure signals. The processor 211 handles the receipt of the sensor and feedback data through interrupts.

Block 155 then determines whether the system is in automatic operation or manual operation. If the system is in automatic operation, then the normal mode routine 150 generally cycles through several calculations to adjust the target application rate received from the console module 250. First, block 156 uses the following equation to factor in the sensed vehicle speed:

> Target application rate with speed=Target application rate (g/m) * Speed (m/sec)

Block 157 compensates for the delivery factor passed from the console module 250 and entered during calibration mode to account for uncontrollable variables such as, for example, plumbing differences in the actual applicator apparatus. Block 157 uses the following equation:

> Adjusted application rate=Target application rate with speed (g/sec) * Delivery factor Finally, block 158 converts the adjusted application rate to compensate for the ambient air temperature changes which affect pressure, using the following equation:

> Calibration dial position=Adjusted application rate (g/sec) * Temperature multiplier The temperature multiplier is determined by using the sensed ambient air temperature to reference a table in memory 213 with corresponding temperature multipliers, the temperature multipliers, which are used in the above equation to compensate for the changed system pressure resulting from the ambient air temperature changes. Then, block 159 sets an error flag if the calibration dial position is beyond its maximum calibrated position or below its minimum calibrated position. Control is then routed to block 162, which begins the common functions for automatic and manual operation, and which will be described after a discussion of the functions performed when the rate meter controller 200 is in manual operation.

If the independent or integrated rate meter controller is in manual operation, then control passes from block 155 to block 160. Block 160 increases the calibration dial position if the switch 262 was toggled to the positive switch position 262.1. However, if the switch 262 was toggled to the negative switch position 262.2, block 161 decreases the calibration dial position. Blocks 160 and 161 will increase and decrease, respectively, the calibration dial positions by as little as 1.0 actual nitrogen per unit area (typically 1 pound of nitrogen per acre) each time switch 262 is toggled. However, if the operator holds switch 262 in either the positive switch position 262.1 or the negative switch position 262.2, then the appropriate block 160 or 161 will increase or decrease, respectively, the calibration dial position at a faster rate each time the normal mode routine 150 is executed.

Control then passes to block 162, which begins a string of functions performed whether the operation is automatic or manual. Block 162 calculates the time-based expected application rate to transmit to the console module 250, using the following equation:

> Expected application rate=(Calibration dial position/Delivery Factor)/Temperature Multiplier Block 163 checks whether the actuators 50.1 and 50.2 reached their target positions during the previous cycle through the normal mode routine 150. If either actuator 50.1 or 50.2 stopped before reaching its target position, block 163 will run the actuators 50.1 and/or 50.2 in the opposite direction until they restart.

Block 164 calculates the pulse width command to send to the actuators 50.1 and 50.2 for adjusting the rate meter application rate based on the calibration dial position just calculated, using the following equation:

> Actuator position pulse width command=(Percentage of dial travel * (1st end pulse width command–2nd end pulse width command))+2nd end pulse width command First, block 164 looks up the percentage of dial travel in table stored in memory 213, based on the calibration dial position, converted to pounds of nitrogen per hour. The 1st end pulse width command is the output that results in the maximum actuator position movement. The 2nd end pulse width command is the output that results in the minimum actuator position movement. Block 164 uses these values in the above equation to find the actuator position pulse width command to rotate the actuators 50.1 and 50.2 by an amount that correspondingly rotates the calibration dials 31.1 and 31.2 to the calculated calibration dial position.

Finally, block 165 converts temperature to celsius for sending to the console module 250 for displaying on the LCD display 275 of the console module user interface 270, and then the normal mode routine ends.

While the invention has been described with respect to several different embodiments thereof and with respect to specific types of components used therein, it will be understood by those skilled in the art that the invention is not to be limited in any manner by the specifics of either the described embodiments or components. Such embodiments and components have been described to illustrate clear examples of how the principles of the invention can be specifically applied. All alternatives and modifications of the foregoing are intended to be covered within the broad scope of the appended claims.

What is claimed is:

1. An electronic rate meter controller for controlling dispensing of a meterable material by an applicator of the type having a rate meter that controls the rate of material flow through the applicator in direct response to movement of a manually adjustable primary control member, comprising:

(a) actuator means configured for operative mechanical connection to the manually adjustable primary control member of the rate meter and to receive an electrical control signal, for mechanically moving the manually adjustable primary control member in controlled response to said electrical control signal; said actuator means being operatively connectable to said manually adjustable primary control member without requiring structural changes to be made to the applicator or rate meter; and (b) electronic control means operatively connected to said actuator means for providing said electrical control signal to mechanically move the manually adjustable primary control member to desired control positions; wherein the rate of manual flow through the applicator is adjusted in real time in response to said electrical control signal.

2. The rate meter controller as recited in claim 1, including signal flow means operatively connecting said actuator means and said electronic control means in spaced-apart relationship to one another such that at least a portion of said electronic control means can be operatively remotely positioned relative to said actuator means.

3. The rate meter controller as recited in claim 1, wherein said actuator means comprises:

(a) a servo motor controllably energized in response to said electrical control signal for rotatably moving an output shaft; and (b) mechanical linkage means configured to operatively connect said output shaft with the manually adjustable primary control member of said rate meter for moving the manually adjustable primary control member in response to movement of said output shaft.

4. The rate meter controller as recited in claim 1, further including means for operatively mounting said actuator means to said rate meter.

5. The rate meter controller as recited in claim 1, wherein said electronic control means includes memory means for storing data representative of control characteristics of the rate meter.

6. The rate meter controller as recited in claim 5, wherein said electronic control means further include user interface means for receiving user input relating to the control characteristics of the rate meter, for transforming said user input to said data representative of control characteristics, and for transmitting said data representative of control characteristics to said memory means.

7. The rate meter controller as recited in claim 1, wherein said actuator means produces an actuator status signal and wherein said electronic control means comprises:

(a) processor means suitable for connection with memory means, user interface means, and actuator interface means, for accessing program code and data stored in said memory means, for receiving user input information from and providing status and control information to said user interface means, for generating said electrical control signal in response to a received said actuator status signal and to said user input information;

(b) memory means operatively connected to said processor means, for storing program code and data used in generating said electrical control signal for said actuator means, and used in generating said status and control information for said user interface means;

(c) user interface means operatively connected to said processor means, for displaying said status and control information received from said processor means relating to application of material whose flow is metered by the rate meter, and for receiving and transmitting said user input information to said processor means, to enable remote user control of the rate meter; and (d) actuator interface means operatively connected to said processor means and said actuator means for conditioning and transmitting said electrical control signal from said processor means to said actuator means, and for conditioning and transmitting said actuator status signal from said actuator means to said processor means.

8. The rate meter controller as recited in claim 7, further comprising communication means for operatively connecting said electronic control means to an integrated electronic system that manages a plurality of agricultural devices in which said electronic rate meter controller forms a subsystem of the integrated electronic system, wherein said communication means allows communication between the electronic rate meter controller and said plurality of agricultural devices of the integrated electronic system.

9. The rate meter controller as recited in claim 7, further comprising run/hold sensor means, operatively connected to said electronic control means, for detecting an on state and an off state of said rate meter and for providing an electrical run/hold signal indicative of such on and off states to said electronic control means.

10. The rate meter controller as recited in claim 9 wherein said electronic control means further includes program means and wherein said processor executes said program means in response to said electrical run/hold signal, to compute the total area over which material metered by the rate meter was applied.

11. The rate meter controller as recited in claim 7 in which said actuator means further comprises:

(a) actuator feedback means, operatively connected to said actuator interface means, for generating said actuator status signal representing the real-time position of the manually adjustable primary control member;

(b) wherein said electronic control means further includes program means; and (c) wherein said processor executes said program means responsive to said actuator status signal, for displaying on said user interface means, a representation of the real-time position of the manually adjustable primary control member.

12. The rate meter controller as recited in claim 7 further comprising:

(a) a speed sensor means, electrically connected to said electronic control means, for sensing movement speed of the applicator, for generating an electrical speed signal indicative of the sensed speed, and for providing the electrical speed signal to said electronic control means;

(b) wherein said electronic control means further includes program means; and (c) wherein said processor executes said program means responsive to said electrical speed signal for generating said electrical control signal for said actuator means adjusted for the sensed applicator speed.

13. The rate meter controller as recited in claim 7 further comprising temperature sensor means, electrically connected to said electronic control means, for sensing ambient air temperature, for generating an electrical temperature signal indicative of the sensed ambient air temperature, and for providing the electrical temperature signal to said electronic control means.

14. The rate meter controller as recited in claim 13 wherein said electronic control means further includes program means; and wherein said processor executes said program means responsive to said electrical temperature signal, for generating said electrical control signal for said actuator means adjusted for the sensed ambient air temperature; wherein said ambient air temperature is correlatable to pressure within the applicator dispensing system for said meterable material.

15. The rate meter controller as recited in claim 14 further comprising:

(a) a speed sensor means, electrically connected to said electronic control means, for sensing movement speed of the applicator, for generating an electrical speed signal indicative of the sensed speed, and for providing the electrical speed signal to said electronic control means;

(b) wherein said electronic control means further includes program means; and (c) wherein said processor executes said program means responsive to said electrical speed signal and said electrical temperature signal for generating said electrical control signal for said actuator means adjusted for the sensed movement speed and for the sensed ambient air temperature.

16. The rate meter controller as recited in claim 7 further comprising pressure sensor means, electrically connected to said electronic control means, for sensing pressure in the applicator dispensing system containing material whose flow is metered by the rate meter, for generating an electrical pressure signal indicative of the sensed system pressure, and for providing the electrical pressure signal to said electronic control means.

17. The rate meter controller as recited in claim 16 wherein said electronic control means further includes program means; and wherein said processor executes said program means responsive to said electrical pressure signal, for generating said electrical control signal adjusted for system pressure.

18. The rate meter controller as recited in claim 16 further comprising:
 (a) speed sensor means, electrically connected to said electronic control means, for sensing movement speed of the applicator, for generating an electrical speed signal indicative of the sensed speed, and for providing the electrical speed signal to said electronic control means;
 (b) wherein said electronic control means further includes program means; and
 (c) wherein said processor executes said program means responsive to said electrical speed signal and said electrical pressure signal for generating said electrical control signal for said actuator means adjusted for the sensed movement speed and the sensed system pressure.

19. The rate meter controller as recited in claim 1 wherein the manually adjustable primary control member includes a rotatable shaft member that is manually adjustable; and wherein said actuator means is configured for operative mechanical connection to said rotatable shaft member.

20. The rate meter controller as recited in claim 19 wherein said actuator means further comprises a mechanical arm, configured and arranged to rotate the manually adjustable primary control member shaft member in response to said electrical control signal.

21. The rate meter controller as recited in claim 1, wherein the manually adjustable primary control member comprises a linearly movable member, and wherein said actuator means is configured for operative connection to said linearly movable member.

22. The rate meter controller as recited in claim 1, wherein said actuator means includes means for generating status information relating to operational status of said actuator means, and wherein said electronic control means comprises:
 (a) accessory module means, operatively connected to receive said status information from said actuator means, for generating said electrical control signal responsive to said status information and to a received console output signal, and for generating an output status and control signal indicative of information and parameters related to said accessory module means, said actuator means and the rate meter; and
 (b) console module means operatively connected to said accessory module means, and configured for accessibility by a user and to operatively receive user input information for displaying information to a user in response to said output status and control signal and to said user input information, and for generating said console output signal responsive to said user input information; whereby a user can remotely control and monitor operation of the rate meter from said console module means.

23. A system for managing a plurality of agricultural devices, one of said plurality of agricultural devices having an applicator for dispensing a meterable material by means of a rate meter that controls the rate of material flow through the applicator in response to movement of a manually adjustable primary control member, the system comprising:
 (a) user interface means for selectively displaying status and control information associated with the plurality of agricultural devices and for receiving user input information for selectively controlling operation of the plurality of agricultural devices; and
 (b) electronic integrated system control means, operatively connected between said user interface means and the plurality of agricultural devices, for identifying each agricultural device to be managed, for storing program code and data, for accessing stored program code and data associated with each identified agricultural device, for receiving user input information from said user interface means, for generating electrical control signals controlling the plurality of agricultural devices and for providing said status and control information to said user interface means;
 (c) wherein said electronic integrated system control means comprises an electronic rate meter controller for controlling said one of said plurality of agricultural devices, comprising:
  (i) actuator means configured for operative mechanical connection to the manually adjustable primary control member of the rate meter and to receive an electrical control signal, for mechanically moving the manually adjustable primary control member in controlled real time response to said electrical control signal; and
  (ii) electronic control means operatively connected to said actuator means for providing said electrical control signal to mechanically move the manually adjustable primary control member to desired control positions; wherein the rate of material flow through the applicator is adjustably controlled in real time in response to said electrical control signal.

24. A method for automatically controlling an applicator connected rate meter of the type that has a manually adjustable primary control member that changes the flow rate of material through the rate meter when adjustably moved, comprising:
 (a) sensing changes in at least one parameter, the variance of which affects the desired flow rate of the rate meter;
 (b) providing an electrical input signal in response to the at least one sensed parameter changes;
 (c) electronically providing an electrical control signal in response to said electrical input signal, said electrical control signal varying in real time with said changes in said an least one sensed parameter;
 (d) converting said electrical control signal to a discrete calibrated mechanical force;
 (e) mechanically coupling the manually adjustable primary control member of the rate meter to receive said discrete calibrated mechanical force; and
 (f) automatically moving the manually adjustable primary control member in response to said discrete calibrated mechanical force; wherein the flow rate of material through the rate meter is controllably changed in real time response to changes in said at least one sensed parameter.

25. The method of claim 24 wherein said discrete calibrated mechanical force is provided by a moving shaft member of an actuator, and wherein the step of mechanically coupling the manually adjustable primary control member includes:

(a) mounting said actuator adjacent the rate meter; and (b) providing mechanical linkage between said moving actuator shaft and the manually adjustable primary control member of the rate meter.

26. The method of claim 24, further including the steps of:

(a) sensing changes in a plurality of said parameters;

(b) providing a plurality of said electrical input signals in response respectively to the plurality of sensed parameter changes; and (c) providing said electrical control signal in response to said plurality of said electrical input signals, wherein the flow rate of the rate meter is automatically changed in real time response to the changes in said plurality of said parameters.

27. A method of retrofitting an applicator apparatus of the type having a manually controllable rate meter that controls the rate of material flow through the applicator system, for a desired user real-time control by an electronic control means, without altering those portions of the applicator apparatus through which the material flows, comprising the steps of:

(a) providing said electronic control means for producing an electrical control signal that characterizes the desired user real-time control of the manually controllable rate meter;

(b) providing an actuator that responds to a received electrical control signal and produces a calibrated mechanical output force in response to said received electrical control signal;

(c) operatively connecting said electronic control means with said actuator for transfer of said electrical control signal to said actuator; and (d) mechanically securing said actuator in operative proximity to a manually adjustable primary control member of the manually controllable rate meter for movement of the manually adjustable primary control member in response to said calibrated mechanical output force.

28. The combination of an automatic control apparatus with an anhydrous ammonia applicator apparatus of the type suitable for pulling by a tractor over a surface to which the anhydrous ammonia is being applied, the applicator apparatus comprising:

(a) a pressurable tank for holding the anhydrous ammonia;

(b) at least one applicator head for applying the anhydrous ammonia in or onto the surface;

(c) plumbing means for operatively interconnecting the pressurable tank and the at least one applicator head in fluid communication;

(d) a rate meter interposed in said plumbing means for controllably regulating the flow of anhydrous ammonia to the at least one applicator head, said rate meter having manually adjustable mechanical control means of the type normally adjusted by a user; and (e) transport means suitable for connection to a tractor for operatively carrying the applicator apparatus elements (a) through (d) above, on and for movement relative to the surface; and said automatic control apparatus comprising:

(a) user interface means configured for a mounting to a tractor pulling said applicator apparatus, for receiving user input information representing a desired application rate for the anhydrous ammonia to the surface and for displaying information related to the applicator apparatus operation for the user;

(b) electronic means operatively connected to said user interface means for providing an electrical output control signal responsive to said user input information; and (c) actuator means operatively connected to receive said electrical output control signal and suitable for operative mechanical connection to the manually adjustable mechanical control means of the rate meter, for automatically mechanically controlling adjustment of said rate meter so as to cause the anhydrous ammonia dispensed by said applicator head to achieve the desired application rate; wherein said mechanical connection of the actuator means to said manually adjustable mechanical control means of the rate meter requires no alterations to be made to those portions of the pressurable tank, applicator head, plumbing means or rate meter through which the anhydrous ammonia flows.

29. The combination as recited in claim 28, wherein the rate of flow of the anhydrous ammonia through said plumbing means and said rate meter is affected by at least one variable parameter such as temperature; and wherein said automatic control apparatus further comprises at least one sensor for sensing said one variable parameter and for providing a sensed output signal in response thereto, and means responsive to said sensed output signal for automatically adjusting the rate meter in response thereto; whereby the desired application rate is automatically maintained with variation in said one variable parameter.

* * * * *